US008005896B2

(12) United States Patent
Cheah

(10) Patent No.: US 8,005,896 B2
(45) Date of Patent: *Aug. 23, 2011

(54) SYSTEM FOR CONTROLLED DISTRIBUTION OF USER PROFILES OVER A NETWORK

(75) Inventor: Chris Cheah, San Jose, CA (US)

(73) Assignee: Cheah IP LLC, Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,092

(22) Filed: Jun. 17, 2010

(65) Prior Publication Data

US 2010/0257248 A1 Oct. 7, 2010

Related U.S. Application Data

(63) Continuation of application No. 12/258,291, filed on Oct. 24, 2008, now Pat. No. 7,743,100, which is a continuation of application No. 11/840,968, filed on Aug. 19, 2007, which is a continuation of application No. 11/170,370, filed on Jun. 28, 2005, now Pat. No. 7,277,911, which is a continuation of application No. 09/417,456, filed on Oct. 13, 1999, now Pat. No. 7,003,546.

(60) Provisional application No. 60/104,311, filed on Oct. 13, 1998.

(51) Int. Cl.
*G06F 15/16* (2006.01)
(52) U.S. Cl. ........ 709/204; 709/202; 709/205; 709/227; 709/229; 713/168
(58) Field of Classification Search .......... 709/201–205, 709/217–219, 223–224, 227–229; 713/150, 713/168–170
See application file for complete search history.

(56) References Cited

U.S. PATENT DOCUMENTS

| 5,220,657 | A | 6/1993 | Bly et al. |
| 5,263,157 | A | 11/1993 | Janis |
| 5,339,392 | A | 8/1994 | Risberg |
| 5,459,859 | A | 10/1995 | Senda |
| 5,493,105 | A | 2/1996 | Desai |
| 5,513,126 | A | 4/1996 | Harkins et al. |
| 5,539,813 | A | 7/1996 | Jonsson |
| 5,555,403 | A | 9/1996 | Cambot et al. |
| 5,608,786 | A | 3/1997 | Gordon |
| 5,640,565 | A | 6/1997 | Dickinson |

(Continued)

FOREIGN PATENT DOCUMENTS

EP 1 276 338 A2 1/2003

(Continued)

OTHER PUBLICATIONS

Office Action for U.S. Appl. No. 12/258,305, mailed Nov. 9, 2010.

(Continued)

*Primary Examiner* — Bharat N Barot

(57) ABSTRACT

An information management and distribution system is disclosed. The information management and distribution system facilitates the controlled exchange of contact information over a network. The system can support one or more of creation and design, rolodex, exchange, and update features. In one embodiment, the information management and distribution system can include a networked server system accessible by remote user devices via the network, and at least one database maintained by the networked server system and storing content information and exchange settings of registered users.

42 Claims, 37 Drawing Sheets

U.S. PATENT DOCUMENTS

| | | | |
|---|---|---|---|
| 5,659,596 A | 8/1997 | Dunn | |
| 5,675,782 A | 10/1997 | Montague et al. | |
| 5,678,041 A | 10/1997 | Baker et al. | |
| 5,689,642 A | 11/1997 | Harkins et al. | |
| 5,717,863 A | 2/1998 | Adamson et al. | |
| 5,732,229 A | 3/1998 | Dickinson | |
| 5,737,726 A | 4/1998 | Cameron et al. | |
| 5,754,939 A | 5/1998 | Herz et al. | |
| 5,760,773 A | 6/1998 | Berman et al. | |
| 5,761,662 A | 6/1998 | Dasan | |
| 5,764,736 A | 6/1998 | Shachar et al. | |
| 5,768,508 A | 6/1998 | Eikeland | |
| 5,774,117 A | 6/1998 | Kukkal et al. | |
| 5,781,901 A | 7/1998 | Kuzma | |
| 5,790,790 A | 8/1998 | Smith et al. | |
| 5,796,395 A | 8/1998 | de Hond | |
| 5,812,865 A | 9/1998 | Theimer et al. | |
| 5,813,006 A | 9/1998 | Polnerow et al. | |
| 5,815,665 A | 9/1998 | Teper et al. | |
| 5,818,442 A | 10/1998 | Adamson | |
| 5,848,412 A | 12/1998 | Rowland et al. | |
| 5,852,807 A | 12/1998 | Skarbo et al. | |
| 5,884,312 A | 3/1999 | Dustan et al. | |
| 5,892,909 A | 4/1999 | Grasso et al. | |
| 5,913,032 A | 6/1999 | Schwartz et al. | |
| 5,918,227 A | 6/1999 | Polnerow et al. | |
| 5,930,471 A | 7/1999 | Milewski et al. | |
| 5,943,399 A | 8/1999 | Bannister et al. | |
| 5,948,054 A | 9/1999 | Nielsen | |
| 5,950,200 A | 9/1999 | Sudai et al. | |
| 5,960,442 A | 9/1999 | Pickering | |
| 5,963,951 A | 10/1999 | Collins | |
| 5,978,768 A | 11/1999 | McGovern et al. | |
| 5,987,440 A | 11/1999 | O'Neil et al. | |
| 5,995,098 A | 11/1999 | Okada et al. | |
| 6,029,182 A | 2/2000 | Nehab et al. | |
| 6,029,195 A | 2/2000 | Herz | |
| 6,029,201 A | 2/2000 | Neill | |
| 6,052,122 A | 4/2000 | Sutcliffe et al. | |
| 6,061,681 A | 5/2000 | Collins | |
| 6,073,105 A | 6/2000 | Sutcliffe et al. | |
| 6,073,138 A | 6/2000 | de l'Etraz et al. | |
| 6,076,093 A | 6/2000 | Pickering | |
| 6,085,242 A | 7/2000 | Chandra | |
| 6,094,675 A | 7/2000 | Sunaga et al. | |
| 6,105,027 A | 8/2000 | Schneider | |
| 6,119,164 A | 9/2000 | Basche | |
| 6,131,121 A | 10/2000 | Mattaway et al. | |
| 6,175,831 B1 | 1/2001 | Weinreich et al. | |
| 6,175,873 B1 | 1/2001 | Yamane et al. | |
| 6,205,478 B1 | 3/2001 | Sugano et al. | |
| 6,208,659 B1 | 3/2001 | Govindarajan et al. | |
| 6,219,702 B1 | 4/2001 | Ikehara et al. | |
| 6,253,202 B1 | 6/2001 | Gilmour | |
| 6,253,216 B1 | 6/2001 | Sutcliffe et al. | |
| 6,269,369 B1 | 7/2001 | Robertson | |
| 6,292,827 B1 | 9/2001 | Raz | |
| 6,292,904 B1 | 9/2001 | Broomhall et al. | |
| 6,311,214 B1 | 10/2001 | Rhoads | |
| 6,324,587 B1 | 11/2001 | Trenbeath et al. | |
| 6,363,411 B1 * | 3/2002 | Dugan et al. | 709/202 |
| 6,374,259 B1 | 4/2002 | Celik | |
| 6,393,421 B1 | 5/2002 | Paglin | |
| 6,405,197 B2 | 6/2002 | Gilmour | |
| 6,405,243 B1 | 6/2002 | Nielsen | |
| 6,430,282 B1 | 8/2002 | Bannister et al. | |
| 6,442,263 B1 | 8/2002 | Beaton et al. | |
| 6,449,344 B1 | 9/2002 | Goldfinger et al. | |
| 6,480,885 B1 | 11/2002 | Olivier | |
| 6,487,582 B2 | 11/2002 | Kim | |
| 6,501,834 B1 | 12/2002 | Milewski et al. | |
| 6,519,629 B2 | 2/2003 | Harvey et al. | |
| 6,533,171 B1 | 3/2003 | Porter | |
| 6,587,127 B1 | 7/2003 | Leeke et al. | |
| 6,609,653 B1 | 8/2003 | Lapstun et al. | |
| 6,640,229 B1 | 10/2003 | Gilmour | |
| 6,647,384 B2 | 11/2003 | Gilmour | |
| 6,684,212 B1 | 1/2004 | Day et al. | |
| 6,714,916 B1 | 3/2004 | Robertson et al. | |
| 6,820,204 B1 | 11/2004 | Desai et al. | |
| 6,944,677 B1 | 9/2005 | Zhao | |
| 6,970,879 B1 | 11/2005 | Gilmour | |
| 7,003,546 B1 | 2/2006 | Cheah | |
| 7,076,504 B1 | 7/2006 | Handel | |
| 7,082,412 B1 | 7/2006 | Treider et al. | |
| 7,117,254 B2 | 10/2006 | Lunt et al. | |
| 7,146,505 B1 | 12/2006 | Harada et al. | |
| 7,194,419 B2 | 3/2007 | Robertson et al. | |
| 7,277,911 B2 | 10/2007 | Cheah | |
| 7,324,972 B1 * | 1/2008 | Oliver et al. | 705/40 |
| 7,389,324 B2 | 6/2008 | Masonis et al. | |
| 7,743,100 B2 * | 6/2010 | Cheah | 709/204 |
| 2002/0059379 A1 | 5/2002 | Harvey et al. | |
| 2002/0065896 A1 | 5/2002 | Burakoff et al. | |
| 2003/0069874 A1 | 4/2003 | Hertzog et al. | |
| 2006/0027648 A1 | 2/2006 | Cheah | |
| 2008/0022220 A1 | 1/2008 | Cheah | |
| 2009/0049049 A1 | 2/2009 | Cheah | |
| 2009/0049059 A1 | 2/2009 | Cheah | |
| 2009/0049149 A1 | 2/2009 | Cheah | |
| 2009/0055730 A1 * | 2/2009 | Cheah | 715/255 |
| 2009/0055747 A1 | 2/2009 | Cheah | |
| 2009/0063512 A1 | 3/2009 | Cheah | |
| 2009/0089292 A1 | 4/2009 | Cheah | |
| 2010/0217994 A1 * | 8/2010 | Ginter et al. | 713/168 |

FOREIGN PATENT DOCUMENTS

| | | |
|---|---|---|
| JP | H8-8962 | 1/1996 |
| JP | 9-179910 | 7/1997 |
| JP | 10-232893 | 9/1998 |
| WO | WO 99/23591 A1 | 5/1999 |
| WO | WO 00/16208 | 3/2000 |
| WO | WO 00/67105 | 11/2000 |
| WO | WO 00/67106 | 11/2000 |
| WO | WO 00/67108 | 11/2000 |
| WO | WO 00/67416 | 11/2000 |
| WO | WO 00/67416 A3 | 11/2000 |

OTHER PUBLICATIONS

Office Action for U.S. Appl. No. 11/840,968, mailed Nov. 10, 2010.

Sue Plumley, "Ten Minute Guide to Outlook 97", Dec. 17, 1996, Publisher: Que, pp. 1-4.

Sue Plumley, "Ten Minute Guide to Outlook 97", Dec. 17, 1996, Publisher: Que, Chapter: Using Internet Services, pp. 1-4.

Joe Habraken, "Sams Teach Yourself Microsoft Outlook 98 in 10 Minutes", Apr. 16, 1998, Publisher: Sams, Chapter: What's new in Outlook 98, pp. 1-2.

Joe Habraken, "Sams Teach Yourself Microsoft Outlook 98 in 10 Minutes", Apr. 16, 1998, Publisher: Sams, p. 1.

Sue Plumley, "Ten Minute Guide to Outlook 97, Dec. 17, 1996", Publisher: Que, Chapter: Using Internet Email, p. 1.

Sue Plumley, "Ten Minute Guide to Outlook 97", Dec. 17, 1996, Publisher: Que, Chapter: Using the Calendar, pp. 1-2.

Sue Plumley, "Ten Minute Guide to Outlook 97", Dec. 17, 1996, Publisher: Que, Chapter: Managing Tasks, p. 1.

Sue Plumley, "Ten Minute Guide to Outlook 97", Dec. 17, 1996, Publisher: Que, Chapter: Corporate Email, pp. 1-2.

Office Action for U.S. Appl. No. 11/840,968, mailed Nov. 10, 2010.

Joe Habraken, "Sams Teach Yourself Microsoft Outlook 98 in 10 Minutes", Publisher: Sams, Book Cover, Apr. 16, 1998, p. 1.

Joe Habraken, "Sams Teach Yourself Microsoft Outlook 98 in 10 Minutes", Publisher: Sams, Chapter: Outlook and the Internet, Apr. 16, 1998, p. 1.

Joe Habraken, "Sams Teach Yourself Microsoft Outlook 98 in 10 Minutes", Publisher: Sams, Chapter: Corporate Email, Apr. 16, 1998, pp. 1-2.

Joe Habraken, "Sams Teach Yourself Microsoft Outlook 98 in 10 Minutes", Publisher: Sams, Chapter: Sending a Letter to a Contact, Apr. 16, 1998, p. 1.

Joe Habraken, "Sams Teach Yourself Microsoft Outlook 98 in 10 Minutes", Publisher: Sams, Chapter: Understanding the Outlook Configuration, Apr. 16, 1998, p. 1.

Joe Habraken, "Sams Teach Yourself Microsoft Outlook 98 in 10 Minutes", Publisher: Sams, Chapter: Communicating with a Contact, Apr. 16, 1998, p. 1.

Joe Habraken, "Sams Teach Yourself Microsoft Outlook 98 in 10 Minutes", Publisher: Sams, Chapter: Viewing the Contacts Lists, Apr. 16, 1998, p. 1.

"vCard: The Electronic Business Card," Version 2.1, A versit Consortium White Paper, Jan. 1, 1997, pp. 1-5 (downloaded http://www.imc.org/pdi/vcardwhite.html).

"vCard: The Electronic Business Card," Version 2.1, A versit Consortium Specification, Sep. 18, 1996, pp. 1-40.

Boyd et al.; *Social Network Sites: Definition, History, and Scholarship*; Journal of Computer-Mediated Communication; 13(1), Article 11, http://jcmc.indiana.edu/vol13/issue1/boyd.ellison.html; printed on Feb. 29, 2008; pp. 1-23.

Sixdegrees—About FAQ; http://web.archive.org/web/19980521124624/sixdegrees.com/About/faq.cfm?PF=218593915805; May 21, 1998; pp. 1-5.

Yasns; yasns wiki; http://yasns.pbwiki.com/; Printed on Feb. 29, 2008; pp. 1-5.

Compliant, U.S. District Court, N.D.CA., Case No. 3:08-CV-04872-PJH (formerly, C.D. CA, Case No. CV08-05036), Jul. 31, 2008, pp. 1-8.

U.S. Appl. No. 12/258,295, filed Oct. 24, 2008, entitled "Method and System for Controlled Distribution of Profile Information and Related Data Objects".

U.S. Appl. No. 12/258,299, filed Oct. 24, 2008, entitled "Method and System for Controlled Distribution of User Customized Profiles Over a Network".

U.S. Appl. No. 12/258,302, filed Oct. 24, 2008, entitled "Method and System for Controlled Access to Profile Information for Non-Affiliated Users Over a Network".

U.S. Appl. No. 12/258,305, filed Oct. 24, 2008, entitled "Method and System for Controlled Distribution of Information Over a Network".

U.S. Appl. No. 12/258,308, filed Oct. 24, 2008, entitled "Method and System for Controlled Distribution of Profiles and Related Content Via Centralized Network-Based Resources".

U.S. Appl. No. 12/268,981, filed Nov. 11, 2008, entitled "Method and System for Controlled Distribution of Profile Information with Communication Support".

U.S. Appl. No. 11/840,968, filed Aug. 19, 2007, entitled "Method and System for Controlled Distribution of Information Over a Network".

"Web Innovator Launches Unique New Service at eCode.com: Delivering Global Id, Web-based Business Cards and a Truly Self-Populating and Self-Updating Address Book", Business Wire, pp. 1-2, Aug. 4, 1998.

Springer, "Address Book Updating Offered Free by eCode", Ethnic NewsWatch India-West, pp. 1-2, Aug. 14, 1998.

"Revolutionary Web-Site by ecode.com Tops 1,000,000 Hits in 1st Month of Business: The most unique thing on the Web, Demonstrates Spectacular Success since Aug. 4 launch", www.ecode.com, pp. 1-2, Sep. 14, 1998.

"Throw That Address Book Away", Computing, Dow Jones Factiva, pp. 1, Sep. 24, 1998.

"Veteran Computer Industry Pioneers Announce Internet Advertising Network and Internet Address Finder; New Company and Service Focus on Delivering Solutions for Advertising on the Internet", Business Wire, pp. 1-2, Nov. 28, 1995.

"LinkStar Offers Integrated Service", Dot.com, vol. 2, No. 10, pp. 1, Jan. 1996.

"Searching for People May Generate Profits", Internet Week, vol. 2, No. 2, pp. 1-7, Jan. 8, 1996.

"InContext and LinkStar to Deliver Enhanced Web Publishing Solution", Canada NewsWire, pp. 1-2, Sep. 16, 1996.

Masud, "Start-Up LinkStar to Use Comdex for Small Business", Computer Reseller News, pp. 1-3, Nov. 4, 1996.

"HotOffice Embraced by Industry Leaders as Breakthrough Online Communications Solution for Small Business; 20 Million Microsoft users to Benefit from New Technology", PR Newswire, pp. 1-3, Oct. 22, 1996.

Marshak, "Mission-Critical Lotus Notes", Prentice Hall, pp. 1-246, 1996.

Brown et al., "Mastering Lotus Notes 4.5 and Domino; Second Edition", Sybex, pp. 1-1113, copyright 1997.

Dyszel, "Microsoft Outlook for Dummies", IDG Books Worldwide, pp. 1-384, 1996.

Rain, "Visual Reference Basics, Microsoft Outlook 97", DDC Publishing, pp. 1-194, 1997.

"Getting Results with Microsoft Outlook 98", Microsoft Corporation, pp. 1-63, 1998.

"PlanetAll Plans to Make a World of Difference in Busy Lives; New Interactive Service Keeps People Connected, Coordinated and Clued-In", PR Newswire, pp. 1-3, Nov. 13, 1996.

Cardwell, "Cyberscene; PlanetAll Keeps You in Touch", The Boston Herald, pp. 2, Dec. 6, 1996.

Herbert, "Company Profile: PlanetAll Links It's Worldwide Colleagues", Boston Herald, pp. 1-2, Aug. 18, 1997.

"PlanetAll Internet Community Personalizes the Web With Hot New Features and a Fresh Look; Free, Web-based community—growing by the thousands daily—ensures that friends and colleagues are just a mouse click away", PR Newswire, pp. 1-4, Sep. 30, 1997.

Kilsheimer, "Looking for Old Friend? Web Sites Can Help", Orlando Sentinel, pp. 1-2, Nov. 1, 1997.

Wang, "Keep in Touch: New Breed of Site Links People by Common Interest", Internet World, pp. 1-3, Nov. 10, 1997.

"PlanetAll Marks 1st Birthday, Inks Deal With Unisys", Newsbytes, pp. 1-2, Nov. 13, 1997.

Rosenberg, "A Way to Stay in Touch With Own Little World PlanetAll Lets Users Customize Own Community in Cyberspace", Boston Globe, pp. 1-4, Nov. 30, 1997.

Carroll, "Can't Keep Track of Friends? A Cambridge Firm Will", Boston Globe, pp. 1-3, Jan. 4, 1998.

Caulfield, "Building 10,000 Relationships Each Day", Internet World, pp. 1-2, Feb. 9, 1998.

Toth et al., "PlanetAll", Harvard Business School, pp. 1-29, Mar. 6, 1998.

"PlanetAll Partners With Puma Technology to Synchronize Web-Based Contact Management Service With Leading Mobile Devices and Desktop Applications", Business Wire, pp. 1-3, Jul. 6, 1998.

"CMG @Ventures II Announces Sale of PlanetAll to Amazon.com", Business Wire, pp. 1-2, Aug. 4, 1998.

Alsop, "The Importance of Being in Sync", Fortune, vol. 138, Section: Techno File No. 7, pp. 1-4, Oct. 12, 1998.

"Sidekick Plus: The Professional Desktop Manager, Owner's Handbook", Borland International, pp. 1-487, 1988.

"Sidekick for Windows, Users Guide, Version 2.0", Starfish Software, pp. 1-104, copyright 1991, 1995.

"Simplify Your Life Sidekick for Windows, Users Guide", Borland International Inc., pp. 1-76, 1994.

"Starfish Software Introduces Starfish Internet Sidekick; Starfish Internet Sidekick is the best way for Internet users to manage their calendar, contacts and communications", Business Wire, pp. 1-6, Sep. 23, 1996.

"Starfish Software Releases Lite Version of Best-Selling Starfish Internet Sidekick; Starfish Internet Sidekick Lite Now Available for Free Download", Business Wire, pp. 1-6, Dec. 2, 1996.

"Starfish Software Updates Sidekick for the Mobile Professional and Internet User; Sidekick 97 Features Unique, Message-Based Internet Scheduling and Links to Powerful Add-On Products", Business Wire, pp. 1-4, Jan. 27, 1997.

"Versit Achieves Widespread Industry Adoption of Its vCard Specification", Business Wire, pp. 1-6, Apr. 29, 1996.

"Electronic Business Card", Communications International, vol. 23, No. 5, pp. 1, May 1996.

"vCard: The Electronic Business Card", Version 2.1, A Versit Consortium Specification, pp. 1-51, Sep. 18, 1996.

"vCard: The Electronic Business Card," Version 2.1, A Versit Consortium White Paper, pp. 1-5, Jan. 1, 1997.

Macavinta, "Netscape Pushes Privacy Standard", CNET News, pp. 1-2, May 23, 1997.

"Netscape, Firefly and Verisign Propose Open Profiling Standard (OPS) to Enable Broad Personalization of Internet Services", PRNewswire, pp. 1-4, downloaded Mar. 13, 2009.

Licken, "Techie Business Card Takes Chaos Out of Communication As With So Many New IT Products, Users Will Have to Decide if the Frustration and Cost of Constant Upgrades Are Prices Worth Paying for Inter-operability and Progress", The Irish Times, pp. 1-2, May 8, 1998.
Mossberg, "A Weekly Column From the Wall Street Journal—Now There Is a Way to Reach Your Files From All of Your PCs", The Asian Wall Street Journal, pp. 1-2, Apr. 3, 1998.
"ESS Wire Visto Delivers First Web-Based Personal calendar; Visto Briefcase Extends Desktop Calendar to Web for Universal Access", Business Wire, pp. 1, May 18, 1998.
"Visto Raises $9 million in Venture Funding to Broaden Universal Internet Access Service; Nea's Stewart Alsop Will Join Visto's Board", Business Wire, pp. 1-2, Jul. 24, 1998.
"Business Cards Come to Virtual Life on the World Wide Web", World Wide Web Communications, pp. 1-3, Jun. 1, 1998.
"WebCardz to Market Internet Business Cards", Philadelphia Business Journal, pp. 1, Jun. 18, 1998.
"Here's My WebCardz", Business Marketing, pp. 1, Sep. 1, 1998.
Notess, "On the Nets: Email Address Databases", Business and Management Practices, vol. 19, No. 5, pp. 1-6, Oct. 1996.
"WhoWhere? and GeoCites Announce Partnership Linking the Leading People & Home-Page Directory With Online Community Pioneer; Hot-Linked Sites Create Premier Destination for Connecting People and Communities on the Web", PR Newswire, pp. 1-2, Dec. 2, 1996.
"Excite Makes WhoWhere Number One People Finder", Newsbytes, pp. 1-2, Feb. 25, 1997.
"Excited Selects WhoWhere? For Email lookup and People Finder Services; WhoWhere? Recognized As 'Best of Class' for Finding Email Addresses, Home Phone Numbers and Home Addresses on the Web", PR Newswire, Financial News, pp. 1-2, Feb. 25, 1997.
"WhoWhere? Announces MailCity Free, Permanent E-Mail Service; Get It Anywhere, Anytime", PR Newswire, Financial News, pp. 1-2, Mar. 13, 1997.
"WhoWhere, Classifieds200, Create WhoWhereClassifieds on Web", The Simba Report on Directory Publishing, vol. 7, No. 3, pp. 1, Mar. 15, 1997.
"People on the Net", Internet Week, vol. 3, No. 18, pp. 1-2, May 5, 1997.
"Find a Lost Love and Send a Valentine Via E-mail American Greetings Joins WhoWhere? With Its Popular Line of Electronic Cards" PR Newswire, Financial News, pp. 1-2, Feb. 12, 1998.
Hesseldahl, "Creating Scalable Sites Using Homegrown Tools", Internet World, Infrastructure, pp. 1-2, May 18, 1998.
Buel, Internet Directory Firm Lycos to Buy Online Locator WhoWhere, San Jose Mercury News, pp. 1-2, Aug. 12, 1998.
Levine et al, "The Internet for Dummies $2^{nd}$ Edition", IDG Books, pp. 1-7, 1994.
"Product Features; Simplified Web Purchases", Contact Networks, Inc., http://webarchive.org/web/20000620064129/www.contact.com/tour_start.html, pp. 1, 1999.
"Download Software", Contact Networks, Inc., http://webarchive.org/web/20000621194359/www.contact.com/software_download.html., pp. 1, 1999.
"General Information: Frequently Asked Questions", Contact Network, Inc., http://web.archive.org/web/20000621160607/www.contact.com/help/gen_info.html, pp. 1-4, 1999.
Webach, "Data Soup: The Client is the Server", Release 1.0, Apr. 12, 2000, pp. 1-20.
"meBusiness: Convenience, Choice and Control through digitalme", Articles and Tips: article, Novell, Inc., pp. 1-5, Jan. 1, 2000.
Markoff, "MarketPlace; Novell to Offer Data-Privacy Technology for Internet", The New York Times, pp. 1-4, Mar. 22, 1999.
"Create Relationships", Digitalme, Novell, Inc., pp. 1, 1999.
"digitalme & meBusiness", Digitalme, Novell, Inc., pp. 1, 1999.
"FAQ; Frequently Asked Questions", Digitalme, Novell, Inc., pp. 1-2, 1999.
"Making Life Easier on the Net", Digitalme, Novell, Inc., 1999, pp. 1.
"Learn More", Digitalme, Novell, Inc., 1999, pp. 1.
"Make It Convenient", Digitalme, Novell, Inc., 1999, pp. 1-2.
"Take Control", Digitalme, Novell, Inc., 1999, pp. 1.
"OnePIN, Inc.: Private Company Information" Business Week, pp. 1-2, Apr. 16, 2009.
Rossenberg, "A way to stay in touch with own little world PlanetAll lets users customized own community in cyberspace; [City Edition]", Boston Globe, pp. 1-3, Nov. 30, 1997.
"Launch of Revolutionary "Connection Engine" Links Nearly One Million sixdegrees Members", Business Wire, pp. 1-2, Sep. 8, 1998.
Allbritton, "It's a small World Wide Web, after all", The Associate Press, pp. 1-2, Sep. 4, 1998.
Allbritton, "It's a small World Wide Web, after all", Amarillo Globe News, pp. 1-2, Sep. 8, 1998.
"sixdegrees Product Launch Promises to Revolutionize Traditional On-line Bulletin Boards, & Web Communities", Business Wire, pp. 1, Oct. 14, 1997.
Bedell, "Meeting your new best friends Six Degrees widen your contacts in exchange for sampling Web sites," The Dallas Morning News, pp. 1-4, Oct. 27, 1998.
"Net Reader", Dow Jones Factiva, Lifestyles; pp. 1, May 8, 1998.
"Novel Services Use Matchmaking Model", NetGuide Magazine, vol. 4, No. 7, Jul. 1997, pp. 1-3.
Plotnikoff, "Six degrees to the nth degree", San Jose Mercury News, Entertainment News, Feb. 10, 1998, pp. 1-3.
"Bring Me the Head of Carl Steadman!", Entropy Gradient Reversals, http://www.rageboy.com/carlshead.html, pp. 1-6, Oct. 7, 1998.
Freirman, "6 Degrees of Networking (Macroview Communications's Six Degrees, a Web Site) (Company Business and Marketing)", http://www.thedacs.com/techs/abstract/161861, pp. 1-4 , Jun. 4, 1998.
"SixDegrees", http://yasns.pbwiki.com/SixDegrees, pp. 1, Dec. 18, 2008.
"How to Keep Business Cards From Being Obsolete", Business Wire, pp. 1-2, Oct. 27, 1998.
"Day-Timer Digital Inc. and Zcentral Join Forces to Create the Ultimate Online Organizer", Business Wire, pp. 1-3, Jul. 20, 1999.
"ZKey.com", Business Week, pp. 1-2, downloaded Apr. 15, 2009.
"Zkey.com Welcomes a Seasoned CFO and Vice President of Operations to the Staff", Press Release, Zkey.com, pp. 1-7, Jul. 5, 2000.
"Writing Allows Me to Express My Thoughts", CXOtoday.com, http://cxotoday.com/India/CXO_Lifestyle/Writing_allows_me_to_express_my_thoughts_/551-87278-1005.html., pp. 1, downloaded on Apr. 15, 2009.
"Sdn Online Incorporated", Company Profile, Manta.com, pp. 1-2, downloaded on Apr. 15, 2009.
Brown, "Mastering Lotus Notes 4.5", $2^{nd}$ Edition, Sybex, 1997, pp. 1-2.
Green, "A Virtual Concierge At Your Service", Business Week, pp. 1-3, Nov. 16, 1998.
"Visto Introduces Shared Calendar, Flies and Photos on the Web; Virtual Briefcase Puts Users' Desktop Information On The Web for Accessing, Syncing and Now for Sharing", Business Wire, pp. 1-2, Oct. 14, 1998.
"Whatuseek Features Visto Briefcase in Its New Meta-Search Engine; Partnership Enables Access to Both Public and Personal Content From Same Site", Business Wire, pp. 1-2, Nov. 25, 1998.
Sinton, "Cyberspace Yellow Pages", The San Francisco Chronicle, Business section: pp. 1-2, Feb. 23, 1996.
Jasco, "Databases: Peter's picks & pans", Database, vol. 19, No. 5, pp. 1-4, Oct./Nov. 1996.
Moskowitz, "Interactive Quarterly: Thinking (and Acting) Big", Adweek, pp. 1-3, May 26, 1997.
Branchout.com, www.branchout.com, BrainStorm Interactive, Inc., web.archive.org/web/19970416044317/http://www.branchout.com/, pp. 1-7, downloaded Oct. 28, 2008.
"Brainstorm Interactive Initiates Registration for Online Community of 28 Jesuit Colleges and Universities", Business Wire, pp. 1-2, Oct. 6, 1997.
"BranchOut Tour—BranchOut in the Press", www.branchout.com, BrainStorm Interactive, Inc., web.archive.org/web/19980131175744/www.branchout.com/TourPress.htm, pp. 1-7, copyright 1997, downloaded on Oct. 23, 2008.
"eCode Concept", eCode.com, web.archive.org/web/19990508194037/ecode.com/html/about_us.asp, pp. 1-2, downloaded on Apr. 14, 2009.

eCode, About us, FAQ, Press, Individuals, copyright 1998,, eCode.com, web.archive.org/web/19990508194037/ecode.com/html/about_us.asp, 1-5, downloaded on Oct. 28, 2008.
"eCode.com-Confidentiality", eCode.com, web.archive.org/19991005183618/ecode.com/html/confidentiality.asp, pp. 1-2, copyright 1998, downloaded on Oct. 22, 2008.
"eCode.com FAQ (Frequently Asked Questions)", eCode.comweb.archive.org/web/20000607045723/ecode.com/html/faq/asp, copyright 1999, pp. 1-5, downloaded on Oct. 22, 2009.
"eCode's Help Center: Member Directory", eCode.com, web.archive.org/20000307022548/ecode.com/help/hlp_mDirectory.asp, pp. 1, copyright 1998, downloaded on Oct. 22, 2009.
"eCode.com iBar, Instant Help", eCode.com,web.archive.org/web/20000817120737/www.ecode.com/help/Instanthelp/ibarhelp.asp, pp. 1-9, copyright 1998, downloaded on Oct. 22, 2008.
"eCode.com Terms of Service", eCode.com, web.archive.org/web/19991111120211/ecode.com/html/termsofservice.asp, pp. 1-6, copyright 1999, downloaded on Oct. 22, 2008.
"LinkStar:Information", HotOffice Technologies, Inc., copyright 1995-97, web.archive.org/web/19980529194037/www.linkstar.com/linkstar/bin/vanilla?FILE=about, pp. 1, downloaded on Oct. 28, 2008.
"LinkStar Business Directory Help", HotOffice Technologies, Inc., copyright 1995-97web.archive.org/web/19980211042107/www.linkstar.com/linkstar/bin/help, pp. 1-8, downloaded on Oct. 28, 2008.
"Download Details: Outlook 97/98 vCards Reader", Microsoft Corporation, copyright 2009, www.microsoft.com/downloads/details.aspx?FamilyID-6B31F984-7F0B-42EC-9AC1-17433D994, pp. 1-2, downloaded on Apr. 16, 2009.
"The Company", PlanetAll, web.archive.org/web/19970605093341/www.planetall.com/Company.dbm, pp. 1, downloaded on Apr. 16, 2009.
"This Week Online", The New York Daily News, pp. 1-2, Dec. 1, 1996.
"What Is The Concept of PlantAll?," PlanetAll, http://web.archive.org/web/19970605093252/www.planetall.com/why.dbm, pp. 1-3, downloaded on Apr. 15, 2009.
"PlanetAll Frequently Asked Questions", PlanetAll, http://web.archive.org/web/19970605093325/www.planetall.com/FAQ.dbm, pp. 1-5, downloaded on Apr. 15, 2009.
"PlanetAll", PlanetAll, http://web.archive.org/web/19970605093042/http://www.planetall.com/, pp. 1, downloaded on Apr. 15, 2009.
"Members Speak," PlanetAll, http://web.archive.org/web/19970605093333/www.planetall.com/press/press.dbm?type=1, pp. 2, downloaded on Apr. 15, 2009.
"Sample Daily PlantAll", PlanetAll, http://web.archive.org/web/19970605093139/www.planetall.com/sample_email.dbm, pp. 3, downloaded on Apr. 15, 2009.
"What is PlanetAll?", PlanetAll, http://web.archive.org/web/19970605093158/www.planetall.com/WhatIsPlanetAll.dbm, pp. 4, downloaded on Apr. 15, 2009.
"PlanetAll About Our Company", PlanetAll, http://web.archive.org/web/19971114081317/www.planetall.com/newmain/new_main.dbm, pp. 1, downloaded on Apr. 15, 2009.
"Sample PlanetAll Address Book," PlanetAll, http://web.archive.org/web/19971114081350/www.planetall.com/newmain/New_main.dbm, pp. 1, downloaded on Apr. 16, 2009.
"Sample PlanetAll Address Book", Search, PlanetAll, http://web.archive.org/web/19971114081125/www.planetall.com/newmain/new_main.dbm, pp. 1, downloaded on Apr. 15, 2009.
"Top Ten Groups in PlanetAll", PlanetAll, http://web.archive.org/web/19971114082144/www.planetall.com/newmain/new_main.dbm, pp. 3, downloaded on Apr. 16, 2009.
"Groups on PlanetAll", PlanetAll, http://web.archive.org/web/19971114081140/www.planetall.com/newmain/new_main.dbm, pp. 1, downloaded on Apr. 15, 2009.
"Your PlanetAll Calender", PlanetAll, http://web.archive.org/web/19971114081232/www.planetall.com/newmain/new_main.dbm, pp. 1, downloaded on Apr. 15, 2009.
"Crossing Paths", PlanetAll, http://web.archive.org/web/19971114081154/www.planetall.com/newmain/new_main.dbm, pp. 1, downloaded on Apr. 15, 2009.
"Sample PlanetAll Update", PlanetAll, http://web.archive.org/web/19971114081117/www.planetall.com/newmain/new_main.dbm, pp. 2, downloaded on Apr. 16, 2009.
"PlanetAll is a Service that will help you get in touch and stay in touch with the People & Groups you care about.", PlanetAll, http://web.archive.org/web/19971114082415/www.planetall.com/, pp. 1, copyright 1997, downloaded on Apr. 15, 2009.
"Sample PlanetAll Address Book", PlanetAll, http://web.archive.org/web/19971114082442/www.planetall.com/newmain/New_main.dbm, pp. 1, downloaded on Apr. 16, 2009.
"PlanetAll Members Speak!", PlanetAll, http://web.archive.org/web/19971114081306/www.planetall.com/newmain/new_main.dbm, pp. 1-2, downloaded on Apr. 15, 2009.
"Become a PlanetAll member now!", PlanetAll, http://web.archive.org/web/19971114082202/www.planetall.com/newmain/New_main.dbm, pp. 1, downloaded on Apr. 16, 2009.
"Welcome to PlanetAll: Login", PlanetAll, http://web.archive.org/web/19970605093100/www.planetall.com/registration/reg0.dbm, pp. 1, downloaded on Apr. 15, 2009.
"PlanetAll Permissions Scheme", PlanetAll, http://web.archive.org/web/19971114081833/www.planetall.com/newmain/new_main.dbm, pp. 1, downloaded on Apr. 15, 2009.
"PlanetAll News", PlanetAll, http://web.archive.org/web/19971114081215/www.planetall.com/newmain/new_main.dbm, pp. 1, downloaded on Apr. 16, 2009.
"PlanetAll in the News!", PlanetAll, http://web.archive.org/web/19971114081256/www.planetall.com/newmain/new_main.dbm, pp. 1-4, downloaded on Apr. 15, 2009.
"PlanetAll: Statement of Privacy", PlanetAll, http://web.archive.org/web/19971114081242/www.planetall.com/newmain/new_main.dbm, pp. 1, downloaded on Apr. 15, 2009.
"PlanetAll: Reminder Service", PlanetAll, http://web.archive.org/web/19971114081202/www.planetall.com/newmain/new_main.dbm, pp. 1, downloaded on Apr. 16, 2009.
"PlanetAll: Who Should Join?", PlanetAll, http://web.archive.org/web/19971114081105/www.planetall.com/newmain/new_main.dbm, pp. 1-2, downloaded on Apr. 15, 2009.
"Welcome to PlanetAll", PlanetAll, http://web.archive.org/web/19980415155405/www.planetall.com/tsd1/more2.asp, pp. 1, downloaded on Apr. 15, 2009.
"PlanetAll:Synchronizes MS Outlook," PlanetAll, http://web.archive.org/web/19980415155359/www.planetall.com/tsd1/more3.asp, pp. 1, downloaded on Apr. 15, 2009.
"Benefits of Building An Active Address Book on PlanetAll", PlanetAll, http://web.archive.org/web/19980415155200/www.planetall.com/tsd1/more1/asp, pp. 1, downloaded on Apr. 15, 2009.
"About PlanetAll", PlanetAll, http://web.archive.org/web/19980415155206/planetall.com/tsd1/about1/asp, pp. 1, downloaded on Apr. 15, 2009.
"PlanetAll will keep track", PlanetAll, http://web.archive.org/web/19980415155033/http://www.planetall.com/, pp. 1, downloaded on Apr. 15, 2009.
"PlanetAll Inventors; Privacy Policy" PlanetAll, http://web.archive.org/web/19980415155546/www.planetall.com/tsd1/about3.asp, pp. 1, downloaded on Apr. 15, 2009.
"PlanetAll: Privacy Policy", PlanetAll, http://web.archive.org/web/19980415155552/www.planetall.com/activeSync/outlook/..., pp. 1, downloaded on Apr. 15, 2009.
"PlanetAll Registration", PlanetAll, http://web.archive.org/web/19980415155118/www.planetall.com/reg/reg1.cfm, pp. 2, downloaded on Apr. 15, 2009.
"What is PlanetAll?", PlanetAll, http://web.archive.org/web/19980415155445/www.planetall.com/activeSync/outlook/..., pp. 1-2, downloaded on Apr. 15, 2009.
Kaufthal, "The Web's Executive Assistant", Wired, pp. 1-3, May 1999.
"Product Reviews: Sidekick 98", PC Pro, pp. 1-2, Apr. 1998.
"Versit Achieves Widespread Industry Adoption of Its vCard Specification", M2 Presswire, pp. 1-5, May 1, 1996.
Your Free private space on the Web: Your information where you need it, when you want it. That's your Visto Briefcase., http:web.archive.org/web/19981202192944/www.visto.com/products/products_free.html, pp. 1-2, downloaded on Apr. 14, 2009.

"WebCardz Press Box: Frequently Asked Questions", http://web.archive.org/web/19990422020641/www.webcardz.com/press_release/faq.html, pp. 1-5, downloaded on Apr. 14, 2009.

"Business Cards Come to Virtual Life on the World Wide Web", Press Release, http://web.archive.org/web/19991005203391/www.webcardz.com/press_release/press_releases_1.html, copyright 1998, pp. 1-3, downloaded on Apr. 14, 2009.

"Sample WebCardz", WebCardZ International, LLC, http://web.archive.org/web/19990129025849l/www.webcardz.com/samples/index.html, copyright 1998, pp. 1-2, downloaded on Apr. 14, 2009.

"Trademark Electronic Search System—WebCardz", http://tess2.uspto.gov/bin/showfield?f=doc&state=4009:d129tq.2.1, pp. 1-2, downloaded on Apr. 15, 2009.

"WebCardz—New Design and New Features", WebCardZ International, LLC, http://web.archive.org/web/19991005223211/www.webcardz.com/press_release/press_releases_2.html, copyright 1998, pp. 1, downloaded on Apr. 14, 2009.

"What is a WebCardz?", WebCardZ International, LLC, http://web.archive.org/web/19981205214701/www.webcardz.com/whatis/index.html, copyright 1998, pp. 1-3, downloaded on Apr. 14, 2009.

"Who is Record for WebCardz", http://whois.domaintools.com/webcardz.com, pp. 1, downloaded on Apr. 14, 2009.

"Leading Internet White Page Directory Vendors Support Microsoft NetMeeting; Integration Makes It Easy to Find Users of NetMeeting on the Internet Anywhere in the World", Newswire, pp. 1-2, Aug. 27, 1996.

"Welcome to WhoWhere?", WhoWhere? Inc., copyright 1995-97, http://web.archive.org/web/19970809064609/http://www.whowhere.com/, pp. 1-2, downloaded on Oct. 28, 2008.

"WhoWhere? Features", WhoWhere? Inc., copyright 1995-97, http://web.archive.org/web/19970809065707/http://www.whowhere.com/About/features.html, pp. 1-2, downloaded on Oct. 23, 2008.

"WhoWhere? Service and Directory Descriptions", WhoWhere? Inc., copyright 1995-97, http://web.archive.org/web/19970809064609/http://www.whowhere.com/, pp. 2, downloaded on Oct. 23, 2008.

"PlanetAll Membership Agreement", WhoWhere? Inc., copyright 1997, http://web.archive.org/web/19971211222604/www.planetall.com/reg/agreement_default.cmf, downloaded on Apr. 17, 2009, pp. 1-6.

*Cheah IP LLC* vs. *Plaxo, Inc.*, Case No. CV 08-05036, Complaint for Patent Infringement, filed Jul. 31, 2008, pp. 1-9.

*Cheah IP LLC* vs. *Plaxo, Inc.*, Case No. C08-05036 SJO (PLAx), Answer and Counterclaims of Defendants and Counterclaimants Plaxo, Inc., Comcast Interactive Media, LLC, and Comcast Corporation, pp. 1-10, filed Aug. 28, 2008.

*Cheah IP LLC* vs. *Plaxo, Inc.* Case No. CV 08-4872 PJH (EMC), Defendant's Invalidity Contentions Pursuant to Patent L.R. 3-3 (corrected) pp. 1-18, with Exhibit A, pp. 1-8), Exhibit B, pp. 1-222, and Exhibit C, pp. 1-290, May 11, 2009.

Civil Docket for Case #:3:08-cv-04872-PJH, filed Oct. 28, 2008.

Office Action for U.S. Appl. No. 09/417,456, mailed Nov. 7, 2002.

Office Action for U.S. Appl. No. 11/170,370, mailed Sep. 8, 2006.

International Search Report for PCT/US99/22931, mailed Oct. 13, 1998.

Office Action for U.S. Appl. No. 12/258,291, mailed Nov. 17, 2009.

Notice of Allowance for U.S. Appl. No. 12/258,291, mailed Apr. 2, 2010.

Office Action for U.S. Appl. No. 12/258,305 mailed Jun. 24, 2010.

Office Action for U.S. Appl. No. 12/268.981, mailed Apr. 25, 2011.

Office Action for U.S. Appl. No. 12/258,295, mailed Mar. 4. 2011.

Final Office Action for U.S. Appl. No. 11/840,968, mailed Apr. 27, 2011.

Notice of Allowance for U.S. Appl. No. 12/258,305, mailed Apr. 28, 2011.

Office Action for U.S. Appl. No. 12/258,299, mailed Apr. 13. 2011.

Office Action for U.S. Appl. No. 12/258.302, mailed Feb. 16, 2011.

Office Action for U.S. Appl. No. 12/258.308, mailed May 25, 2011.

\* cited by examiner

Card-To-Card Registration Form

Required Information:

Last Name: | Middle Initial: |

First Name: |

EMail Address: |

Additional Business Information: (Optional)

Title: |  Tel: Area Code/#: |  |
Company: |  Extension: |
Address: |
City: |  Fax: Area Code/#: |  |
State: [Select State ▼]
Zip: |  Mail Stop: |
URL: |

Personal Information: (Optional)

Home Address: |  City: |
State: [Select State ▼]  Zip: |
Tel: Area Code/#: |  |  Fax: Area Code/#: |  |

[Clear]  [Submit]  [Cancel]

SYSTEM FOR CONTROLLED DISTRIBUTION OF USER PROFILES OVER A NETWORK

CROSS-REFERENCE TO RELATED APPLICATIONS

This application is a continuation of U.S. patent application Ser. No. 12/258,291, entitled "METHOD AND SYSTEM FOR CONTROLLED DISTRIBUTION OF ONE OR MORE DISTINCT PROFILES FOR A USER", and filed on Oct. 24, 2008 now U.S. Pat. No. 7,743,100, which is a continuation of U.S. patent application Ser. No. 11/840,968, entitled "METHOD AND SYSTEM FOR CONTROLLED DISTRIBUTION OF INFORMATION OVER A NETWORK", and filed on Aug. 19, 2007, which is a continuation of U.S. patent application Ser. No. 11/170,370, entitled "METHOD AND SYSTEM FOR CONTROLLED DISTRIBUTION OF INFORMATION OVER A NETWORK", and filed on Jun. 28, 2005 now U.S. Pat. No. 7,277,911, which is a continuation of U.S. patent application Ser. No. 09/417,456, entitled "METHOD AND SYSTEM FOR CONTROLLED DISTRIBUTION OF CONTACT INFORMATION OVER A NETWORK", and filed on Oct. 13, 1999 now U.S. Pat. No. 7,003,546, which claims the benefit of U.S. Provisional Application No. 60/104,311, entitled "METHOD AND SYSTEM FOR CONTROLLED DISTRIBUTION OF INFORMATION OVER A NETWORK", and filed on Oct. 13, 1998. The disclosures of each of these related applications are incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to the management and exchange of information and, more particularly, to information management and exchange over networks.

2. Description of the Related Art

It is very common today for individuals to distribute or exchange business cards with others. Normally, the distribution or exchange of business cards occurs during the course of business; however, such distributions or exchanges can also occur in more personal settings.

Business cards contain information pertaining to an individual who is normally associated with a business entity. The information on business cards typically includes a company name, an individual's name, title, phone number, facsimile number, mail address, and email address. Business cards thus record the information that is needed to not only identify but also contact the individuals represented by the business cards.

One problem with conventional approaches to distributing or exchanging business cards is that the information on the business cards often becomes outdated after their distribution. Typically, business cards become outdated when the individuals move offices, change employers, obtain promotions, etc. When the information on a particular business card does become outdated, the information no longer facilitates the contacting of the individual associated with the particular business card. The outdated information is often misleading. In general, the persons receiving the business cards cannot determine from the business cards whether the information on the business cards is still accurate.

Another problem with conventional business cards is that their distribution is manual. As a result, for one's business card to be distributed, the business card needs to be physically handed to another person. Also, when a revised business card with updated information is to be distributed, often there is no way to know who currently holds an older version of the business card. As a result, inaccurate business cards remain in circulation long after being outdated.

Thus, there is a need for improved approaches to automatically distribute and update contact information.

SUMMARY

Broadly speaking, the invention pertains to an information management and distribution system. The information management and distribution system include a client-side application and a server application that interact to facilitate the controlled exchange of contact information over a network. The client-side application can provide creation and design, rolodex, exchange, and update features. The information management and distribution system can also include a corporate administrator application.

One aspect of the invention pertains to techniques for electronically distributing contact information over a network in a controlled manner. In one embodiment, the contact information includes information that is useful for identifying or contacting a registered user (e.g., person or entity). As an example, the contact information for a registrant can include name, telephone number, facsimile number, mail address, and email address. When the registration pertains to a business, the contact information can also include a title, business name, and a Universal Resource Locator (URL) to an associated business website. A registered user that has received contact information pertaining to another registered user can contact the registered user using the contact information.

Additionally, since contact information is dynamic and needs to be maintained, another aspect of the invention is the automatic update of the previously distributed contact information. Hence, should the contract information change after its distribution to certain registered users, then the updated contact information is able to be distributed to the certain registered users in an automated manner.

Still another aspect of the invention is that contact information can be distributed to registered users in a common format. A common format for the distributed contact information can be used to facilitate a consistent type of contact information as well as a consistent presentation of the contact information to registered users. In one example, the common format is provided by a business card arrangement. Further, the common format facilitates the association or attachment of additional information to the basic contact information. This additional information can include a wide variety of items. For example, the additional information can include text, data, hyper links, audio objects, video objects, etc. The additional information can also be used for a variety of purposes, including announcements, messages, notifications, and advertisements.

Yet another aspect of the invention is the corporate administrator application. The corporate administrator application enables an administrator to control the use of corporate (i.e., business entity) information. The corporate administrator application can include many of the features associated with the client-side application, including creation and design, rolodex, exchange, and update features. For example, the administrator may wish to update the corporate information that has been previously distributed or exchanged. In addition, the corporate administrator application can facilitate registration of employees of a business entity with the information management and distribution system. The corporate administrator application can also disable certain employees from further use of the corporate information.

The invention can be implemented in numerous ways, including as a method, an apparatus, a computer readable medium, and a computer system. Several embodiments of the invention are discussed below.

As a computer system that supports controlled exchange over a network of digital content information pertaining to a plurality of users, one embodiment of can, for example, include a networked server system accessible by remote user devices via the network; and one or more databases maintained by the networked server system and storing content information and exchange settings of registered users. The networked server system can be programmed, via executable program instructions, to: (a) receive and store in the one or more databases the content information provided by a first user for association with the first user, the content information comprising profile information about the first user and additional multimedia content of a plurality of data types, the content information comprising multiple data items which each correspond to a different subset of the content information; (b) receive and store in the one or more databases the exchange settings provided by the first user for specifying access to one or more of the multiple data items of the content information to one or more categories of requesting users so as to define one or more user profiles containing those of the multiple data items specified as being accessible to a particular category of the requesting users; (c) receive a request from a second user to permit the exchange of content information with the first user; (d) send an electronic notification of the requested exchange to the first user; (e) provide an option for the first user to permit the requested exchange of the content information; and (f) receive permission for the requested exchange from the first user; and (g) establish the second user as a contact of the first user and provide the first user and the second user access to each of their respective user profiles via the network, wherein the second user is provided access to the particular user profile previously specified by the first user's exchange settings for a category of requesting users to which the second user has been associated by the first user.

As a computer system that supports controlled exchange over a network of digital content information pertaining to a plurality of users, another embodiment of can, for example, include a networked server system accessible by remote user devices via the network; and at least one database maintained by the networked server system and storing content information and exchange settings of registered users. The networked server system can be programmed, via executable program instructions, to: (a) receive and store in the at least one database the content information provided by a first user for association with the first user, the content information profiling the first user, the content information comprising multiple data items which each correspond to a different subset of the content information; (b) receive and store in the at least one database the exchange settings provided by the first user for specifying access to one or more of the multiple data items of the content information to one or more categories of requesting users so as to define one or more user profiles containing those of the multiple data items specified as being accessible to a particular category of the requesting users; (c) receive a request from a second user to permit the exchange of content information with the first user; (d) determine whether the first user permits the request exchange of content information as requested by the second user; and (e) establish the second user as a contact of the first user and provide the first user and the second user access to each of their respective user profiles via the network, wherein the second user is provided access to the particular user profile previously specified by the first user's exchange settings for a category of requesting users to which the second user has been associated by the first user.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 18A-18K are screen illustrations associated with a representative embodiment of the invention;

FIG. 19A-1 is a representative screen illustration of an additional card of information according to an exemplary embodiment of the invention;

DETAILED DESCRIPTION OF THE INVENTION

The invention relates to techniques for electronically distributing contact information over a network in a controlled manner. In one embodiment, the contact information includes information that is useful for identifying or contacting a registered user (e.g., person or entity). As an example, the contact information for a registrant can include name, telephone number, facsimile number, mail address, and email address. When the registration pertains to a business, the contact information can also include a title, business name, and a Universal Resource Locator (URL) to an associated business website. A registered user that has received contact information pertaining to another registered user can contact the another registered user using the contact information.

Additionally, since contact information is dynamic and needs to be maintained, the invention can also cause the automatic update of the previously distributed contact information. Hence, should the contract information change after its distribution to certain registered users, then the updated contact information is able to be distributed to the certain registered users in an automated manner. Further, the contact information can be distributed to registered users to have a common format. A common format for the distributed contact information can be used to facilitate a consistent type of contact information as well as a consistent presentation of the contact information to registered users. In one example, the common format is provided by a business card arrangement.

In one embodiment, a requestor requests to receive the contact information from a requested party, and the requested party is asked whether the requestor can receive the contact information of the requested party. The contact information of the requested party is then distributed to the requestor only when the requested party agrees to the request. Once receiving the contact information pertaining to the requested party, the requestor can use the contact information to contact the requested party. If the contact information were to subsequently be changed by the requested party, the previously distributed contact information can be updated.

Embodiments of this aspect the invention are discussed below with reference to FIGS. 1-23. However, those skilled in the art will readily appreciate that the detailed description given herein with respect to these figures is for explanatory purposes as the invention extends beyond these limited embodiments.

Figure 1:
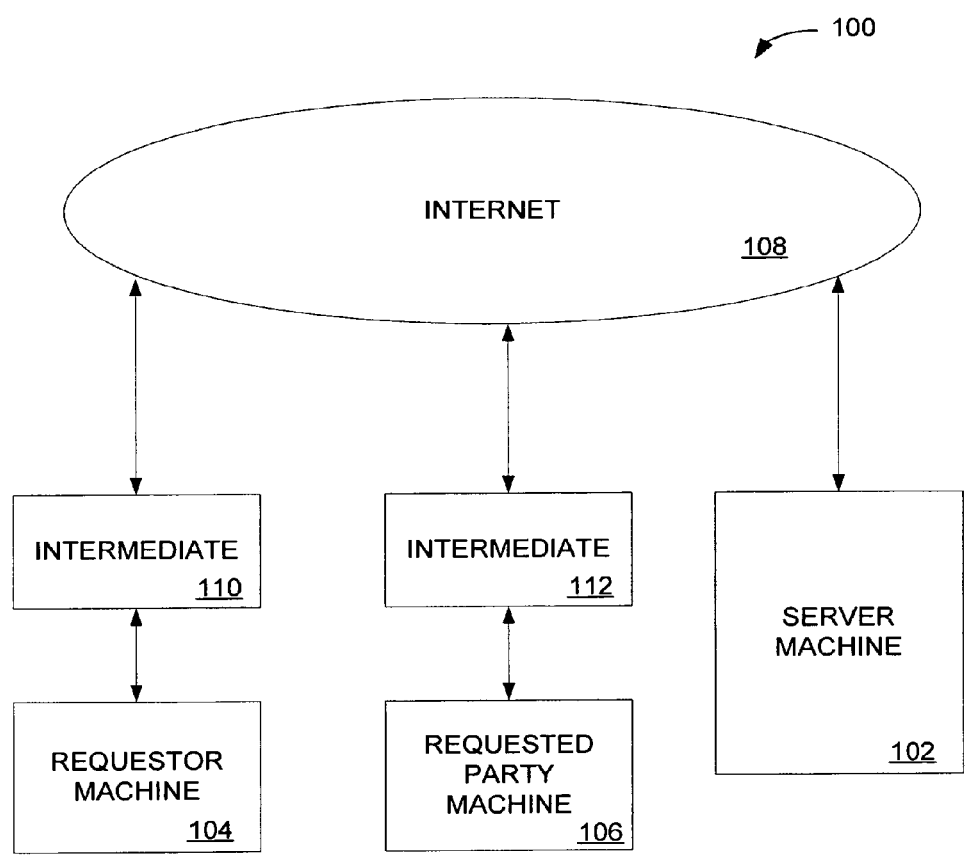
FIG. 1 is a block diagram of a network information management and distribution system according to an embodiment of the invention.

FIG. 1 is a block diagram of a network information management and distribution system 100 according to an embodiment of the invention. The network information management and distribution system 100 includes a server machine 102, a requestor machine 104 and a requested party machine 106. The Internet 108 is used to interconnect the server machine 102 with the requestor machine 104 and the requested party machine 106. The requestor machine 104 connects to the Internet 108 through an intermediate 110, and the requested party machine 106 connects to the Internet 108 through an intermediate 112. The intermediates 110 and 112 can refer to any of a number of networks or network devices, including a Local Area Network (LAN), a corporate Intranet, a Wide Area Network (WAN), a wireless data network, and an Internet Service Provider (ISP). It should be noted that other networks besides the Internet can be used to interconnect the server machine 102 with the requestor machine 104 and the requested party machine 106.

The server machine 102 provides for storage and management of content information. The content information pertains to a plurality of users, including the user of the requestor machine 104 and the user of the requested party machine 106. For example, content information for the user of the requestor machine 104 can be supplied to the server machine 102 through the intermediate 110 and the Internet 108. Likewise, content information for the user of the requested party machine 106 can be supplied to the server machine 102 through the intermediate 112 and the Internet 108. The server machine 102 stores the received content information for subsequent distribution.

The distribution of the content information at the server machine 102 can be performed as follows. First, the user of the requestor machine 104 makes a request for contact information to the server machine 102 through the Internet 108. Second, when the server machine 102 receives the request from the requestor machine 104, the server machine 102 determines that the requestor is seeking to receive the contact information for the user of the requested party machine 106. The server machine 102 than proceeds to query the user of the requested party machine 106 whether the distribution of its contact information is permitted. If the user of the requested party machine 106 replies that the distribution is permitted, then the server machine 102 forwards the contact information for the user of the requested party machine 106 from the server machine 102 to the requestor machine 104 through the Internet 108. Upon receiving the contact information for the user of the requested party machine 106, the requestor machine 104 locally stores the contact information in the requestor machine 104. Alternatively, if the user of the requested party machine 106 replies that the distribution is not permitted, then the server machine 102 sends a notification to the requestor machine 104 to inform the user that the request for contact information from the user of the requested party machine 106 is denied. Optionally, instead of the one-way distribution of the contact information, contact information of both users of the requestor machine 104 and the requested party machine 106 can be exchanged (i.e., two-way distribution).

Accordingly, the distribution of contact information is controlled by the "owner" of the information. As such, contact information is able to be electronically transmitted to those users that are approved and not to those users that are not approved. Additionally, should the contact information need to be changed, the changes can be made and then the server machine can proceed to update the previously transmitted contact information. As an example, the updating of the contact information at the requested party machine 106 produces altered contact information that is forwarded and stored on the server machine 102. Then, the server machine 102 can distribute the altered content information through the Internet 108 to all of those requestors machines that previously received (and this store) the contact information which is now outdated, thereby updating the content information for the user of the requested party machine 106 on the various requestor machines.

The network information management and distribution system 100 is described in more detail below as an information management and exchange system wherein the contact information is exchanged (two-way distribution) between the users of the requestor machine 104 and the requested party machine 106. Also described in detail below are the creation and modification of contact information, and the use of the contact information on the local machines.

Figure 2:
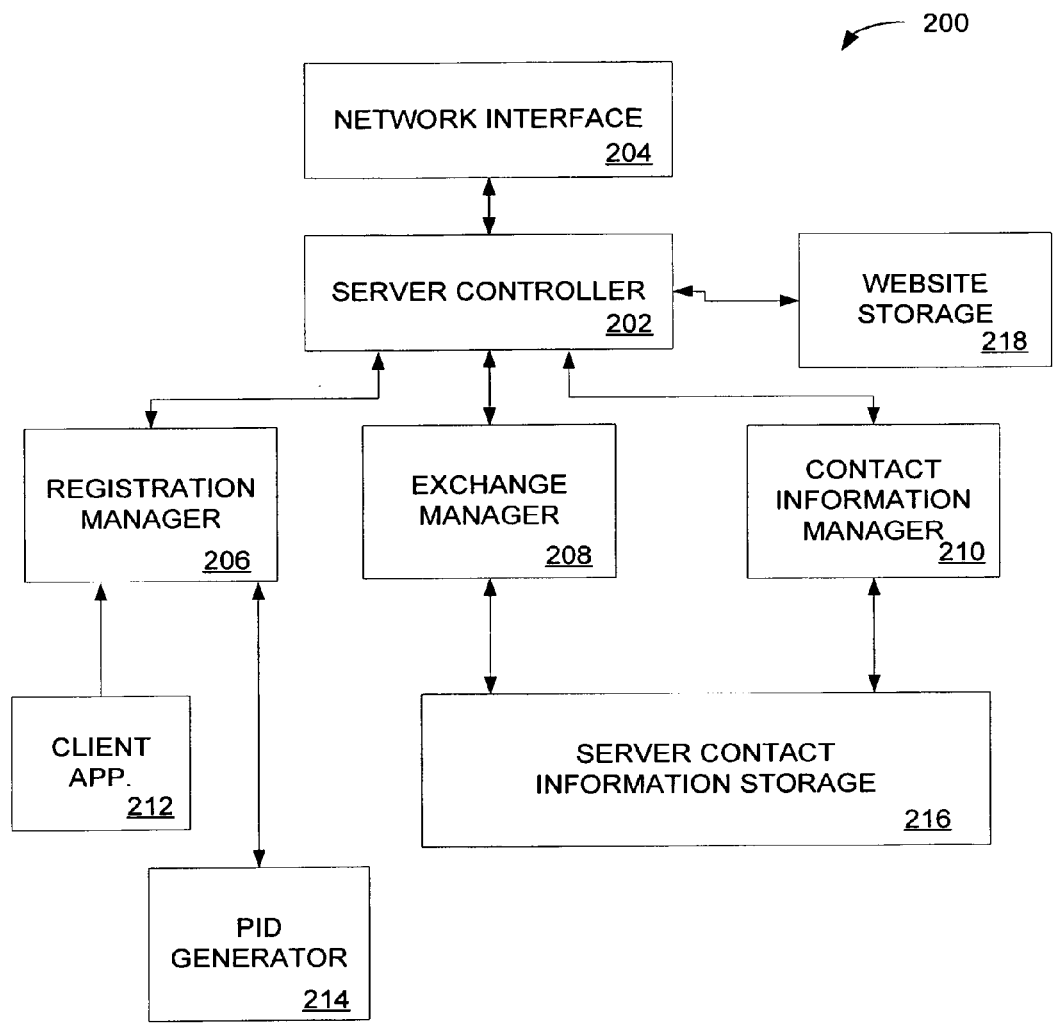
FIG. 2 is a block diagram of a server machine according to an embodiment of the invention.

FIG. 2 is a block diagram of a server machine 200 according to an embodiment of the invention. The server machine 200 is, for example, suitable for use as the server machine 102 illustrated in FIG. 1. The server machine is also referred to as a remote server or a system server.

The server machine 200 includes a server controller 202 that controls the operation of the server machine 200 with respect to providing the operations of the invention. The server controller 202 couples to the Internet 108 through a network interface 204. The server controller 202 also interacts with a registration manager 206, an exchange manager 208, and a contact information manager 210. The registration manager 206 manages the registration of users with the information management and exchange system. The registration manager 206 makes use of a client application (client-side application) that is available for download to the users that have (or will) register with the information management and exchange system. The registration manager 206 also makes use of a personal identifier (PID) generator 214. The PID generator 214 is used to generate unique identifiers for the users that are registered with the information management and exchange system. The exchange manager 208 and the contact information manager 210 couple to a server contact information storage 216. The server contact information storage 216 provides storage for the contact information for each of the registered users. In one embodiment, the contact information is profile information. The exchange manager 208 manages the exchange of particular contact information between registered users. The contact information manager 210 manages the storage of the contract information for the registered users as well as the subsequent update to the contact information.

The server controller 202 can include a Hyper Text Transfer Protocol (HTTP) server that allows assess and retrieval of information with respect to a website associated with the information management and exchange system. The website is stored in website storage 218.

Figure 3:
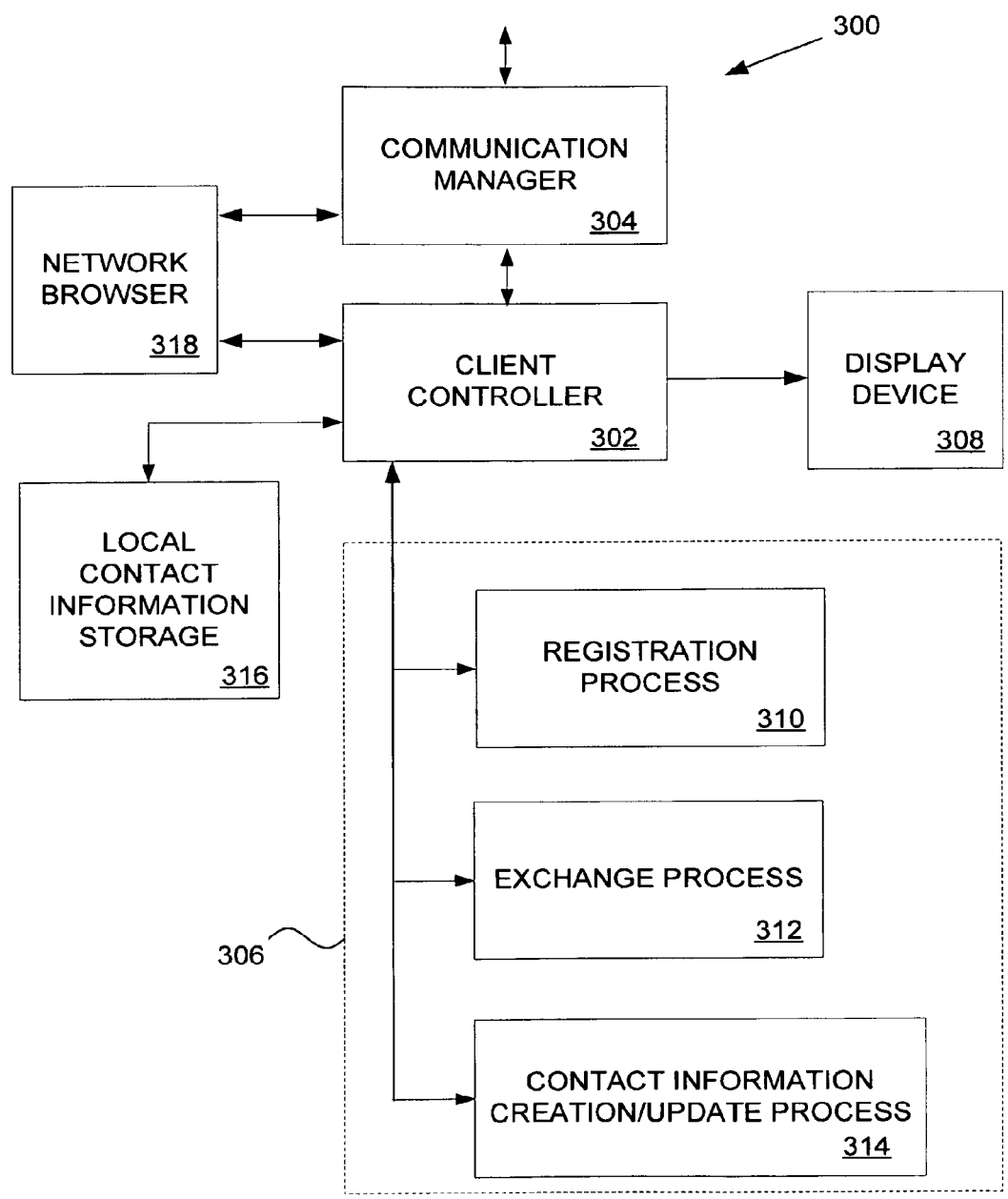
FIG. 3 is a block diagram of a local machine according to an embodiment of the invention.

FIG. 3 is a block diagram of a local machine 300 according to an embodiment of the invention. The local machine 200 is, for example, suitable for use as the requestor machine 104 and the requested party machine 106 illustrated in FIG. 1.

The local machine 300 includes a client controller 302 that controls the operation of the local machine 300 with respect to the operation of the invention. The client controller 302 couples to the Internet 108 through a communication manager 304. The client controller 302 runs or executes a client-side application 306 and displays information for a user on a display device 308. The client-side application 306 includes a registration process 310, an exchange process 312, and contact information creation/update process 314. The registration process 310 is used by a user of the local machine to register with the information management and exchange system. The exchange process 312 manages communications between the client-side application 306 and the server machine 102 so as to request and then, if approved, to receive contact information for a particular user. The contact information that may be received is stored in a local contact information storage 316. The contact information creation/update processing 314 allows the user of the local machine 300 to create and update their own contact information. The contact information creation/update processing 314 also communicates with the server machine 102 so that the various local machines of the information management and exchange system can have their previously exchanged contract information updated. The local contact information storage 316 also stores the contact information for the user of the local machine 300. Additionally, the local machine 300 typically includes a network browser 318 that allows the local machine to access the website of the information management and exchange system, such as provided by the server machine 102.

Figure 4:
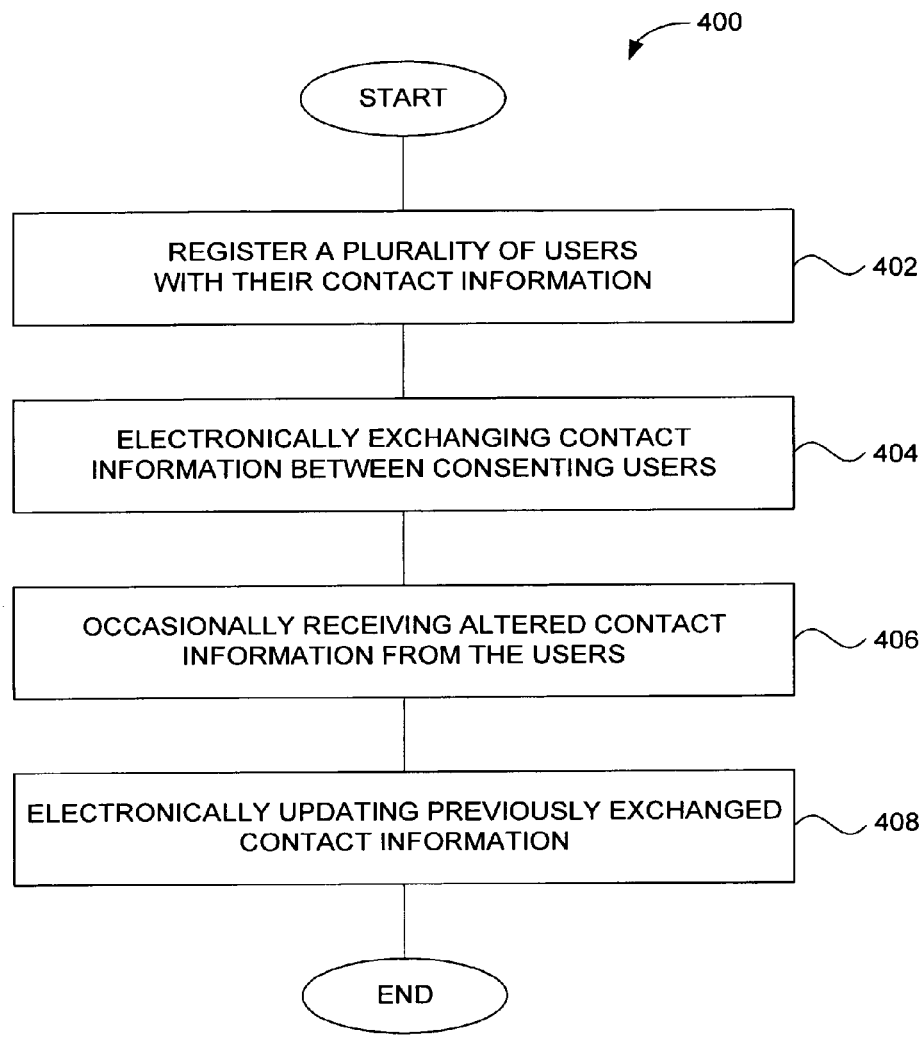
FIG. 4 is a flow diagram of automatic contact information distribution processing according to an embodiment of the invention.

FIG. 4 is a flow diagram of automatic contact information distribution processing 400 according to an embodiment of the invention. The automatic contact information distribution processing 400 is, for example, performed by the network information management and distribution system 100.

The automatic contact information distribution processing 400 begins by registering 402 a plurality of users with their contact information (e.g., profile information). Then, at the request of users, contact information is electronically exchanged 404 between consenting users. The exchange of the contact information takes place over a network (e.g., the Internet). The contact information being exchanged pertains to the parties participating in a particular exchange. In one embodiment, each particular exchange of the contact information is between a pair of users that have consent to the particular exchange. After the contact information is exchanged, the consenting users have the contact information of each other and thus are able to thereafter utilize the contact information to contact the user associated with the contact information.

The users that have distributed their contact information with others may subsequently alter their contact information in any of a number of ways. For example, the contact information can include a name, mail address, telephone number, facsimile number, and email address. If the telephone number of a particular user changes, then the particular user is able to update their contact information so as to contain the correct telephone number. However, at least the portion of the contact information that has been changed needs to be distributed to those of the users that have previously received the contact information of the particular user. In any case, with respect to the automatic contact information distribution processing 400, when users do subsequently alter their contact information, the altered contact information is received 406 from the associated users. Then, the previously exchanged contact information is electronically updated 408 to be consistent with the altered contact information. Following block 408, the automatic contact information distribution processing 400 is complete and ends.

The operations of the information management and exchange system is described in greater detail below with respect to FIGS. 5-23.

Figure 5:
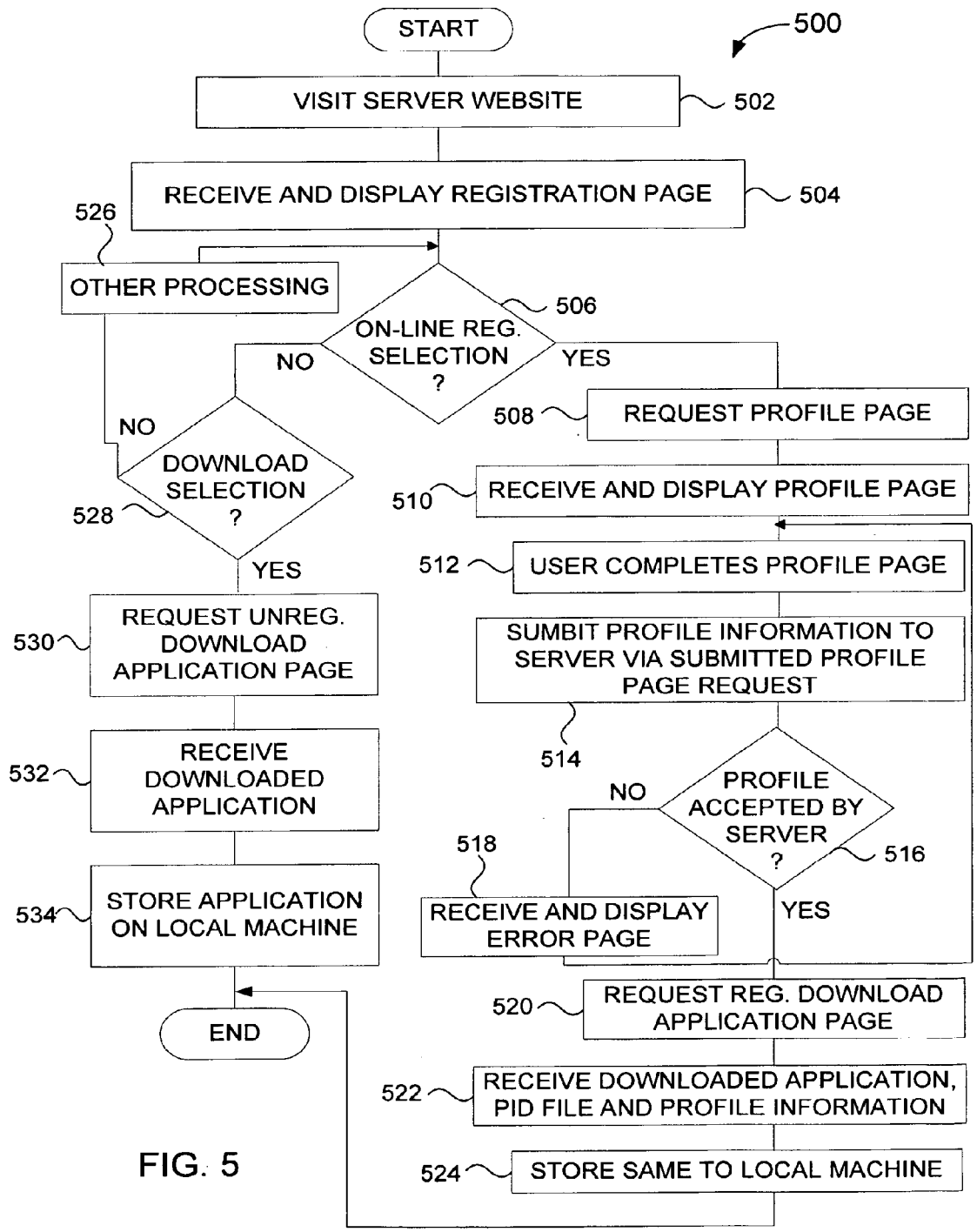
FIG. 5 is a flow diagram of client on-line registration processing according to an embodiment of the invention.

FIG. 5 is a flow diagram of client on-line registration processing 500 according to an embodiment of the invention. The client on-line registration processing 500 is, for example, performed by a network browser (i.e., web browser) running on a local machine.

The client on-line registration processing 500 initially visits 502 a server website that is hosting an information management and exchange system, such the server machine 200. Next, the network browser receives and displays 504 a registration page (e.g., HTML page). The registration page allows a user to not only download a client-side application but also register on-line with the information management and exchange system.

After the registration page is displayed 504, a decision block 506 determines whether the user has requested on-line registration. When the user has requested on-line registration, the network browser requests 508 a profile page from the server website. The network browser then receives and displays 510 the profile page provided by the server website. The profile page is a form that is displayed and permits data entry into various fields. As an example, the profile page can be a Hyper Text Markup Language (HTML) page. FIG. 18A is a screen illustration of a representative profile page according to an embodiment of the invention in which various fields are provided for data entry of business and/or personal information.

The user then completes 512 the profile page which queries the user for profile information. The profile information is, for example, descriptive information that the user represents about themselves. As an example, the profile information can include name, title, business name, mail address, email address, telephone number, facsimile number, and Universal Resource Locator (URL). After the user has completed the profile page, the profile information is submitted 514 to a system server via a submitted profile page request. The profile information defines a profile for the registrant (user). The system server manages the profile information and may be the same server, or group of servers, as providing the server website. In one embodiment, the submitted profile page request can be considered a POST operation in Hyper Text Transfer Protocol (HTTP).

Next, a decision block 516 determines whether the profile has been accepted by the system server. When the decision block 516 determines that the profile has not been accepted, the network browser receives and displays 518 an error page. Following block 518, the client on-line registration processing 500 returns to repeat block 512 and subsequent blocks such that the user can again repeat the completion of the profile page or modify previously entered data (profile information).

Once the decision block 516 determines that the system server has accepted the profile, the network browser requests 520 a registration download application page from the system server. The registration download application page is a page (e.g., HTML page) that facilitates the user in downloading the client-side application from the system server. Next, the network browser receives 522 the downloaded client-side application, a personal identifier (PID) file, and profile information pertaining to the user's profile. The client-side application is an application program that executes on the local machine as the client side of the information management and exchange information. The PID file contains a unique identifier that is associated to the user (requestor). The profile information is the information about the user that has been previously submitted by the user. In other words, the profile information is the self-represented data provided by the user in block 512. Next, the downloaded client-side application, the PID file and the profile information that have been received 522 are stored 524 on the local machine. Following block 524, the client on-line registration processing 500 is complete and ends.

On the other hand, when the decision block 506 determines that the user has not selected or requested on-line registration, then the client on-line registration processing 500 allows the user to obtain the client-side application without undergoing on-line registration. In such case, a decision block 528 initially determines whether the user is requesting to download the client-side application. When the decision block 528 determines that the user is not requesting to download the client-side application, then other processing is performed in block 526. The other processing can be a variety of different processes or operations that are either conventionally performed or not related to the invention. As an example, the other processing can be viewing other pages available from the server website via the network browser. Following block 526, the client on-line registration processing 500 returns to repeat the decision block 506 and subsequent blocks so that the server machine is essentially awaiting the user to select either on-line registration or to select a request for downloading the client-side application.

When the decision block 528 determines that the user has selected to download the client-side application, then an unregistered download application page is requested 530 from the system server. Then, the downloaded application is received 532 at the network browser. Once the downloaded application is received, the client-side application is stored 534 on the local machine. Following block 534, the client on-line registration processing 500 is complete and ends.

Figure 6A:
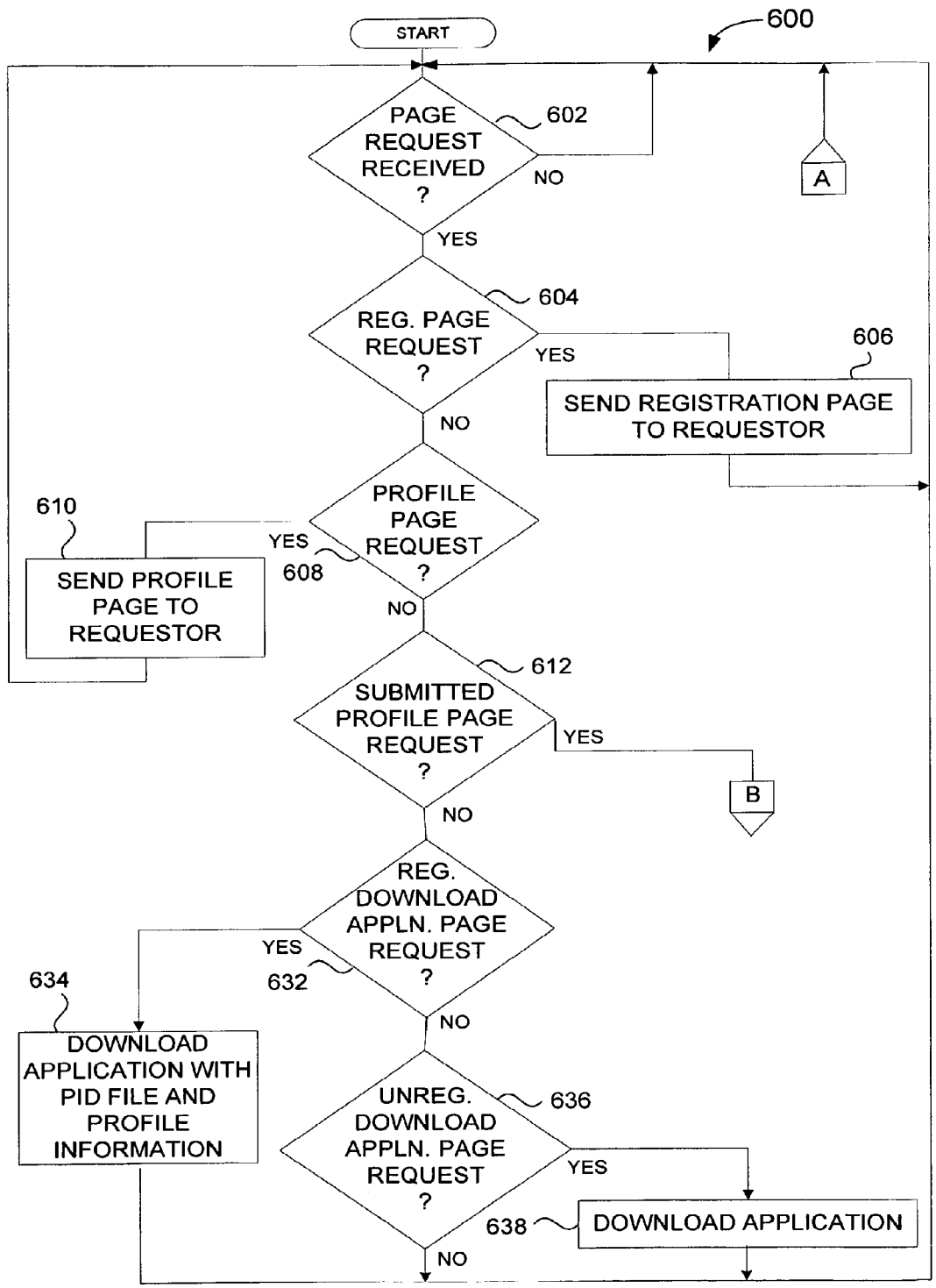
FIGS. 6A and 6B are flow diagrams of server registration processing according to an embodiment of the invention.
Figure 6B:
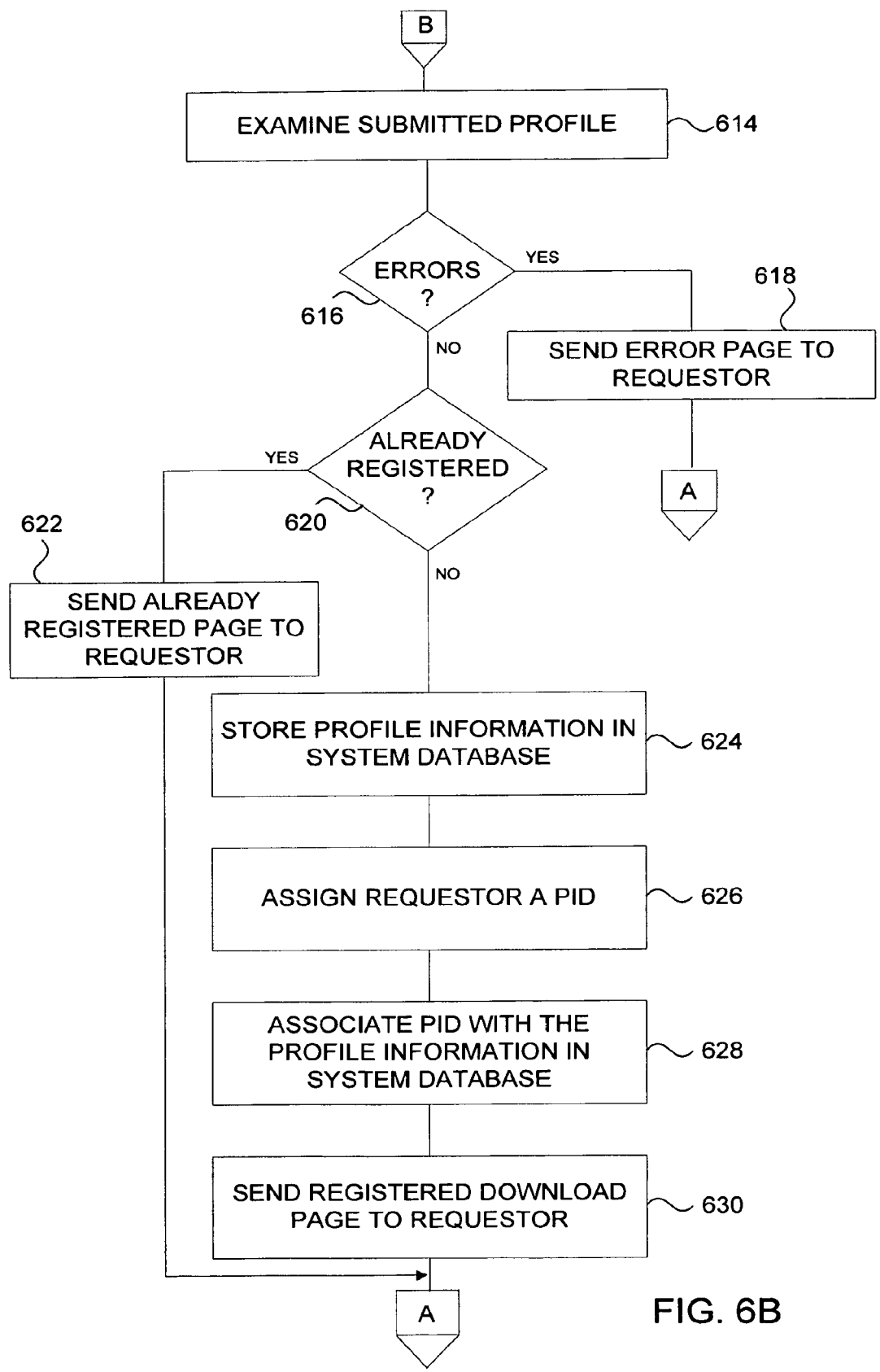

FIGS. 6A and 6B are flow diagrams of server registration processing 600 according to an embodiment of the invention. The server registration processing 600 is, for example, performed by the server machine (server system) in connection with the invention.

The server registration processing 600 begins with a decision block 602 that determines whether a page request has been received. If a page request has not yet been received, the decision block 602 causes the server registration processing 600 to await the receipt of a page request. In other words, the server registration processing 600 is invoked when a page request is received.

Once a page request has been received, a decision block 604 determines whether the received page request is a registration request. When the decision block 604 determines that the received page request is a registration page request, a registration page is sent 606 to the requestor. Here, for example, the registration page request can be a HTTP request to the server machine which, in response, supplies the registration page (HTTP response) to the requestor. Following block 606, the server registration processing 600 returns to repeat the decision block 602 and subsequent blocks so that additional page requests can be processed by the server machine.

On the other hand, when the decision block 604 determines that the received page request is not a registration page request, a decision block 608 determines whether the received page request is a profile page request. When the decision block 608 determines that the received page request is a profile page request, then the server machine sends 610 a profile page to the requestor. The profile page allows the requestor (user) to profile him/herself and then return the completed profile to the server machine. As an example, the profile page request is a HTTP request. Following block 610, the server registration processing 600 returns to repeat the decision block 602 and subsequent blocks so that additional page requests can be processed by the server machine.

Alternatively, when the decision block 608 determines that the received page request is not a profile page request, then a decision block 612 determines whether the received page request is a submitted profile page request. The submitted profile page request represents a submission of a profile by the requestor in accordance with a previously supplied profile page that has been completed. As an example, the submitted profile page request is a HTTP request. When the received page request is determined to be a submitted profile page request, then the server registration processing 600 operates to process the submitted profile provided by the requestor. Specifically, the server machine examines 614 the submitted profile. Then, a decision block 616 determines whether there are errors or deficiencies associated with the submitted profile. When the decision block 616 determines that there are errors or deficiencies in the submitted profile, then an error page is sent 618 to the requestor. Following block 618, the server registration processing 600 returns to repeat the decision block 602 and subsequent blocks. The requestor is then able to correct and resubmit his/her profile information.

On the other hand, when the decision block 616 determines that there are no errors or deficiencies with the submitted profile, then a decision block 620 determines whether the associated requestor is already registered with the system. When the decision block 620 determines that the requestor is already registered with the system, then the server machine sends 622 an already registered page to the requestor. The already registered page informs the requestor that he or she is already registered with the system and thus the submitted profile is not utilized. Following block 622, the server registration processing 600 returns to repeat the decision block 602 and subsequent blocks.

Alternatively, when the decision block 620 determines that the requestor is not yet registered with the system, then the profile information provided in the submitted profile is stored 624 in the system database (e.g., server contact information storage 216). Next, the server machine operates to assign 626 a PID to a requestor. The PID is a unique number for each requestor (user). Next, the PID is associated 628 with the profile information for the requestor in the system database. The association 628 operates to link together the profile information of the requestor with the PID of the requestor such that future references to the requestor can be achieved using the PID. Following block 628, a registered download page is sent 630 to the requestor. Following block 630, the server registration processing 600 returns to repeat the decision block 602 and subsequent blocks.

On the other hand, when the decision block 612 determines that the received page request is not a submitted profile page request, a decision block 632 determines whether the received page request is a registered download application page request. The registered download application page request is a request (e.g., HTTP request) to download the client-side application to the requestor. When the decision block 632 determines that the received page request is a registered download application page request, then the server machine downloads 634 the client-side application along with the PID file and profile information to the requestor. Following block 634, the server registration processing 600 returns to repeat the decision block 602 and subsequent blocks.

Alternatively, when the decision block 632 determines that the received page request is not a registered download application page request, then a decision block 636 determines whether the received page request is an unregistered download application page request. The unregistered download application page request is a request (e.g., HTTP request) to download the client-side application to the requestor. When the decision block 636 determines that the received page request is an unregistered download application page request, then the server machine downloads 638 the client-side application to the requestor. Following block 638, or following the decision block 636 when the received page request is determined not to be an unregistered download application page request, the server registration processing 600 returns to repeat the decision block 602 and subsequent blocks. While the server machine may also service additional page requests beyond those illustrated and described with the respect to FIGS. 6A and 6B, such additional page requests are not associated with the present invention and therefore are not discussed herein because they would obscure the operation of the invention.

Upon receiving the client-side application at the local machine, a requestor would install the client-side application on their local machine. As is well known in the art, the client-side application can be downloaded from the server machine (system server) to the local machine in a self-extracting format such that a user simply executes a file and the installation of the client-side application is performed. The client-side application would install itself in a predetermined directory and would also store the PID file and profile information in that same directory if such additional information was also downloaded from the server machine. Additionally, after the installation procedure has installed the program, typically a desktop icon would be provided in a start menu as well as on the visible desktop.

Figure 7:
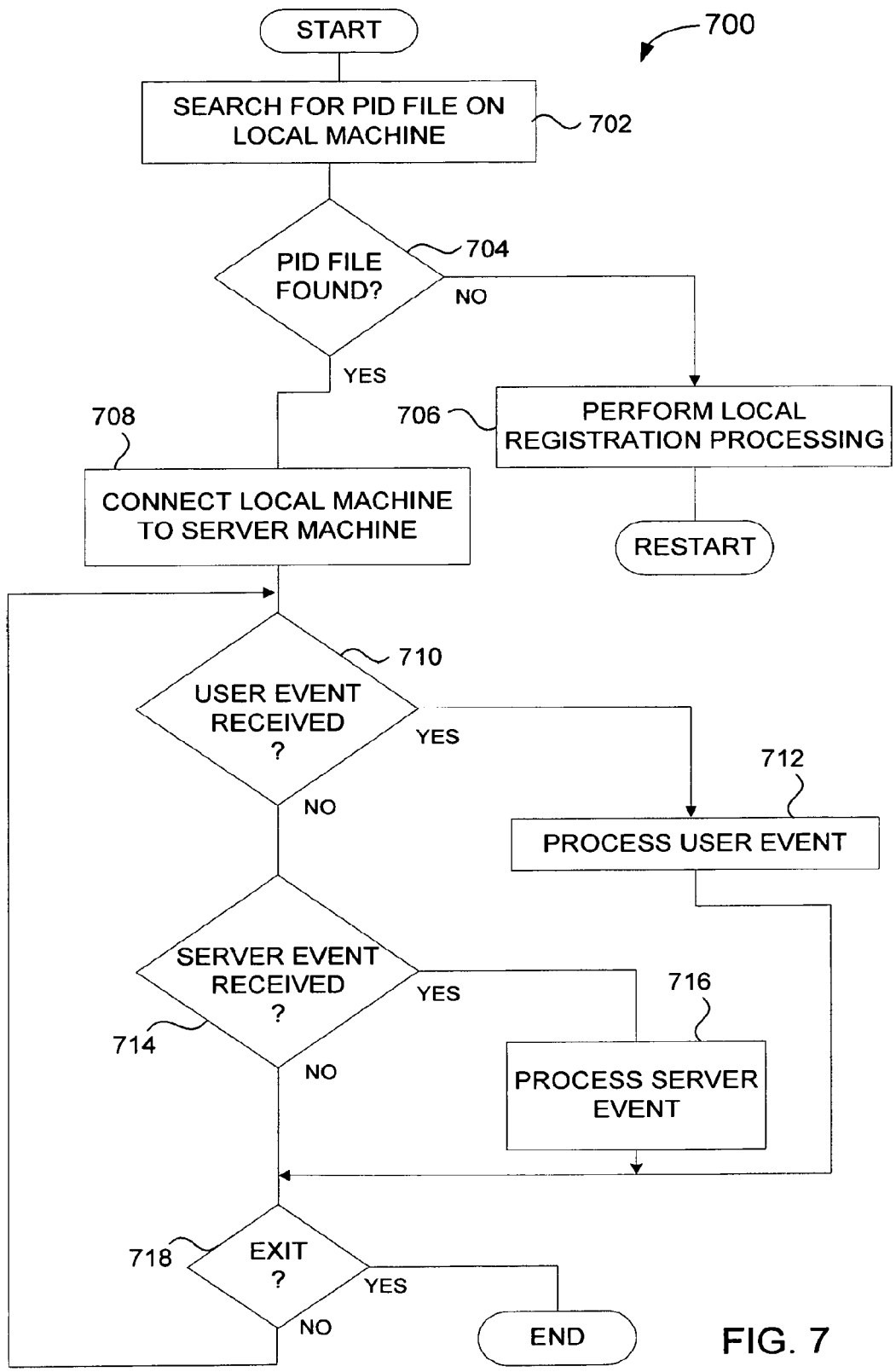
FIG. 7 is a flow diagram of general client-side application processing according to an embodiment of the invention.

FIG. 7 is a flow diagram of general client-side application processing 700 according to an embodiment of the invention. The general client-side application processing 700 is, for example, performed by the client-side application running on the local machine.

The general client-side application processing 700 initially begins upon execution of the client-side application. Once the client-side application is started, the general client-side application processing 700 operates to search 702 for a PID file on the local machine. The presence or absence of PID file indicates whether or not the user of the local machine has already registered with the system server of the information management and exchange system. A decision block 704 determines whether the PID file has been found on the local machine. When the decision block 704 determines that the PID file has not been found, local registration processing is performed 706 so that the user can register with the system server of the information management and exchange system (see FIG. 8). Following block 706, the general client-side application processing 700 is restarted. Hence, only registered users are able to use the client-side application in its normal operating sense.

On the other hand, when the decision block 704 determines that the PID file has been found on the local machine, the local machine is connected 708 to the server machine. Here, the connection of the local machine to the server machine can be performed in a variety of ways. For example, the connection is often through ports of the local machine and the server machine using some sort of communication protocol, such as HTTP or TCP/IP. In one embodiment, as shown in FIG. 1, the connection is provided using the Internet. The connection can also be established at least in part over a public telephone network (PTN), a wireless network, a LAN or WAN.

Once the general client-side application 700 is executing, the client-side application is able to process both user events and server events. The user events are provided by a user of the local machine, and the server events are provided by the server machine to the local machine via the connection. Following the connection (block 708) of the local machine to the server machine, a decision block 710 determines whether a user event has been received. When the decision block 710 determines that a user event has been received, the user event is processed 712. Alternatively, when the decision block 710 determines that a user event has not been received, a decision block 714 determines whether a server event has been received. When the decision block 714 determines that a server event has been received, the server event is processed 716. The user and server events cause the client-side application to perform actions that are associated with processing performed by the client-side application, such processing includes business card creation, rolodex operations, exchange operations, and update operations. Then, following the block 712, the block 716, or the decision block 714 when a server event is not received, a decision block 718 determines whether the user is requesting to exit the general client-side application processing 700. When the decision block 718 determines that an exit is requested, the general client-side application processing 700 is complete and ends. On the other hand, when the decision block 718 determines that the user is not requesting to exit, then the general client-side application processing 700 returns to repeat the decision block 710 and subsequent blocks.

As previously noted, a user of the information management and exchange system is required to register with the system in order to participate in using its information management and exchange features. As was explained with respect to FIGS. 6A and 6B, the registration processing can be initiated and performed through a website server. Alternatively, the registration processing can be performed by the client-side application. Specifically, upon initially invoking the client-side application on a local machine, the client-side application can request that the user register with the information management and exchange system (see block 706, FIG. 7).

Figure 8:
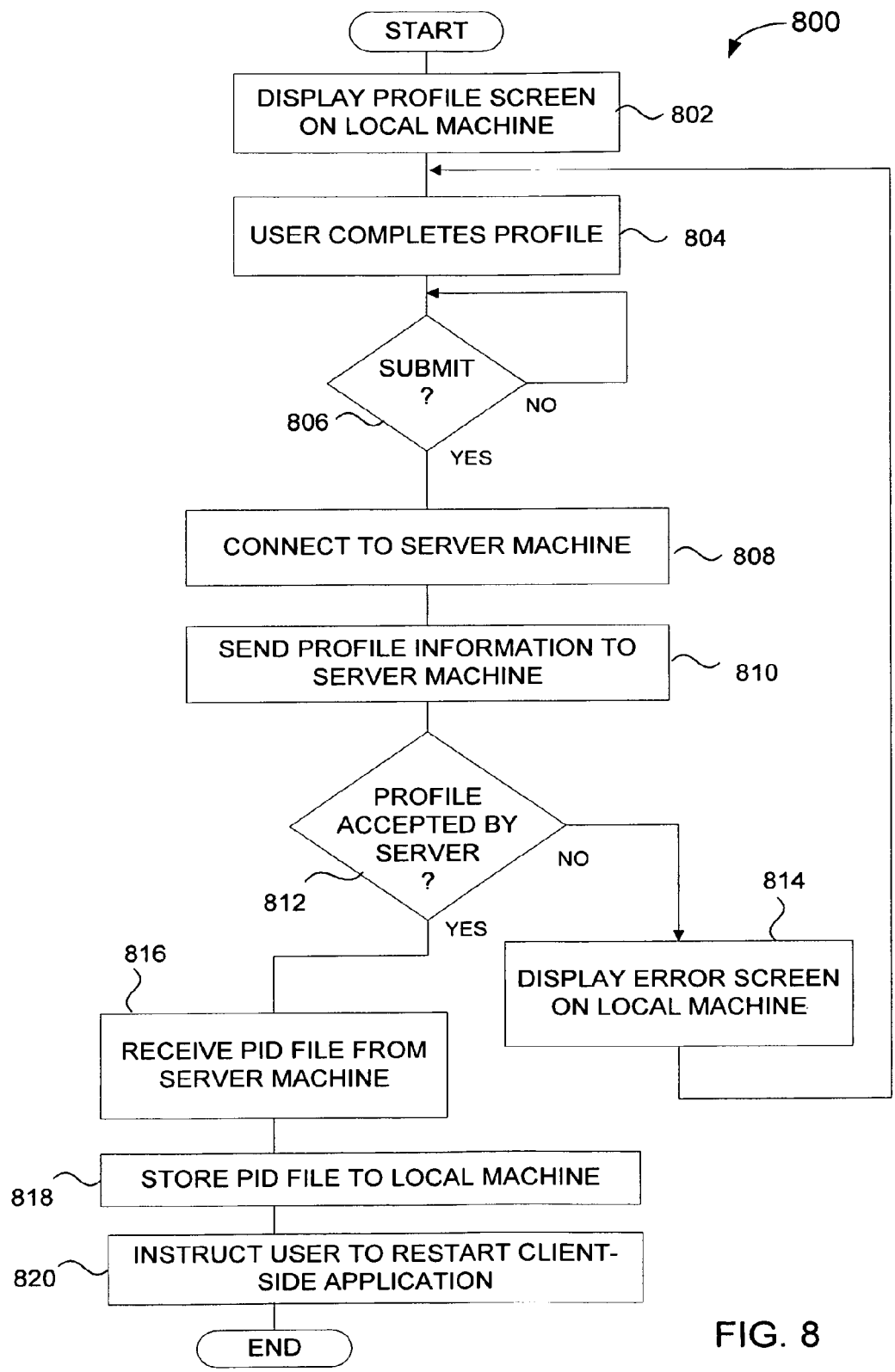
FIG. 8 is a flow diagram of local registration processing according to an embodiment of the invention.

FIG. 8 is a flow diagram of local registration processing 800 according to an embodiment of the invention. The local registration processing 800 is, for example, performed by the block 706 illustrated in FIG. 7 for the general client-side application 700.

The local registration processing 800 initially displays 802 a profile screen on the local machine. The profile screen would contain a form that the user would complete by entering profile information. Typically, the profile screen would be visually similar to the profile page used above with respect to FIGS. 6A and 6B. For example, a representative profile screen can be similar to the screen illustration shown in FIG. 18A.

A user then completes 804 their profile using the profile screen. Next, a decision block 806 determines whether the user has submitted their profile to the server system. When the user has not yet submitted their profile to the server system, the decision block 806 causes the local registration processing 800 to await the user's request to submit the profile. Once the decision block 806 determines that the user has submitted their profile, the local machine is connected 808 to the server machine. Once connected, the profile information is sent 810 to the server machine.

A decision block 812 then determines whether the profile has been accepted by the server system. When the decision block 812 determines that the server system rejects the profile, then an error screen is displayed 814 on the local machine. The error screen informs the user of the local machine that the profile that has been submitted is not acceptable. Following block 814, the local registration processing 800 returns to repeat the block 804 and subsequent blocks so that the user is able to modify their profile so as to eliminate the errors identified by the server system.

On the other hand, when the decision block 812 determines that the profile has been accepted by the server system, a PID file is received 816 from the server machine. Here, the server system operates, after receiving the submitted profile, to generate a suitable PID file. The PID file is then sent from the server system to the local machine. After receiving 816 the PID file, the PID file is stored 818 in the local machine. The user is then instructed 820 to restart the client-side application. Upon restart, the client-side application processing 700 will identify the stored PID file on the local machine (block 702, FIG. 7) and thus allow the client-side application to perform the operations associated with information management and exchange system. Following block 820, the local registration processing 800 is complete and ends.

The client-side application provides a number of features that are available to a user. One such feature pertains to the design and creation of electronic business cards. Electronic business cards are used as a medium for containing information. The information contained in the cards is, for example, contact information about the individual represented by a particular business card. In effect, the electronic business cards are containers for information that has a common format. More generally, the contact information is presented to the users in a common format. With the common format, a consistent presentation of contact information (e.g., profile information) can be made to registered users. Electronic business cards are one example of the common format.

Figure 9:
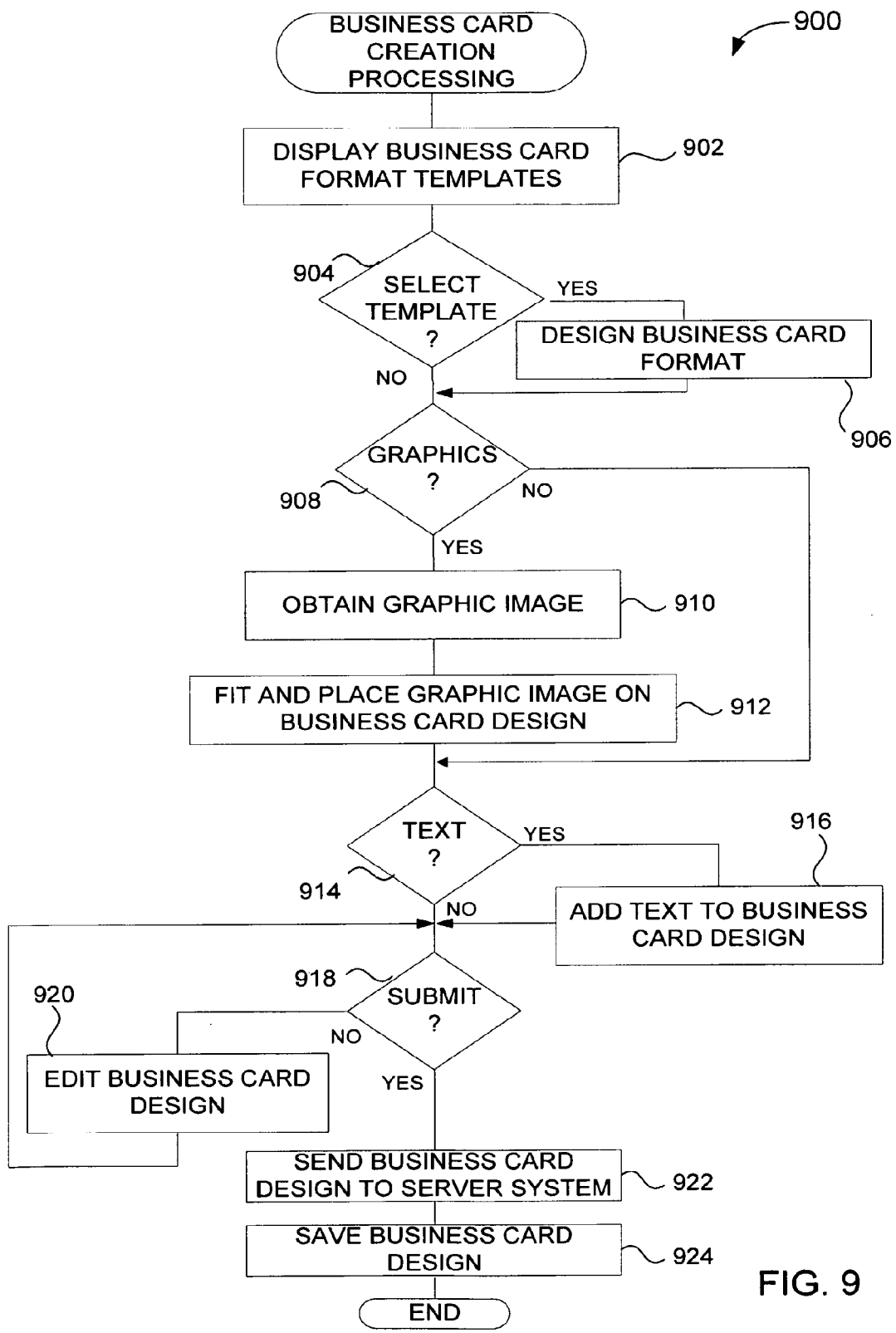
FIG. 9 is a flow diagram of business card creation processing according to an embodiment of the invention.

FIG. 9 is a flow diagram of business card creation processing 900 according to an embodiment of the invention. The business card creation processing 900 is, for example, utilized by a user of the client-side application in designing and creating a business card that would contain their profile information and be used to distribute to others in a controlled fashion.

Figure 18B:
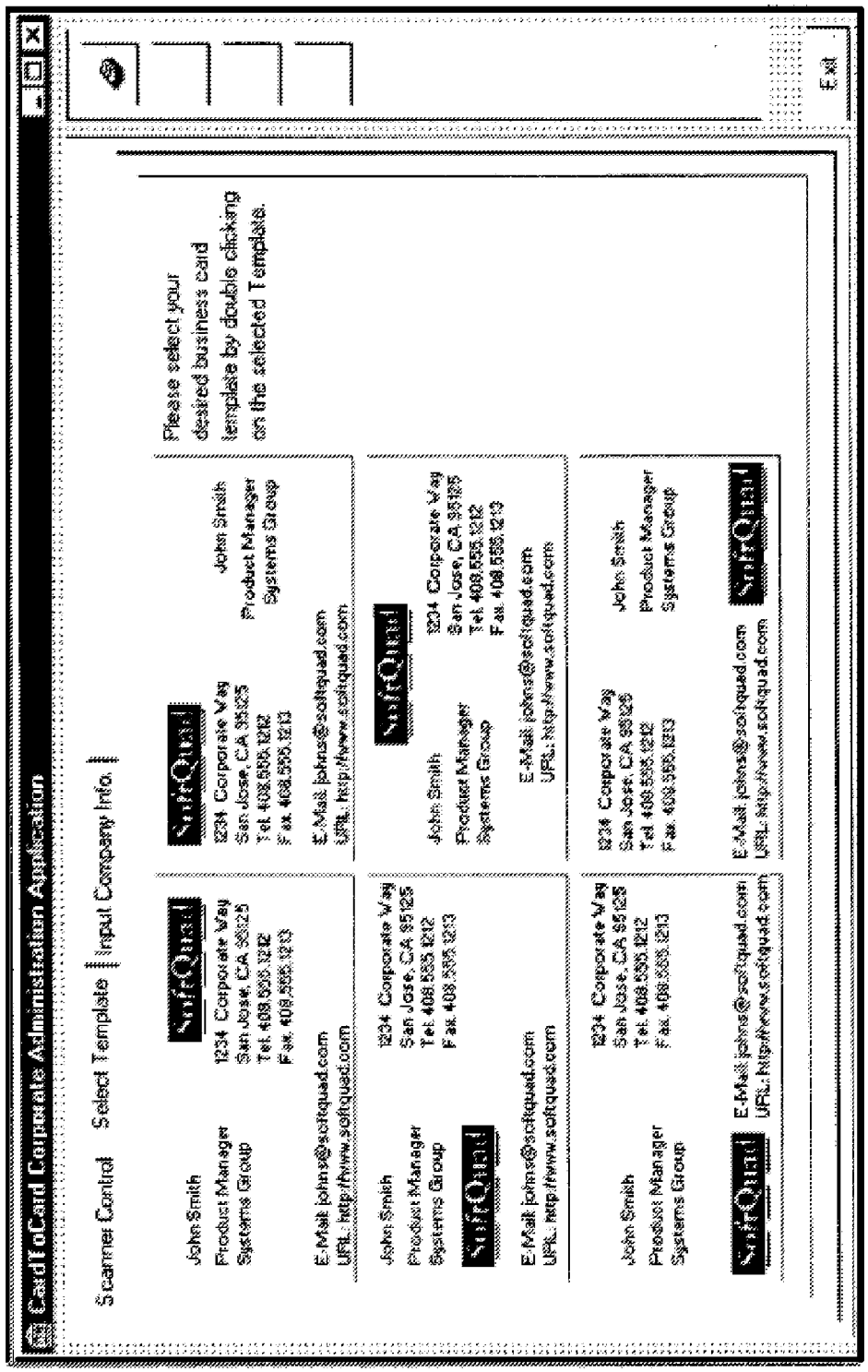

The business card creation processing 900 initially displays 902 business card format templates. FIG. 18B is a representative screen illustration showing exemplary business card format templates. A user of the client-side application at the local machine is then able to select one of the business card formats (or layouts) to be used for their business card. Hence, a decision block 904 determines whether a template has been selected. When the decision block 904 determines that a template has not been selected then, presumably, the user has decided to custom design their own business card format. In this case, the user designs 906 the business card format using conventional text and line drawing tools. Following the block 906, or directly following the decision block 904 when the user has selected a template, a decision block 908 determines whether the user desires to include graphics within their business card design. When the decision block 908 determines that graphics are to be included in the business card design, a graphic image is obtained 910. A graphic image can be obtained in a variety of ways, including scanning an image, selecting an image from pre-stored images, or otherwise importing an image. As an example, the graphic image can be a company logo or some other symbol to be provided on the business card design. Once the graphic image is obtained 910, the graphic image is fitted and placed 912 on the business card design. Following block 912, as well as following the decision block 908 when graphics are not desired, a decision block 914 determines whether additional text is desired. When the decision block 914 determines that additional text is requested, then text can be added 916 to the business card design. Again, the addition of text onto the business card design can use conventional text tools. Following block 916, as well as following the decision block 914 when additional text is not to be added, a decision block 918 determines whether the user has requested to submit their business card design. Here, a submission of the business card design means that the design is finalized and the user is ready to transmit it to the server system for subsequent use and exchange with others. When the decision block 918 determines that the user has not requested to submit the business card design, the user is able to edit 920 the business card design and make any desired changes to the design. Following block 920, the business card creation processing 900 returns to repeat the decision block 918. Once the decision block 918 determines that the user has requested to submit the business card design, the business card design is sent 922 to the server system. At the server system, the business card design will be stored so that the server system has access to the business card designs for all the users. The business card design is also saved 924 at the local machine so that it is locally available. Following block 924, the business card creation processing 900 is complete and ends. The user of the client-side application is also able to subsequently change their business card design or profile information thereon as described below.

Another feature of the client-side application is a rolodex feature. The rolodex feature allows a user of the client-side application to view the various profiles (e.g., business cards) it has received during exchanges. In addition to viewing the various profiles, the rolodex feature can be used to contact the individuals associated with the profiles. These various profiles can also be categorized, deleted, referenced and searched in a variety of ways. Additionally, when the profiles have been subsequently changed or otherwise updated, these updates can occur in a variety of different ways as discussed below.

Figure 10:
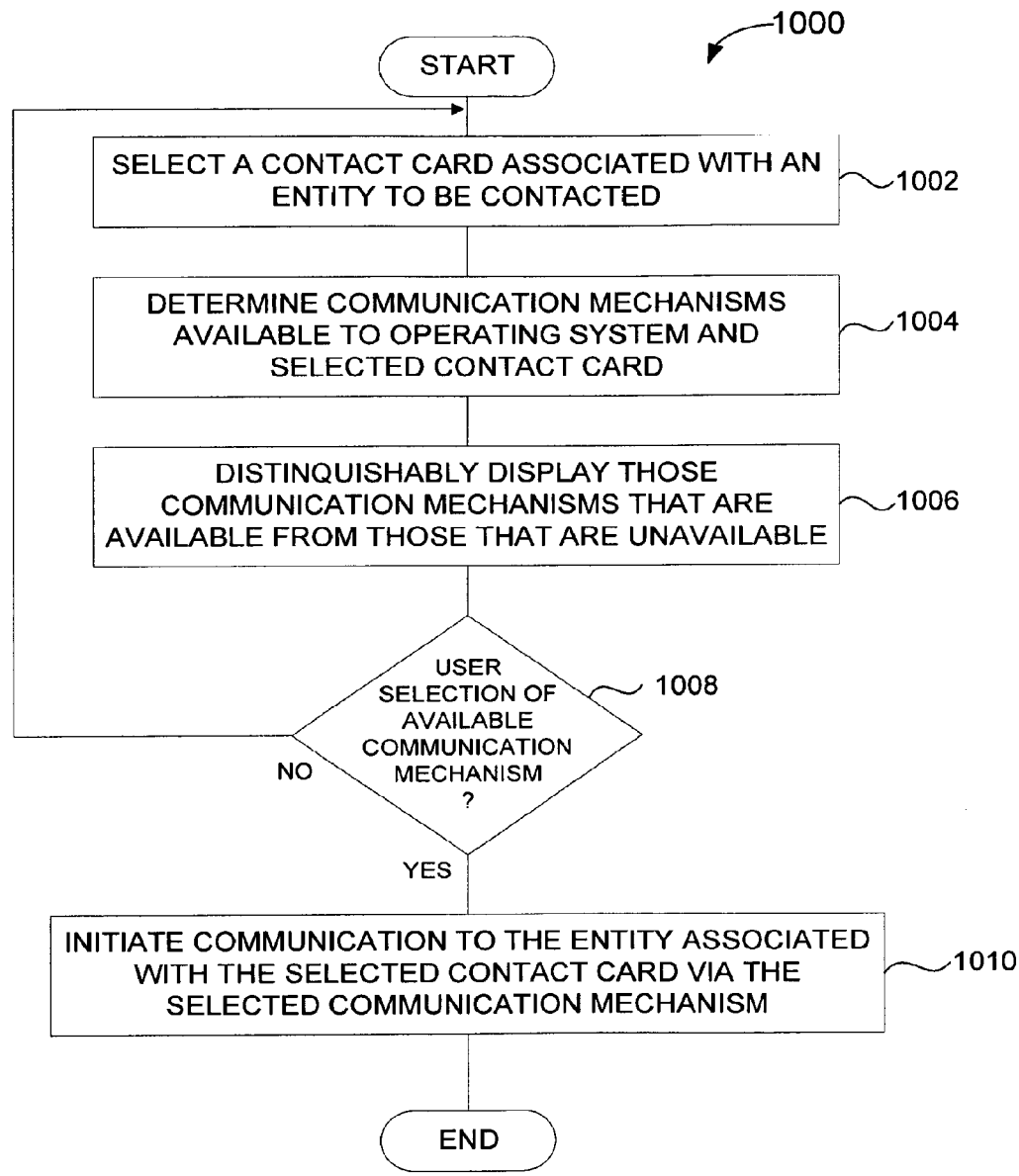
FIG. 10 is a flow diagram of rolodex processing according to an embodiment of the invention.

FIG. 10 is a flow diagram of rolodex processing 1000 according to an embodiment of the invention. The rolodex processing 1000 is performed on the client-side application. The rolodex processing 1000 initially selects a contact card associated with an entity to be contacted. The client-side application typically stores numerous contact cards. Hence, the selection may make use of some searching through the cards or placing the cards into categories to facilitate the selection of a desired one of the contact cards.

The contact card is a card that includes contact information for an entity. The entity is typically an individual, but the individual may be associated a personal side or a business side. In one embodiment, the contact card appears as a small, hand-sized electronic business card that contains contact information when displayed. Examples of the contact information (or profile information) include name, company, title, address, telephone number, facsimile number, email address, and URL.

Figure 18C:
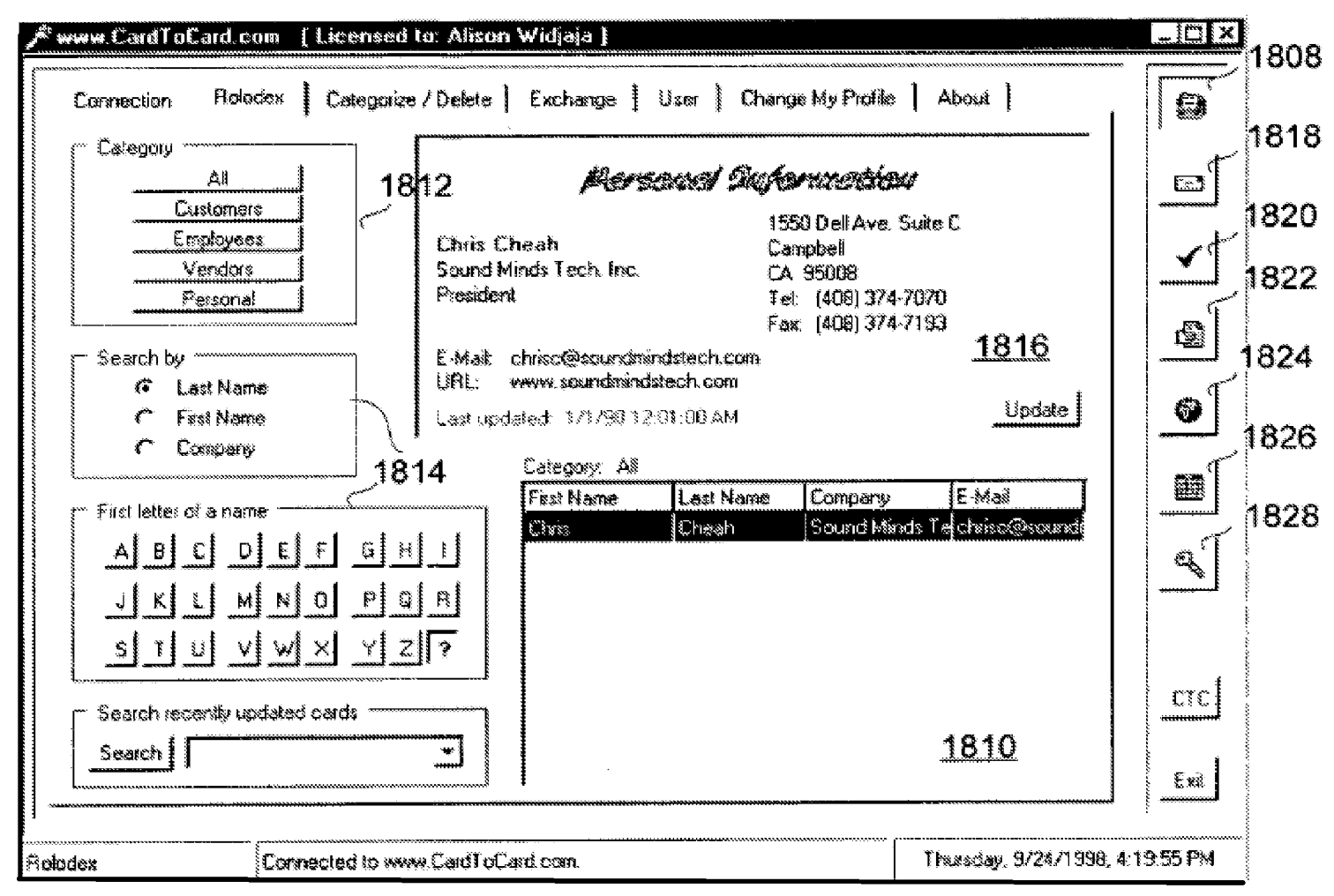

FIG. 18C is a screen illustration of a representative rolodex feature according to an embodiment of the invention. An icon 1808 is used to select the rolodex feature. In the screen illustration, the selection of the contact card is performed in contact card selection window 1810. Category area 1812 and search area 1814 are used by a user to narrow the number of possible contact cards to choose from in the contact card selection window 1810. Once the contact card is selected, the selected contact card is displayed in a card display area 1816. The card display area 1816 displays the selected contact card with its contact information. In this embodiment, the selected contact cards are all displayed in the card display area in a common format, namely, an electronic business card format.

Next, the rolodex processing 1000 determines 1004 those communication mechanisms available to the operating system and also the selected contact card. Here, the individual contact cards can control whether certain communication mechanisms are able to be used to contact the individual associated with the contact card. For example, the communication mechanisms may include telephone, facsimile, and email. Other possible communication mechanisms are video conference, on-line chat, and Internet telephony. In one embodiment, the block 1004, those communication mechanisms that the operating system can support are first determined, and then from the communication mechanisms that the operating system supports, it is determined which are permitted by the selected contact card.

In FIG. 18C, the communication mechanisms is a screen illustration of a representative rolodex feature according to an embodiment of the invention. In the screen illustration, icons 1818-1828 represent potentially available communication mechanisms for the representative rolodex feature. Following block 1004, the identified or determined communication mechanisms that are available are distinguishably displayed 1006 from those communication mechanisms that are unavailable. As an example, if the contact card specifies that facsimile and email are permitted but telephone is not permitted, then visual indicators representing the communication mechanisms associated with facsimile and email would indicate availability while the communication mechanism associated with telephone would be disabled. In one embodiment, the visual indicators representing the communication mechanisms are icons (e.g., icons 1818-1828) that are displayed by the client-side application of a display screen. These icons are then either "grayed-out" or shown as active depending upon their availability (with respect to the both the operating system and the selected contact card).

Following block 1006, a decision block 1008 determines whether a user has selected one of the available communication mechanisms. When the user has not selected one of the available communication mechanisms, then the rolodex processing 1000 is able to return to repeat the block 1002 such that the user is able to select a different contact card than the one previously selected and continue the processing. On the other hand, when the decision block 1008 determines that the user has selected one of the available communication mechanisms, the rolodex processing 1000 initiates 1010 communication to the entity associated with the selected contact card via the selected communication mechanism. For example, if the user selected the visual indicator representing the communication mechanism for email, the initiation 1010 of the email communication would present a message generation screen where a user would enter a message for the email to be sent. Thereafter, the email message would be sent to the email address associated with the selected contact card. As another example, if the user selected the visual indicator representing the communication mechanism for telephone, the initiation 1010 for the telephone communication would, for example, dial the phone number associated with the selected contacts card via computer or Internet telephony. Following block 1010, the rolodex processing 1000 is complete and ends.

Hence, the rolodex processing 1000 allows a user of the client-side application to easily and rapidly identify an entity (e.g., a person, company or group) that he/she wishes to contact (or at least reference information on the entity for other purposes). The rolodex processing 1000 additionally allows the user of the client-side application to also initiate communication with the entity associated with a selected contact card. This facilitates the ease of use of the system because the same application not only identifies the appropriate contact persons but also permits the communication to those entities in a manner in which they have previously authorized.

As noted above, a registered user can select communication mechanisms (channels) using the client-side application. However, the availability of the communication mechanisms is limited by those supported by the operating system and by those communication mechanisms that have been permitted by the associated contact information. The client-side application is able to connect to the system server by making a socket connection as is well known in the art. The communication protocol being used between the system server and the client-side application as implemented by a network interface can, for example, utilize communication protocol such as COM, CORBA, or TCP/IP. When accessing the server website through a network browser, users access the website server using HTTP requests.

Figure 11:
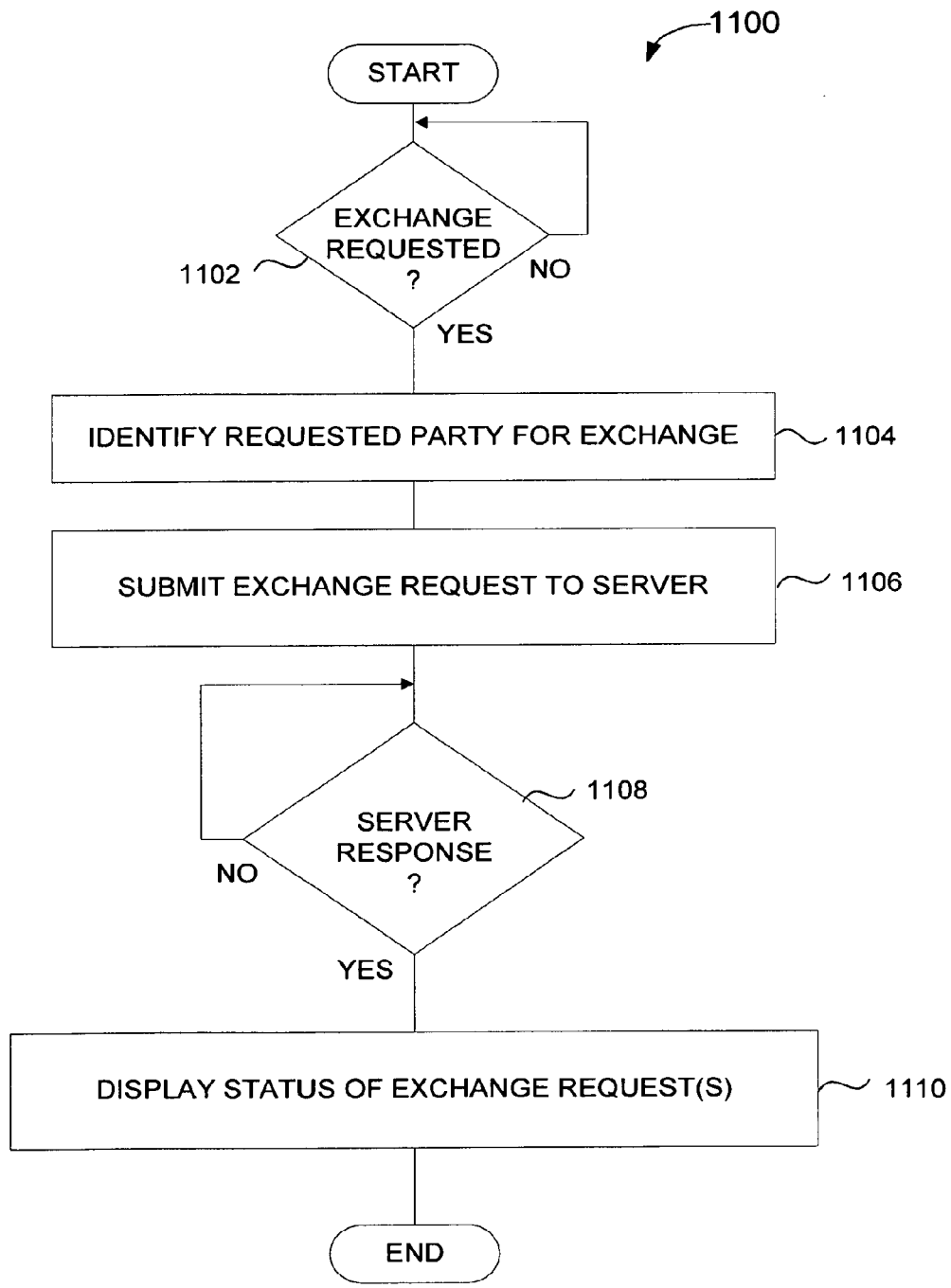
FIG. 11 is a flow diagram of requestor exchange processing according to an embodiment of the invention.

The information management and exchange system also provides for automatic distribution (e.g., exchange) of profile information between registered users in a controlled manner. The requested exchanges of profile information are made between one client-side application and another client-side application located on different local machines. These different client-side applications are utilized by different users and communicate with one another through the server system. When the requested party receives an exchange request, the requested party is able to accept or deny the exchange request. FIGS. 11-13 are provided to explain the exchange processing according to the invention.

FIG. 11 is a flow diagram of requestor exchange processing 1100 according to an embodiment of the invention. The requestor exchange processing 1100 is, for example, performed by the client-side application running on a local machine when a user of the client-side application desires to exchange contact information with another.

The requestor exchange processing 1100 begins with a decision block 1102. The decision block 1102 determines whether an exchange is requested. When the decision block 1102 determines that an exchange has not been requested, then the requestor exchange processing 1100 awaits such a request. In other words, the requestor exchange processing 1100 is not invoked until an exchange request is received.

Once an exchange has been requested, the requested party for the exchange is identified 1104. In one embodiment, the requested party with which the requestor desires to exchange profile information (e.g., business card information) is identified by first and last name as well as an email address. In other embodiments, more or less information can be used so long as the requested party is able to be determined without ambiguity. After identifying the requested party, an exchange request is submitted 1106 to the server system. The server system can then process the exchange request and inform the requestor exchange processing 1100 whether a response has been received to the exchange request. A decision block 1108 determines whether a server response has been received to the exchange request. When the decision block 1108 determines that a server response has not yet been received, the requestor exchange processing 1100 awaits the reception of such a response. Once the decision block 1108 determines that a server response has been received, the status of the exchange request is displayed 1110. As an example, the status of the exchange request can be either: accepted, waiting or denied. Often, there will be more than one exchange request pending, so that the status of each of the exchange requests are displayed 1110. Hence, the requestor is able to observe the status of the one or more uncompleted exchange requests that it has made. Following block 1110, the requestor exchange processing 1100 is complete and ends.

Figure 12A:
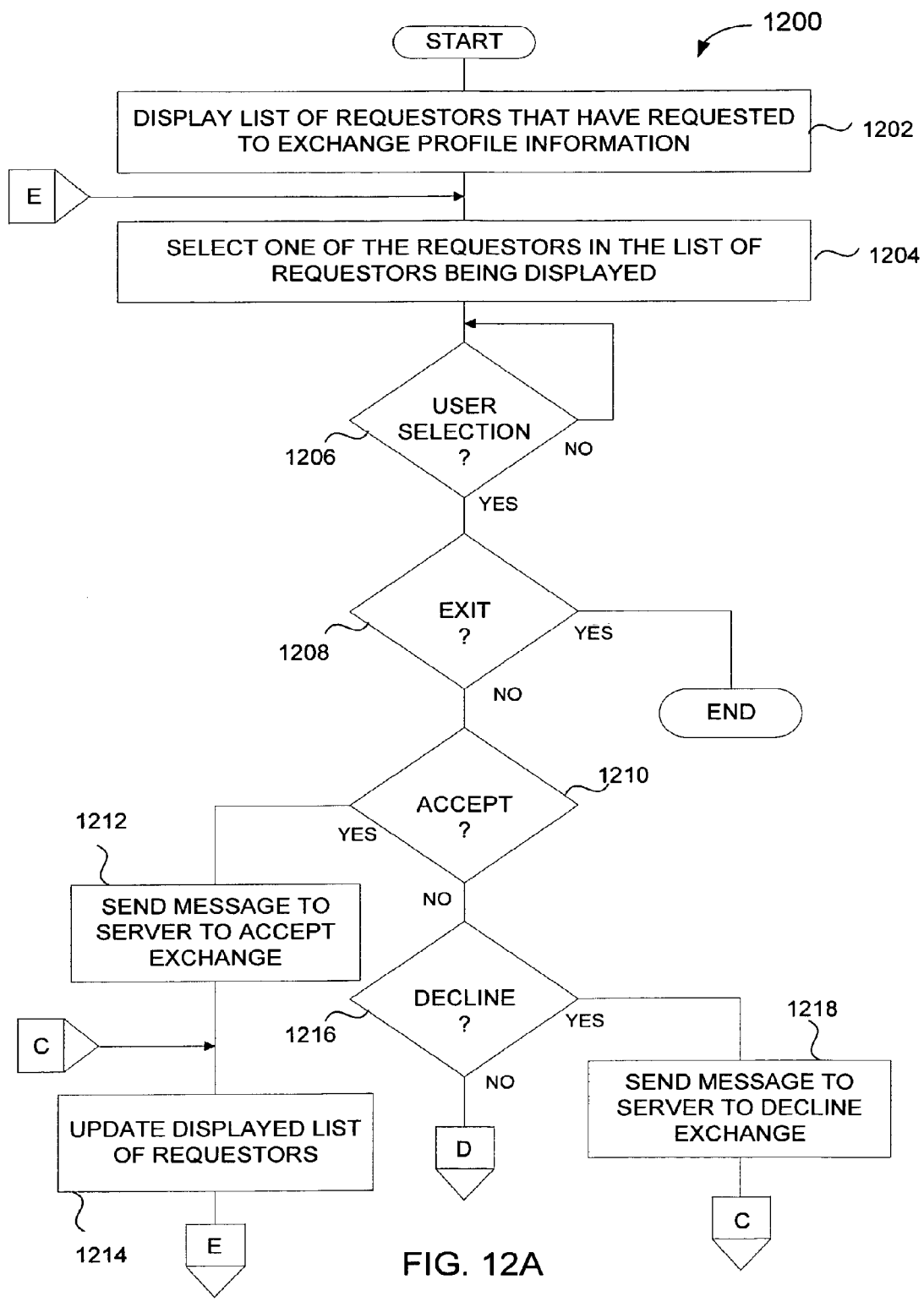
FIGS. 12A and 12B are flow diagrams of requested party exchange processing according to an embodiment of the invention.
Figure 12B:
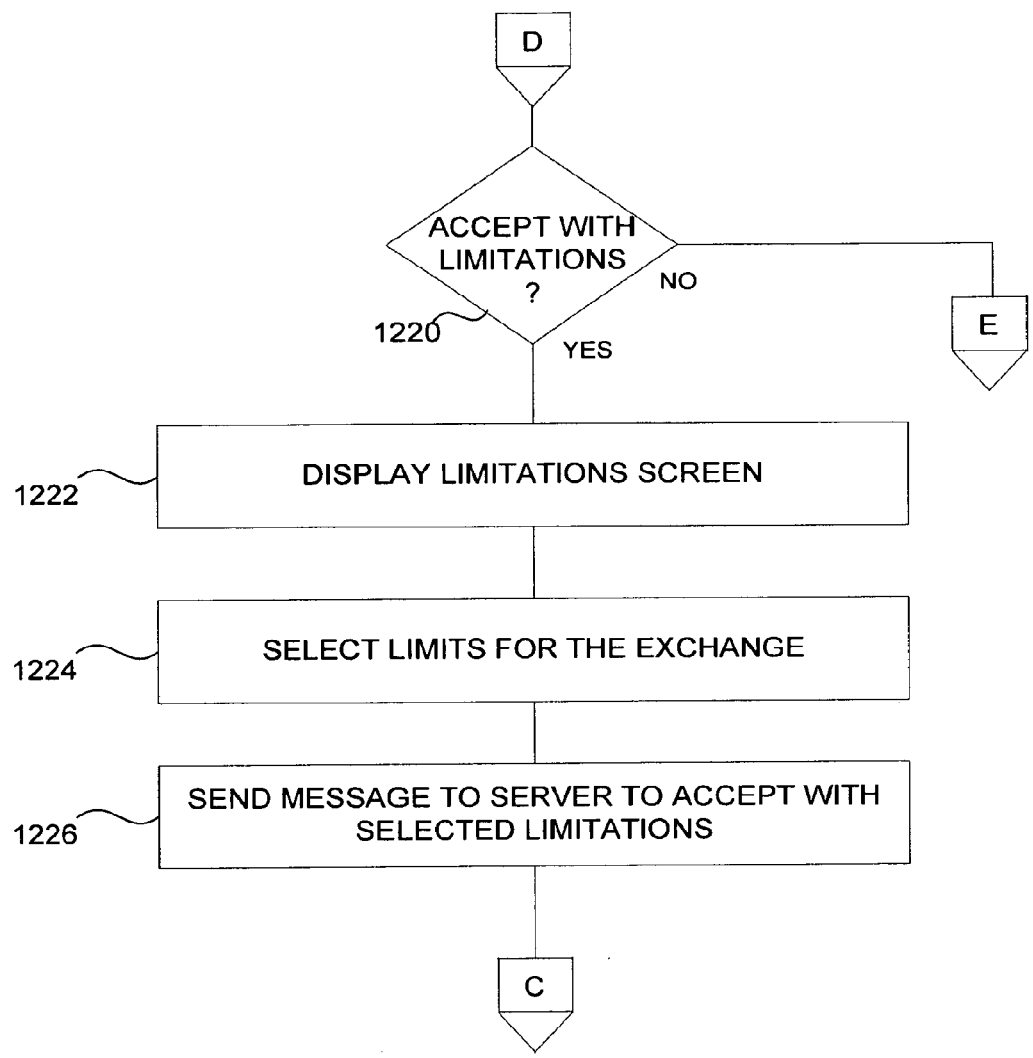
Figure 13:
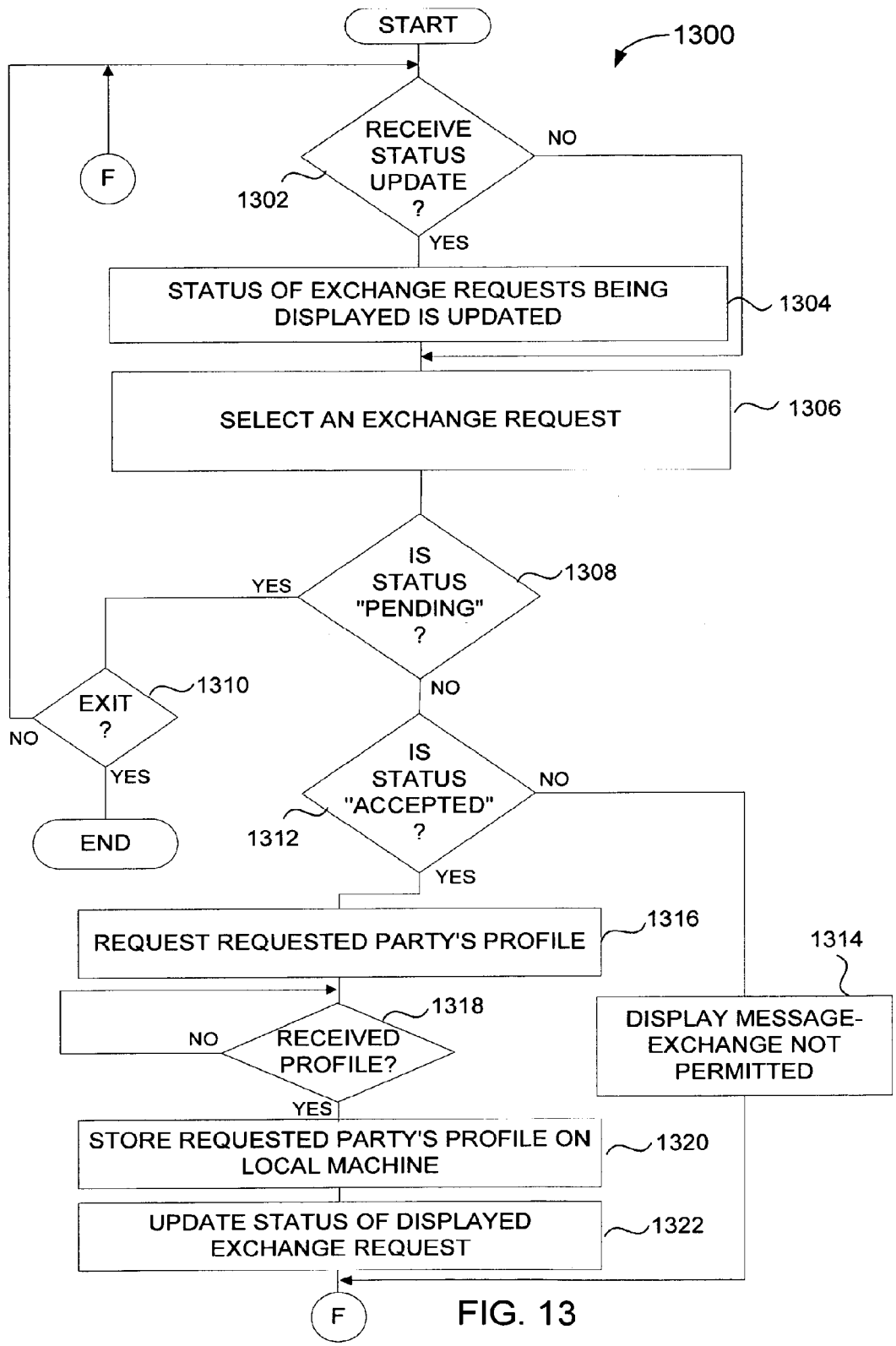
FIG. 13 is a flow diagram of requestor exchange completion processing according to an embodiment of the invention.

FIGS. 12A and 12B are flow diagrams of requested party exchange processing 1200 according to an embodiment of the invention. The requested party exchange processing 1200 is, for example, performed by the client-side application running on the local machine associated with the requested party.

The requested party exchange processing 1200 initially displays 1202 a list of requestors that have requested to exchange profile information. The requested party is then able to select 1204 one of the requestors in the list of requestors being displayed. Then, the requested party exchange processing 1200 awaits a user selection. A decision block 1206 waits for the requested party to make a user selection. Once the decision block 1206 determines that a user selection has been received, a decision block 1208 determines whether the user selection is to exit the requested party exchange processing 1200. When the decision block 1208 determines that the user selection is to exit, then the requested party exchange processing 1200 is complete and ends without having operated to accept or decline any of the requestors that have requested to exchange profile information.

When the decision block 1208 determines that the user selection is not to exit, a decision block 1210 determines whether the user selection is to accept the requested exchange by the selected requestor. When the decision block 1210 determines that the user selection is to accept the requested exchange, then a message is sent 1212 to the server system informing the server system to accept the particular exchange. Following block 1212, the displayed list of requestors is updated 1214. In one embodiment, the update to the displayed list operates to remove the selected entry in the list of the requestors being displayed. Following block 1214, the requested party exchange processing 1200 returns to repeat the block 1204 and subsequent blocks.

On the other hand, when the decision block 1210 determines that the user selection is not to accept the exchange request from the selected requestor, a decision block 1216 determines whether the user selection is to decline the exchange request from the selected requestor. When the decision block 1216 determines that the user selection is to decline the exchange request from the selected requestor, a message is sent 1218 to the server system to decline the exchange. Following block 1218, the requested party exchange processing 1200 returns to repeat the block 1214 and subsequent blocks where the list of the requestors being displayed is updated and then processing for another of the requestors can be performed.

Alternatively, when the decision block 1216 determines that the user selection is not to decline, then a decision block 1220 determines whether the user selection is to accept the exchange request with limitations. When the decision block 1220 determines that the user selection is not to accept with limitations, then the requested party exchange processing 1200 returns to repeat the block 1204 and subsequent blocks. When the decision block 1220 determines that the user selection is to accept the exchange request with limitations, a limitation screen is displayed 1222. Then, the requested party is able to select 1224 limits for the exchange. Next, a message is sent 1226 to the server system informing the server system to accept the exchange request by the selected requestor with the selected limitations. Following block 1226, the requested party exchange processing 1200 returns to repeat the block 1214 and subsequent blocks.

Once the server system is notified that a requested party has agreed to accept an exchange request, the server system operates to send a status update to the particular requestor. The status update can, for example, be forwarded to the client-side application of the requestor when next connected with the server system. The status update will update the status of the pending exchange requests of the particular requestor.

Figure 18D:
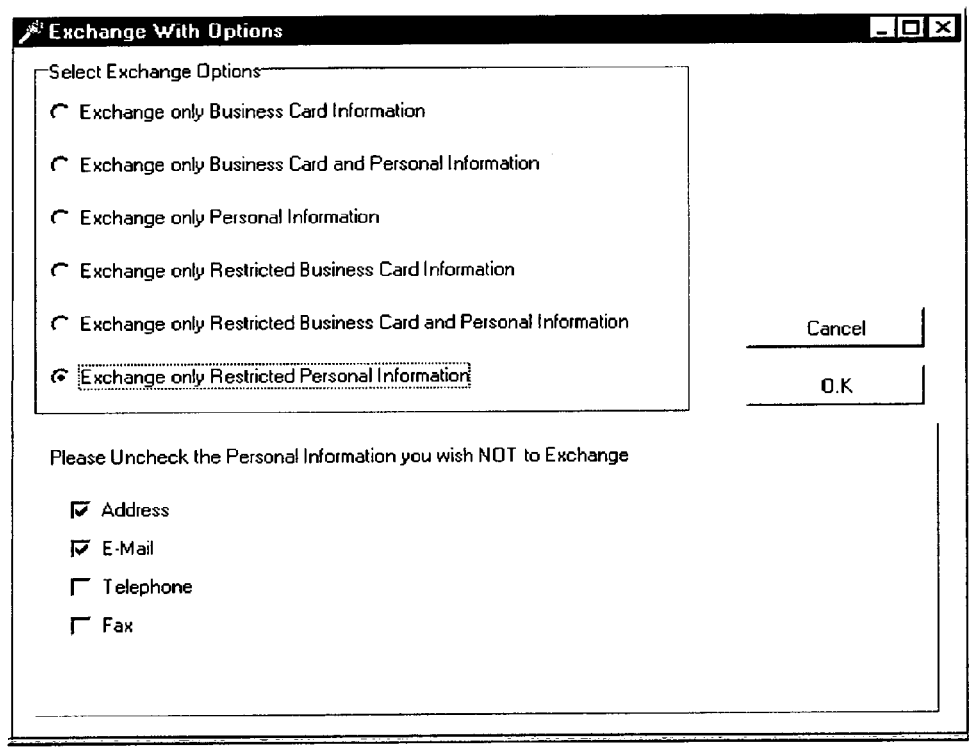

FIG. 18D is a screen illustration of a representative limitations screen according to an embodiment of the invention in which various exchange options can be selected (block 1222). In the screen illustration, the requested party is accepting the request to exchange profile information with the limitations that only the restricted personal information of address and email (as well as name) are permitted to be exchanged. Other limitations screens can be used.

Further, the users could process the limitations of exchanges by categorizing the requestors into groups. Exemplary groups are family, business associates, and friends.

Each of the groups would have the exchange settings set based on the type of group. For example, family might be exchanged without limitations, friends might be exchanged with minor limitations, and business associates might have more limitations. Then, when accepting an exchange request, the requested party simply selects the appropriate for the requestor and the limitations on the exchange are thereby determined.

Additional modification to the requested party exchange processing can limit the number of requests for exchanging information a requested party has to respond to. One approach is for the requested party to set a preference that a password be required to be entered by a requestor of an exchange. Here, upon submitting a request for exchange, the server would determine that the requested party has required a particular password in order to permit such requests. Hence, the server would cause the client-side application to query the requestor to enter the password. If the requestor enters the correct password, then the server forwards the request to the requested party. On the other hand, if the requestor fails to enter the correct password, the request is never sent to the requested party. This approach is, for example, suitable for a requested party that wants to limit the exchanges to persons it has provided the password.

Figure 18E:
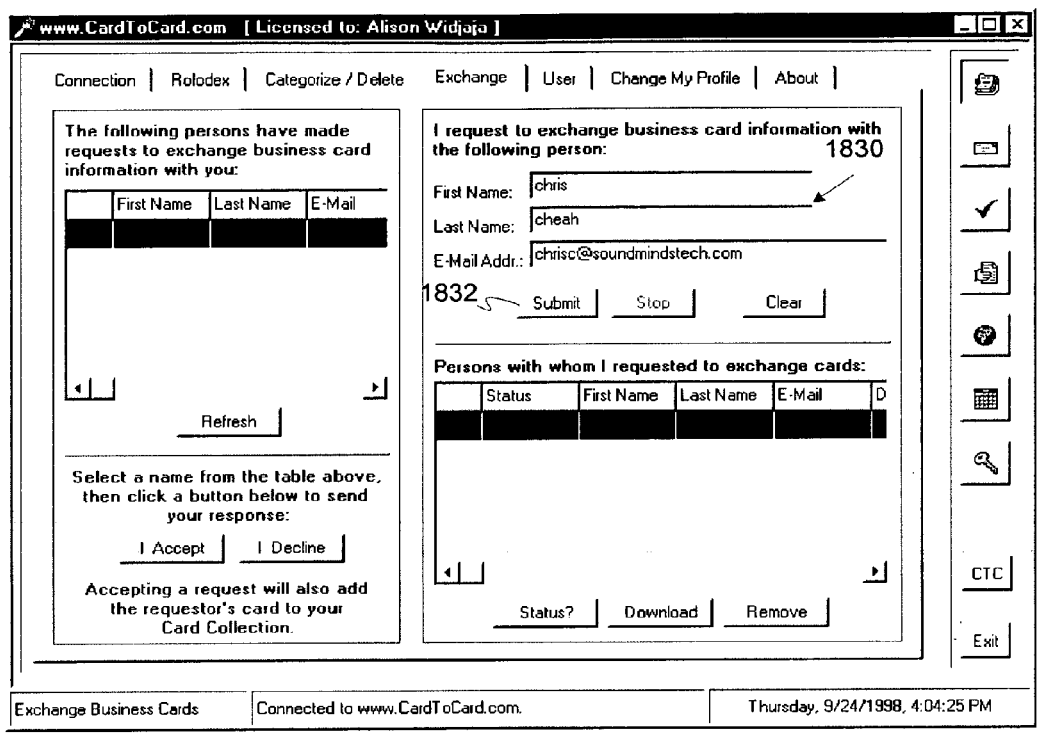
Figure 18F:
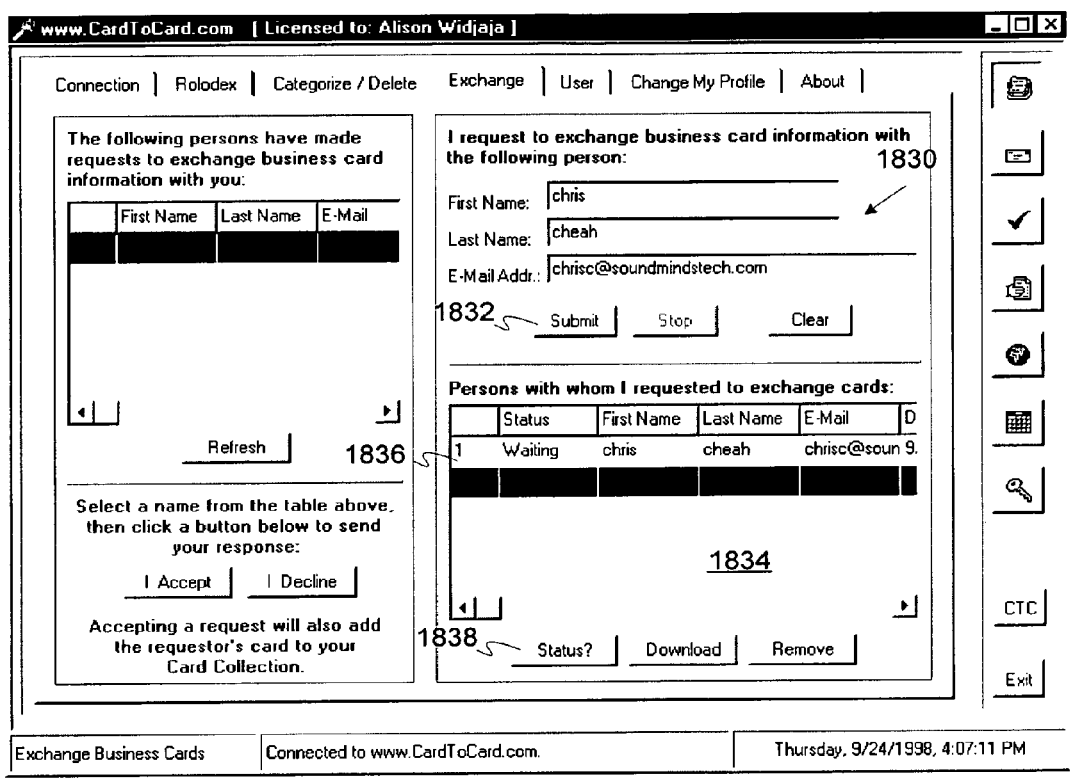
Figure 18G:
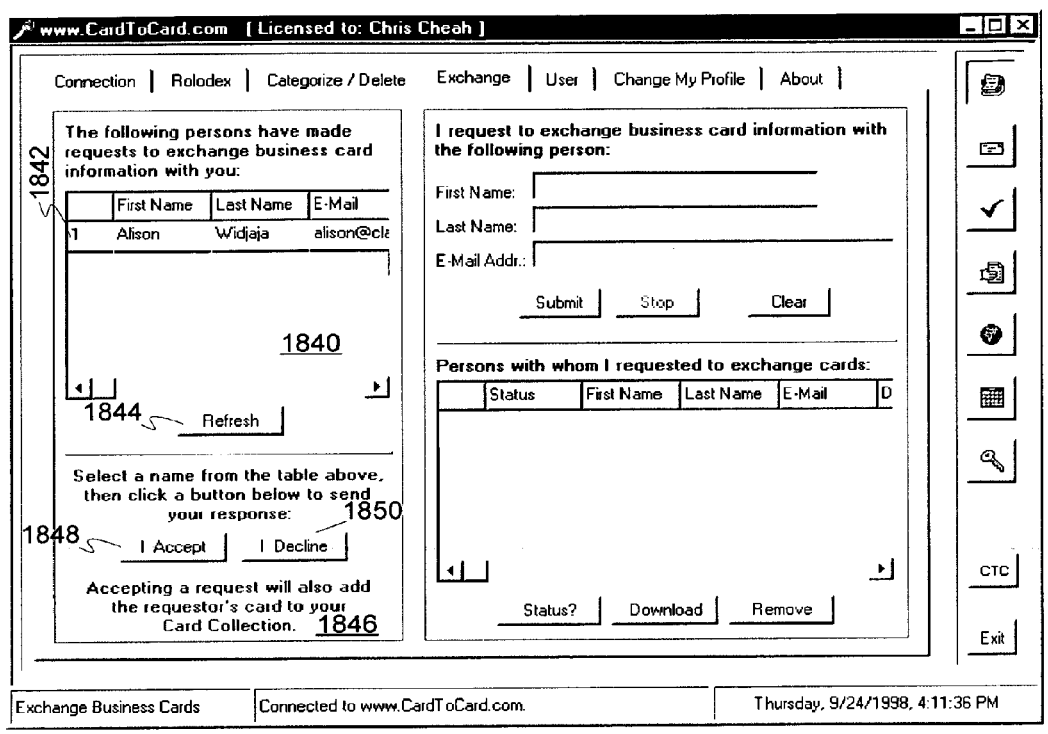
Figure 18H:
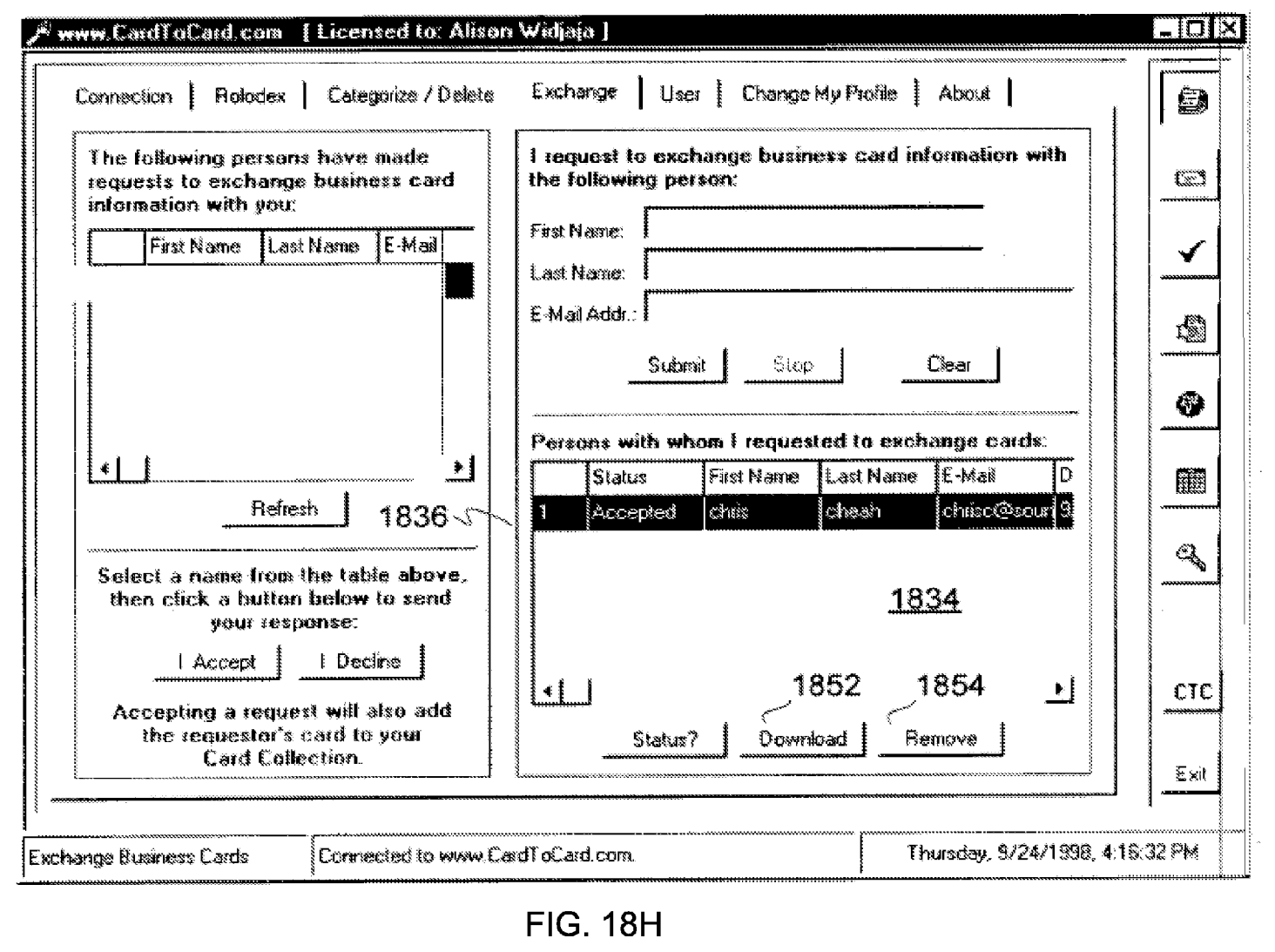
Figure 18I:
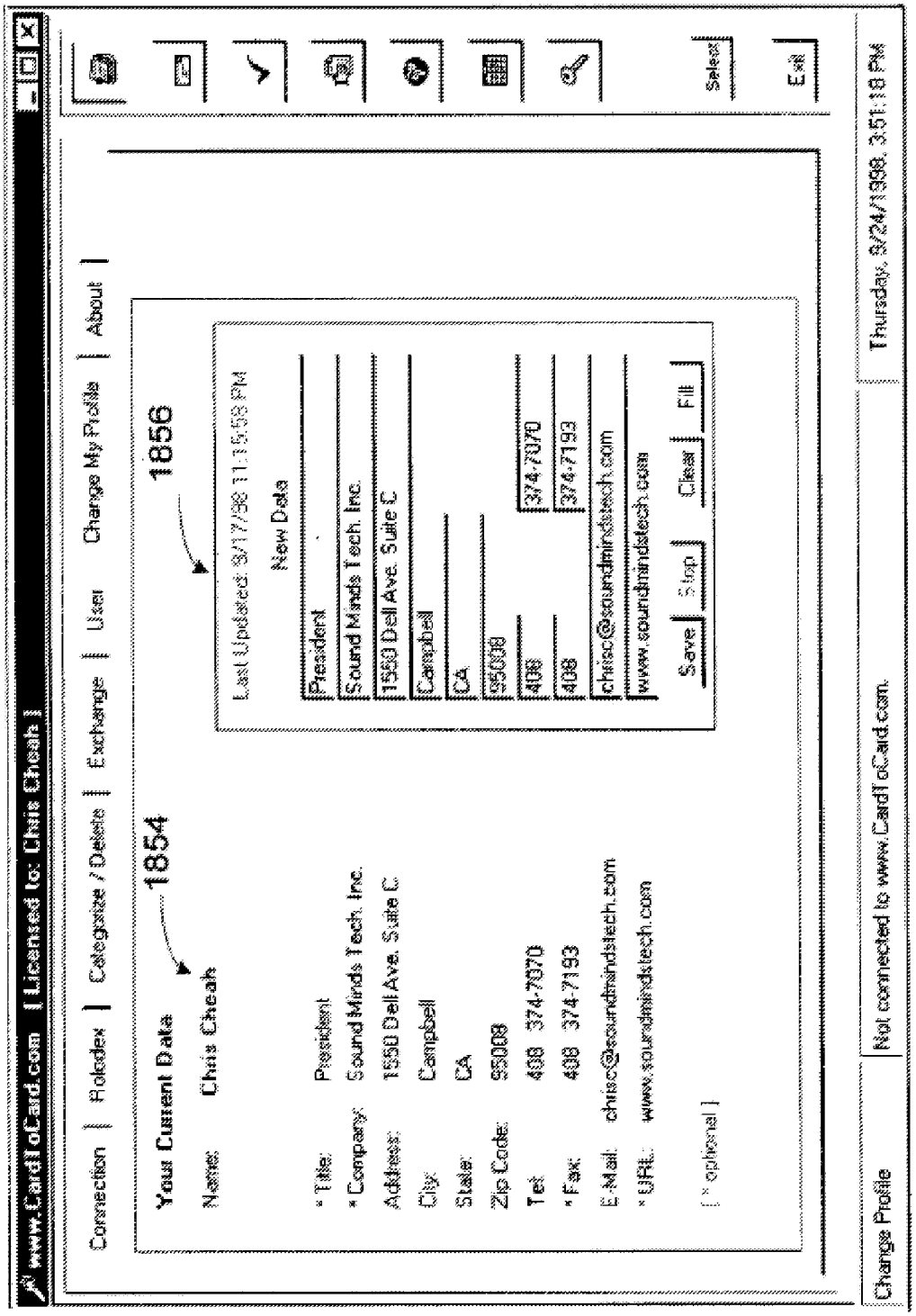
Figure 18J:
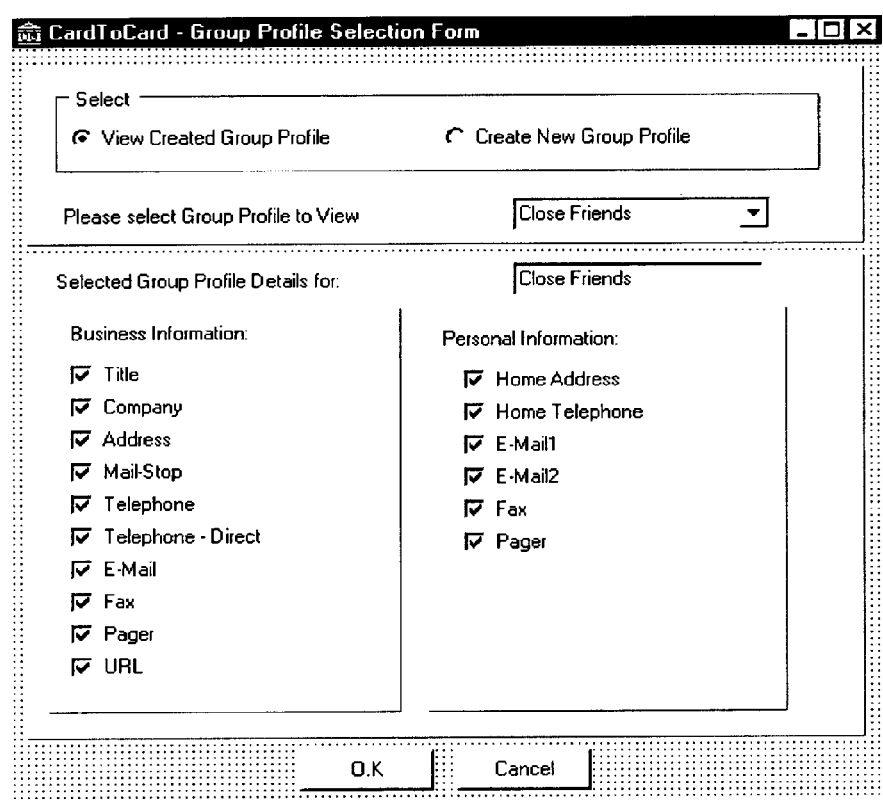

FIG. 18J is a screen illustration of a representative limitations screen according to an embodiment of the invention in which various exchange options can be selected based on groups. The client-side application enables the user to profile himself with information ranging from business to personal information. Because of the nature of contacts, such information may not be equally shared with all contacts. Therefore, the client-side application can allow a user to create different groups of contacts, each with a list of user selectable exchange options for that group profile. For example, a user may create a Business Group that contains only Business information and another group called Close Friends that contains both Business and Personal information. FIG. 18J, for example, illustrates the user exchange selections being made for the group denoted Close Friends. Thereafter, whenever a request for contact information is received by the user, the user is free to select that particular profile group that the requestor should be designated. The profile information related to the selected group can then be sent to the system server together with the permission to distribute (or exchange). The system server then deliver the appropriate profile information to the requestor. As noted above, a password control option can also be implemented. The password control can be associated with the definition of the group profiles. For example, if the user is well known in her industry, she can be given the option of picking a password such that when a request for contact information arrives at the server system, the server system will first ask the requestors to provide the password. If the requestor does not enter the correct password, no request (e.g., exchange request) is forwarded to the user. The password option would allows for increased privacy and reduction in unwanted requests (e.g., spam).

Another approach is for the requested party to pre-approve exchange requests. For example, a sales person often wants a wide distribution of their contact information to anyone willing to accept it. Hence, by pre-authorizing such exchanges of such business information, the sales person need not individually approve the exchange requests.

FIG. 13 is a flow diagram of requestor exchange completion processing 1300 according to an embodiment of the invention. The requestor exchange completion processing 1300 is, for example, performed by the client-side application running on the local machine associated with the requestor.

The requestor exchange completion processing 1300 begins with a decision block 1302. The decision block 1302 determines whether a status update has been received. Here, the status update is supplied by the server system to the client-application running on the local machine. When the decision block 1302 determines that a status update has been received, the status of the one or more exchange requests being displayed are updated 1304 in accordance with the status update. Otherwise, when the decision block 1302 determines that status update has not been received, the block 1304 is bypassed and the client-side application may otherwise operate to display the previous status of the one or more exchange requests. In any case, once the one or more exchange requests are displayed and updated as appropriate, the requestor is able to select 1306 one of the exchange requests.

A decision block 1308 then determines whether the status of the selected exchange request is "pending". When the decision block 1308 determines that the status of the selected exchange request is "pending", then a decision block 1310 determines whether the requestor desires to exit the requestor exchange completion processing 1300. When the decision block 1310 determines that the user does desire to exit, then the requestor exchange completion processing 1300 is complete and ends. On the other hand, when the decision block 1310 determines that the user does not desire to exit, then the requestor exchange completion processing 1300 returns to repeat the decision block 1302 and subsequent blocks.

Alternatively, when the decision block 1308 determines that the status of the selected exchange request is not "pending", then a decision block 1312 determines whether the status of the selected exchange request is "accepted". When the decision block 1312 determines that the status of the selected exchange request is not "accepted", then a message indicating that the exchange is not permitted is displayed 1314. In this case, the status of the selected exchange request is "denied". Hence, following block 1314, the requestor exchange completion processing 1300 returns to repeat the decision block 1302 without completing the selected exchange request.

On the other hand, when the decision block 1312 determines that the status of the selected exchange request is "accepted", then the requested party's profile is requested 1316 from the server system. Then, a decision block 1318 determines whether the requested profile has been received. The decision block 1318 causes the requestor exchange completion processing 1300 to await the arrival of the requested party's profile. Once the requested party's profile has been received, the requested party's profile is stored 1320 on the local machine. At this point, the requested party's profile (e.g., business card) is stored on the local machine and therefore available to the rolodex feature and thus available to the client-side application program. The status of the displayed exchange request is also updated 1322. Namely, the entry in the list of the displayed exchange requests that are pending can be removed since the exchange of profile information has been completed. Following block 1322, the requestor exchange completion processing 1300 returns to repeat the decision block 1302.

Figure 14:
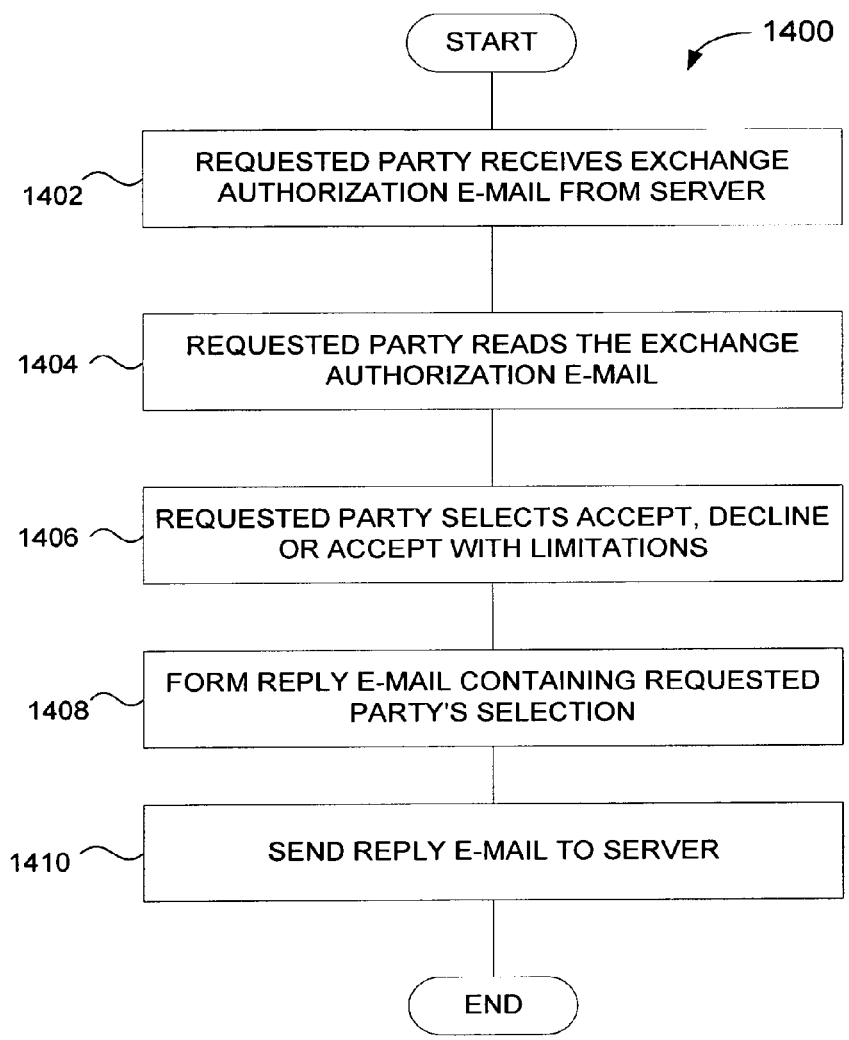
FIG. 14 is a flow diagram of requested party exchange processing through electronic email according to an embodiment of the invention.

As discussed above with respect to FIGS. 12A and 12B, the requested party exchange processing 1200 can be performed via the client-side application. In which case, the requested party can choose to accept, decline or accept with limitations each of the particular requests for exchange of profile information. An alternative approach is for the requested party to perform similar actions upon receiving an email message from the system server. FIG. 14 is a flow diagram of requested party exchange processing 1400 through electronic email according to an embodiment of the invention. The requested party exchange processing 1400 begins when the requested party receives 1402 an exchange authorization email from the system server. The requested party then reads 1404 the exchange authorization email and decides how to respond to it with respect to a particular authorization type. Then, the requested party selects 1406 one of accept, decline or accept with limitations. An email reply is formed 1408 containing the requested party's authorization selection. The reply email is then sent 1410 to the system server. Following block 1410, the requested party exchange processing 1400 is complete and ends. For each exchange request, the server system would cause an exchange authorization email to be sent to the appropriate requested party in the manner discussed above.

FIGS. 18E-18H are screen illustrations of representative screens provided to users during the exchange processing pertaining to FIGS. 11-13 according to an embodiment of the invention. FIG. 18E illustrates a representative exchange screen in which a requestor identifies (block 1104) the requested party they desire to exchange profile information with. Specifically, a requested party identification area 1830 is provided on the representative exchange screen and the requestor enters the identifying information (e.g., first name, last name, and email address). To submit (block 1106) the exchange request to the system server, the requestor selects a submit button 1832. FIG. 18F illustrates a representative exchange screen in which an exchange status area 1834 displays the status of those exchanges that the requestor has requested and which are in process (block 1110). Here, an entry 1836 in the exchange status area 1834 indicates that currently a single exchange request (the one just submitted) is "waiting". To refresh the status information provided in the exchange status area 1834 a status button 1838 can be depressed. Alternatively, the server system could refresh the status information as desired when the requestor is connected to the server system. FIG. 18G illustrates a representative exchange screen for the requested party of the exchange request. The representative exchange screen for the requested party includes a requested exchange area 1840. In this example, the requested exchange area 1840 includes an entry 1842 that indicates that a particular requestor has submitted a request to exchange profile information with the requested party (block 1202). The particular requestor is identified by the entry 1842 (e.g., first name, last name, and email address). To refresh the requested exchange area 1840 a refresh button 1844 can be depressed. Upon selecting the entry 1842 in the requested exchange area 1840, the requested party then decides whether to accept or decline the request. A authorization area 1846 on the representative exchange screen of FIG. 18G includes an accept button 1848 and a decline button 1850. The requested party selects the accept button 1848 to permit the requested exchange (block 1210), and selects the decline button 1850 to deny the requested exchange (block 1216). In another embodiment, a third button can be provided to accept with limitations, where the limitations are provided by a limitations screen such as shown in FIG. 18D. Finally, FIG. 18H illustrates a representative exchange screen for the requested party in which the exchange status area 1834 has been updated (block 1304) after the requested party has authorized the requested exchange. Namely, displayed status of the outstanding exchange that the requestor has requested (the entry 1836) is now "accepted". At this point, the requestor can depress a download button 1852 to complete the exchange request by causing the requested profile of the requested party to be received at the local machine of the requestor (block 1316). Alternatively, if the requestor should change their mind and no longer desire the exchange, then the requestor can depress a remove button 1854 to cancel the exchange request.

During the registration process, a user or registrant will enter his/her contact or profile information. However, if at any time after registering the registrant desires to change their profile information, the client-side application facilitates such modifications. Additionally, the updated profile will be able to be automatically distributed to all of those registered users that have previously received the profile that has now been updated.

Figure 15:
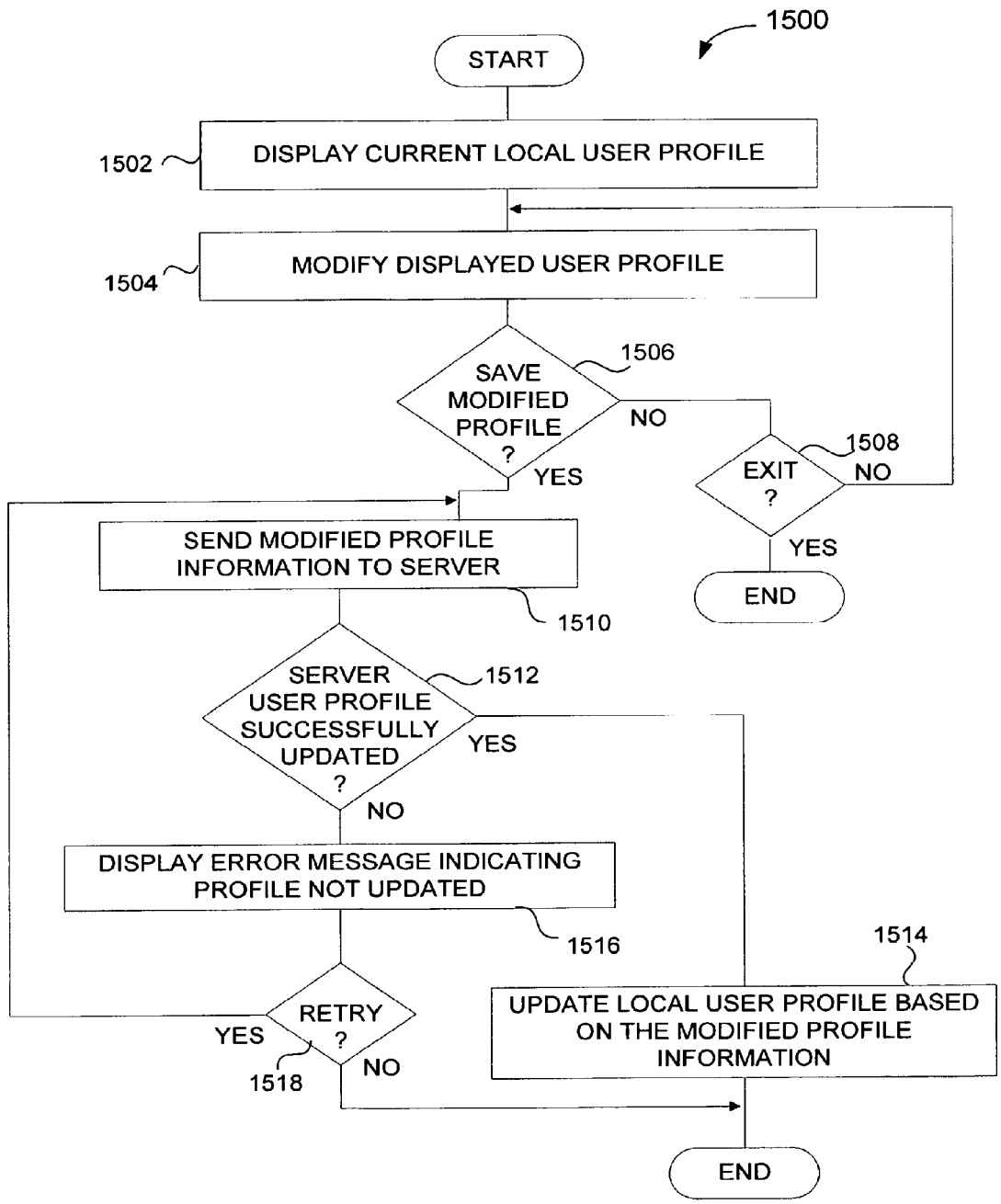
FIG. 15 is a flow diagram of change profile processing according to an embodiment of the invention.

FIG. 15 is a flow diagram of change profile processing 1500 according to an embodiment of the invention. The change profile processing 1500 is, for example, performed by the client-side application on the local machine.

The change profile processing 1500 initially displays 1502 a current local user profile. The user of the local machine can then determine how to modify the current local user profile. The displayed user profile is then modified 1504. The use is able to modify any of the information forming part of the profile that they previously provided.

FIG. 18I illustrates a representative update profile screen that can be displayed by the client-side application (block 1502). The representative update profile screen includes a current profile data section 1854 that displays current data, and a new profile data section 1856 where the user can enter the modifications to the profile (block 1504).

Following block 1504, a decision block 1506 determines whether the user has requested to save the modified profile. When the user does not wish to save the modified profile, then a decision block 1508 determines whether an exit is being requested. When the decision block 1508 determines that an exit is requested, then the change profile processing 1500 is complete and ends without modifying the user profile. On the other hand, when the decision block 1508 determines that the user is not requesting an exit, then the processing returns to repeat the block 1504 and subsequent blocks so that additional modifications can be made to the displayed user profile.

Alternatively, when the decision block 1506 determines that the modified profile is to be saved, then the modified profile information is sent 1510 to the server system. Then, a decision block 1512 determines whether the server user profile has been successfully updated in accordance with the modified profile information that was sent 1510 to the system server. When the decision block 1512 determines that the server user profile has been successfully updated, then the local user profile is updated 1514 based on the modified profile information. At this point, the appropriate user profile has been updated on both the system server and the local machine. Following block 1514, the change profile processing 1500 is complete and ends.

On the other hand, when the decision block 1512 determines that the server user profile has not been successfully updated, an error message is displayed 1516 on the display screen of the local machine to indicate that the profile has not been updated. Then, a decision block 1518 determines whether a retry is desired. When a retry of the update to the user profile is requested, the change profile processing 1500 returns to repeat the block 1510 and subsequent blocks. Alternatively, when the decision block 1518 determines that a retry is not desired, then the change profile processing 1500 is complete and ends without having updated the user profile.

In FIG. 15, the user profile was updated by way of the client-side application running on the local machine. However, an alternative approach would allow a registrant to modify his/her user profile using the server website associated with the information management and exchange system. In such a case, the user at the local machine could use a network browser (e.g., web browser) to access the server website. Then, the user could sufficiently identify him/herself to the server website (such as with his/her name and PID and possibly password). Once identified to the server website, the current user profile would then be displayed and the user would be allowed to modify and submit the modified user profile to the system server.

Figure 16:
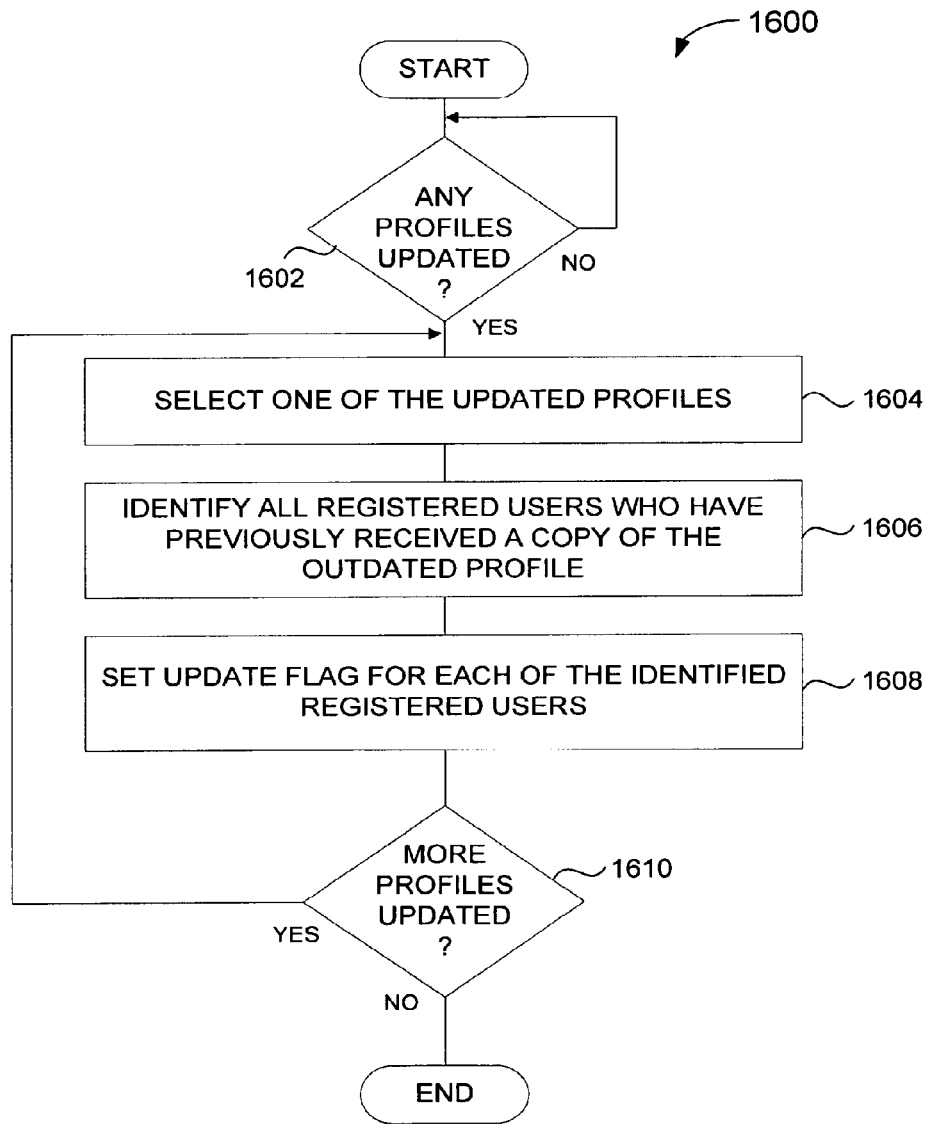
FIG. 16 is a flow diagram of update profile processing.
Figure 17:
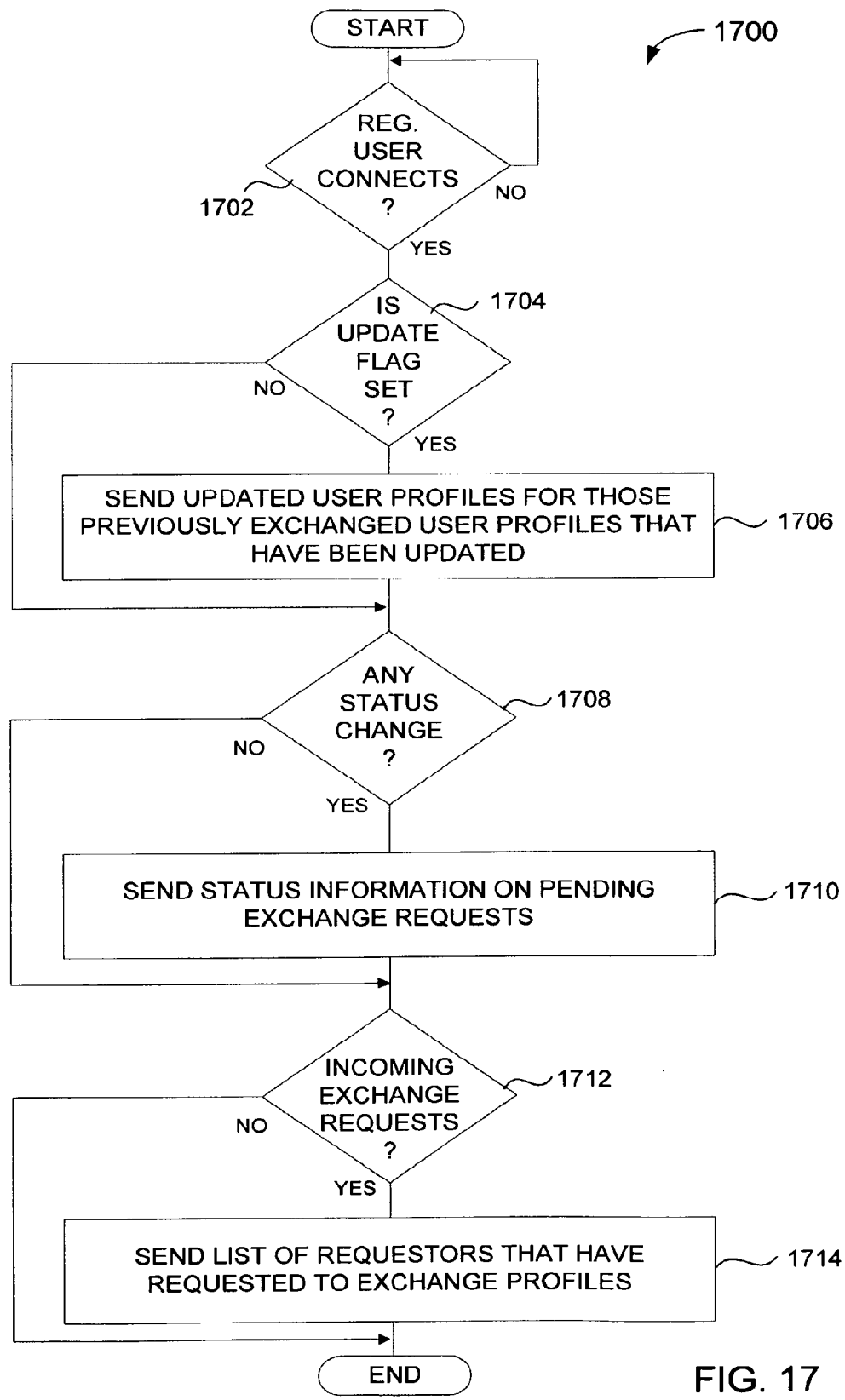
FIG. 17 is a flow diagram of initial server connection processing according to an embodiment of the invention.

At this point, the user profiles that have been modified are stored on the system server, but the outdated user profiles that have been previously exchanged with other registered users remain out of date. FIGS. 16 and 17 described below indicate one embodiment for updating the user profiles that have been previously exchanged in an automated fashion.

FIG. 16 is a flow diagram of update profile processing 1600. The update profile processing 1600 is performed on the system server. The update profile processing 1600 can be initiated every time a modified user profile is submitted to the system server or can periodically operate on the system server. As illustrated in FIG. 16, the update profile processing 1600 initially begins with a decision block 1602 that determines whether any profiles have been updated. When there are no profiles that have been updated, the update profile processing is not invoked. However, when the decision block 1602 determines that one or more profiles have been updated on the system server, then the update profile processing 1600 is invoked.

Once the update profile processing 1600 is invoked, one of the updated profiles is selected 1604. Then, all registered users who have previously received a copy of the outdated profile are identified 1606. As an example, the user profiles can be stored in the server contact information storage 216 such that each registrant is stored in a database along with a list of those registered users that previously obtained a copy of the now outdated profile. Next, an update flag is set 1608 for each of the identified registered users. For each registrant, the update flag indicates that one or more of the user profiles it has stored locally needs to be updated. This update flag will be used to subsequently update the user profiles stored on the local machine.

A decision block 1610 then determines whether there are more profiles to be updated. When the decision block 1610 determines that there are more profiles to be updated, then the update profile processing 1600 returns to repeat the block 1604 and subsequent blocks. On the other hand, when the decision block 1610 determines that there are no more profiles to be updated, then the update profile processing 1600 is complete and ends.

FIG. 17 is a flow diagram of initial server connection processing 1700 according to an embodiment of the invention. The initial server connection processing 1700 is, for example, performed by the server system. The initial server connection processing 1700 communicates with the local machines to manage profile updates and exchange requests.

The initial server connection processing 1700 is invoked when a user of the client-side application connects to the system server. A decision block 1702 determines whether a registered user has connected. When the decision block 1702 determines that a registered user has not connected, then the initial server connection processing 1700 is not invoked. Once a registered user has connected to the system server, the initial server connection processing 1700 is invoked.

When the initial server connection processing 1700 begins, a decision block 1704 determines whether an update flag is set. The update flag for the various registrants is set in block 1608 of FIG. 16 to signal that one or more user profiles that have previously been exchanged have been modified. Hence, the decision block 1704 determines whether the registrant that has connected to the system server needs to be sent user profiles that have been modified. When the decision block 1704 determines that the update flag is set, then updated user profiles for those previously exchanged user profiles that have been updated are sent 1706. On the other hand, when the decision block 1704 determines that the update flag is not set, then block 1706 is bypassed because the user profiles that have been exchange with the registrant have not been modified.

In an alternative embodiment, instead of sending 1706 the updated user profiles, the server system could merely send an update notification to the client-application of the local machine that there are updated profiles to be delivered. This approach allows the user to decide if and when the updated user profiles are to be sent. In one implementation, the update notification could display a flashing update indicator to signal the user that updated profiles are waiting to be delivered. For example, in FIG. 19A, an indicator 1912 can be used to signal the user of the client-side application when updates are waiting. In another implementation, the update notification could display the names of the registrants having the updated profiles that are waiting to be delivered. As an example, in FIG. 19A, an update button 1914 is then available for the user to depress when the user desires to receive the updates. In still another implementation, the server system could resend all of the user profiles that have been previously exchanged with the registrant; however, such an approach would be less efficient.

Following block 1706, as well as following the decision block 1704 when the update flag is not set, a decision block 1708 determines whether there has been a status change. The status change pertains to the status of pending exchange requests which the registrant that has connected to the system server has previously requested. When the decision block 1708 determines that there have been status changes, then status information on the pending exchange requests is sent 1710 to the local machine. This status information is, for example, used in the block 1110 of FIG. 11 where the status of the one or more pending exchange requests is displayed. Alternatively, when the decision block 1708 determines that there has been no status change, then the block 1710 is bypassed.

Following the block 1710, as well as following the decision block 1708 when there has been no status change, a decision block 1712 determines whether there are any incoming exchange requests. The incoming exchange requests are those exchange requests in which the registrant that has connected to the system server is the requested party. When the decision block 1712 determines that there are incoming exchange requests, a list of requestors that have requested to exchange profiles is sent 1714 to the local machine associated with the registrant that has connected to the server system. As noted above, the list of requestors is displayed to the registrant so that the requested party exchange processing can be performed as shown in FIGS. 12A and 12B. When the decision block 1712 determines that there are no incoming exchange requests, then the block 1714 is bypassed. Following block 1714, as well as following the decision block 1712 when there are no incoming exchange requests, the initial server connection processing 1700 is complete and ends.

Previously, as discussed above, the contact information provided by a user was self-representative by the user. The self-representative nature of the contact information means that the user is able to claim association with any organization or no organization at all. However, in some cases, some or all of the contact information is not set by the user but is instead set and controlled by an administrator of an entity.

It is not uncommon for an individual to desire to have multiple representations depending upon the particular setting in which he/she is operating. For example, an individual may have a personal setting in which he/she wishes to distribute contact information, may also have a small business in which he/she operates, and may further be associated with a corporation of which he/she is an employee and thus be associated with contact information associated with the corporation. Hence, the information and exchange system allows a user to create multiple profiles of him/herself using the same client-side application.

Figure 18K:
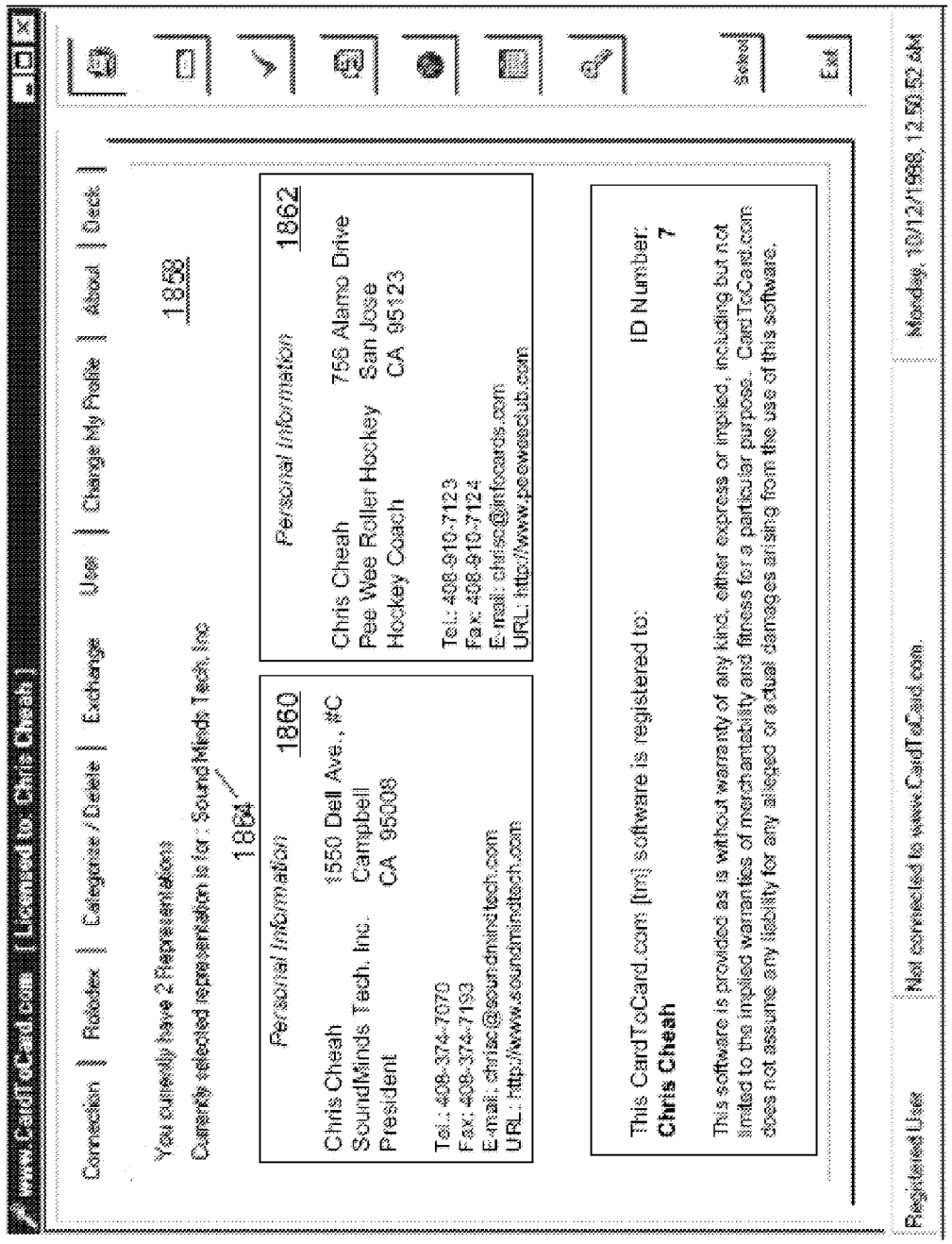

The users of the client-side application are able to represent themselves irrespective of employment (current or future). The user first and foremost represents himself primarily because of his unique ID (PID) assigned to him by the server system. The user profiles himself with his self-represented contact (profile) information. The user can also create further representations (profile) of himself. For example, the user may want to create another profile of himself as coach of his son's roller hockey team. FIG. 18K is a representative screen illustration 1858 of a user that has multiple representations according to an exemplary embodiment of the invention. The representative screen illustration 1858 includes a first representation 1860 pertaining to a business entity associated with the user, and a second representation 1862 pertaining to a personal association for the user. Here, the user can be represented, and thus exchange or distribute contact information, as either the president of Sound Minds Tech, Inc. or the coach of Pee Wee Roller Hockey. As shown in the representative screen illustration, a select representation is designated by a representation indicator 1864 or by the depression of the first representation 1860. The selected representation in a multiple representation situation is the one used during exchanges of contact information. In addition, the same user can also be officially represented as an employee of a corporation that has subscribed for the information management and distribution service. The user is subscribed as an employee and uses an official company business card, complete with company logo and only company editable employee information. The user now has an additional representation and is still uniquely identified as the same person to the server system; irrespective of changes in personal represented information or business entity information.

Typically, the system can distinguish between the different profiles by using the PID which is shared among the profiles together with the email address associated with the different profiles. In such case, the email address is different for each of the different profiles. Alternatively, an expanded PID could be used as a sub-profile reference to identify one of the different profiles. For example, if the user had a PID of 010, then the expanded PID for a business profile could be referenced as 010-1 ("-1" can be considered an extension), the expanded PID for a personal profile could be referenced as 010-2, and the expanded PID for a corporation profile could be referenced as 010-3.

Figure 19A:
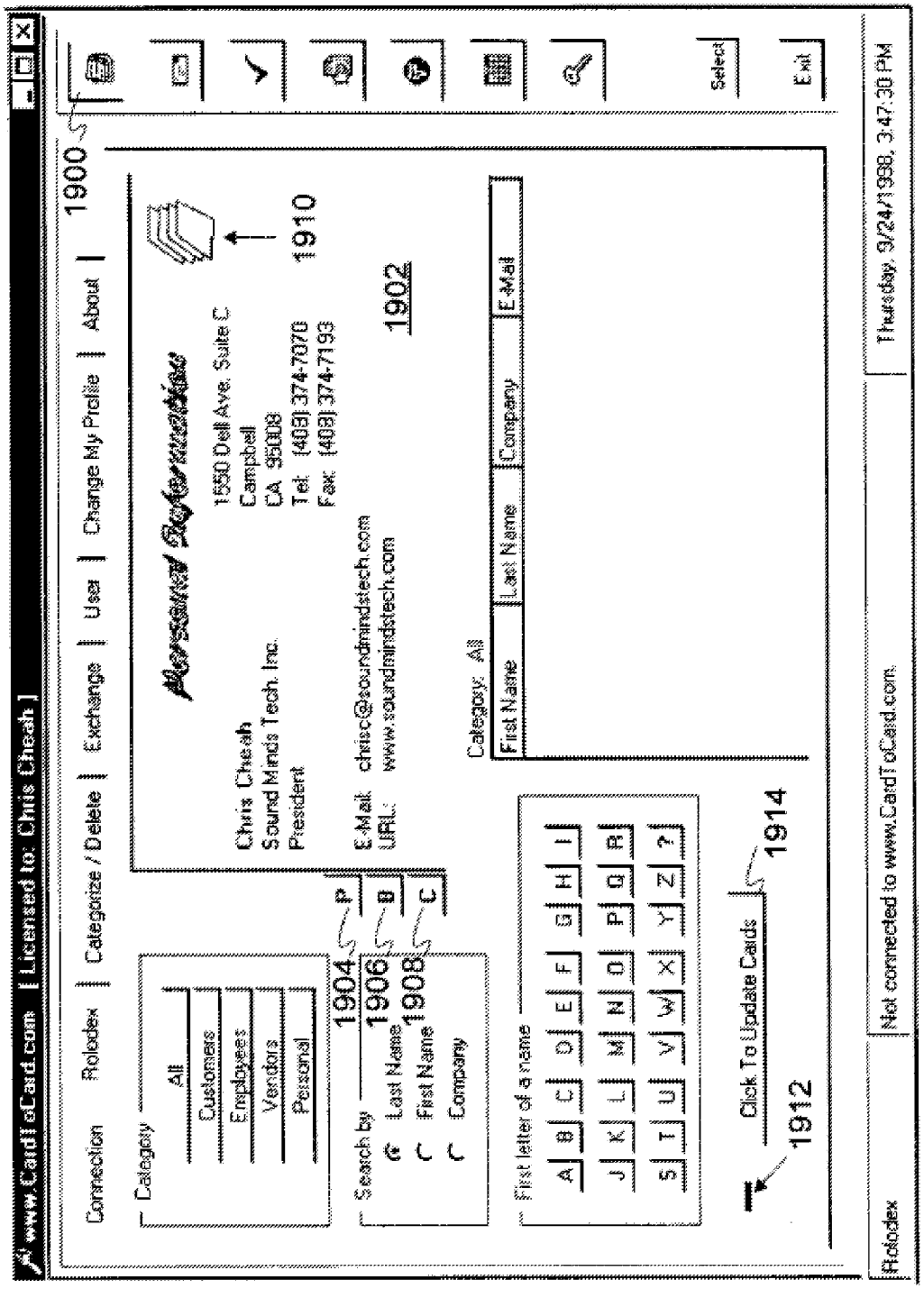
FIG. 19A is a representative screen illustration of a rolodex feature according to another embodiment of the invention.
Figures 1, 19A:
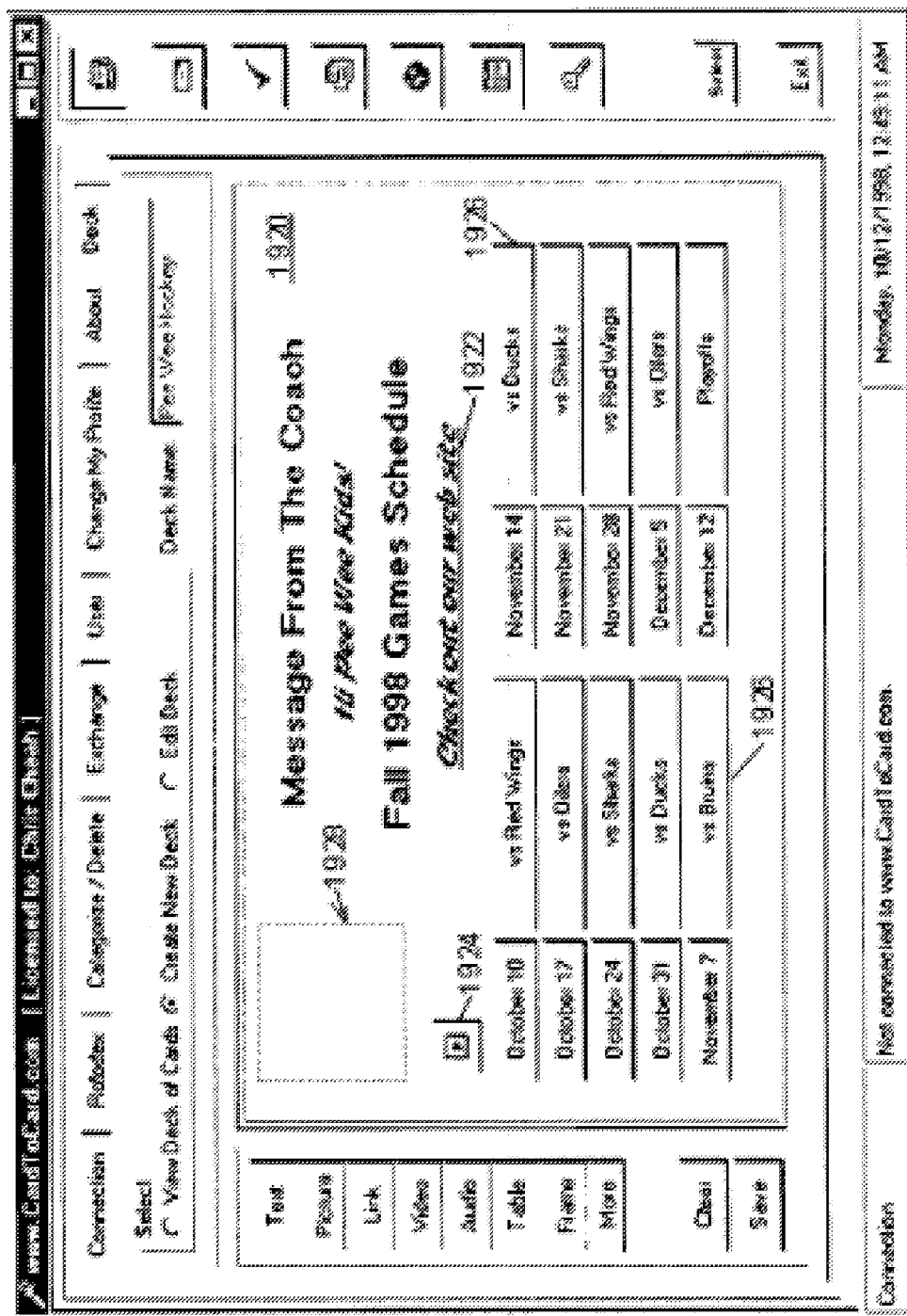

FIG. 19A is a representative screen illustration of a rolodex feature according to another embodiment of the invention. The screen illustration shows a rolodex icon 1900 as being selected, thus indicating that the client-side application is in the rolodex feature mode. The screen illustration includes a card display area 1902 that displays the contact card for the registered user. In a case of multiple representations, the registered user could have a personal contact card, a business contact card and a corporation contact card. To facilitate the registered user in selecting between the multiple profiles on the client-side application, selection buttons 1904-1908 are displayed on the screen illustration shown in FIG. 19A. The selection button 1904 selects the personal profile, the selection button 1906 selects the business profile, and the selection button 1908 selects the corporation profile. As shown in FIG. 19A, the card display area 1902 is displaying the business profile associated with the registered user.

Each of the one or more profiles that are associated with a registered user can contain information beyond the contact information. This additional information can be of a variety of types and formats. For example, the additional information can pertain to text, images, graphics, video and other multimedia types. The additional information also could be packaged within a HTML wrapper that would contain references or links to the additional information. The additional information could also be provided as additional cards. As shown in FIG. 19A, the card display area 1902 includes an additional information designation area 1910 that informs the user whether there is additional information associated with the currently selected contact card being displayed in the card display area 1902. The additional information designation area 1910 illustrated in FIG. 19A shows that the selected contact card has four additional cards of information associated therewith. By selecting one of the additional cards, the additional information or links to the additional information are displayed in the card display area 1902. In the case of links, the links can point to either a local database of information or a remote server.

FIG. 19A-1 is a representative screen illustration of an additional card 1920 of information according to an exemplary embodiment of the invention. The additional card 1920 contains a link 1922 to a website, a multimedia button 1924 for an audio or video clip, various text objects 1926, and a graphic (picture) 1928. Additional cards (or deck) can thus be created, edited and viewed using the client-side application. The additional cards can be composed to include objects such as text, graphics (pictures), links, video, audio, tables, frames, etc.

Hence, while the contact information may be represented in the form of a common display format (such as a business card format), additional information can be associated with the common display format. The common display format serves as a reference point for information that originates from a user or a business entity; essentially the point of contact. Every user and their contacts would use the same display format to reference their contacts. In one embodiment, the common display format is a card. Those cards holding additional information can be referred to as container cards. The invention also allows the users to embed additional information when they exchange or impart their contact information or profile through use of cards. The additional information may contain any number of data types, including text, graphics, images, multimedia (audio/video), telephony, fax, HTML, XML, Applets, and http links. These data types can reference datatypes or data objects within the same card or within a deck of cards (local or remote). The user may also add multiple cards, each card may be linked to the previous card. The ability to embed new datatypes within the context of additional container cards referenced to the reference card truly makes all data types representable and presentable to all parties in a consistent manner. The ability of container cards to embed common datatypes that possess the ability to affect other datatypes within the same container card, or within the same deck or on remote machines provides an extremely powerful architecture.

The embedded data types may be visible or invisible and may be added either at design time or added dynamically at run time. The container cards may be as simple as XML/ HTML code that can simply be imported from some standard XML/HTML parser or can themselves be entire applications and Applets (Java) wrapped together and represented in the common display format. A data type object is a higher class abstraction of a data type with predefined behavior properties that when executed, perform some pre-defined actions and events. Additionally, these events are able to influence and affect the behavior of other objects within the same card, deck of cards or within objects embedded in cards on remote servers that are programmed to understand common events and actions. For example, an audio data type object is a class of audio object whose format is of ".wav" and of type: 8 bit compressed. The format and type are properties that may be set at design or run time. The same audio object has multiple predefined events that are fired at the relevant point in the execution of the run time behavior of the object. For example, the audio object has been preset to play ADPCM 16 bit files and has been defined to understand the following events: OnClick, OnStartAudio, OnEndAudio, OnPauseAudio. As an example, this audio object can be embedded in a container card with an image object that is programmed with design/run time properties that will present a 'slide-show' synchronized to the OnClick, OnPauseAudio and OnEndAudio of certain music segments being played.

The client-side application allows these 'Deck of Cards' to be easily created. Each card can be given a name and referenced by that name. For each card, the user may add the required data types by first selecting the data type (e.g., text, graphics, audio, etc.) and then clicking on a canvas area for the card. Once the data type is dropped onto the canvas area, it can be dragged and placed at the desired location. By double clicking that data type icon, a new dialog window is presented that will be used to select additional properties or input data for that data type. For example, when a text data type is dropped on the canvas area, a double click action brings up a dialog window where the text string may be entered, together with the ability to dictate properties such as font size, font color, etc. Similarly, when a link data type is selected and placed onto the canvas area, a double click action brings out a dialog box that permits the user to enter an address related to the text link (or bitmap link) that can be a redirection to a remote web site or it could be a local reference to a HTML file.

The information management and distribution system can also include a corporate administrator application. The corporate administrator application is downloaded or obtained in ways similar to how the client-side application is obtained as discussed above. An administrator operates the corporate administrator application which executes on the local machine associated with the administrator. The corporate administrator application can include many of the features associated with the client-side application, including creation and design, rolodex, exchange, and update features. For example, the administrator may wish to update a corporate contact that has been previously distributed or exchanged.

Figure 19B:
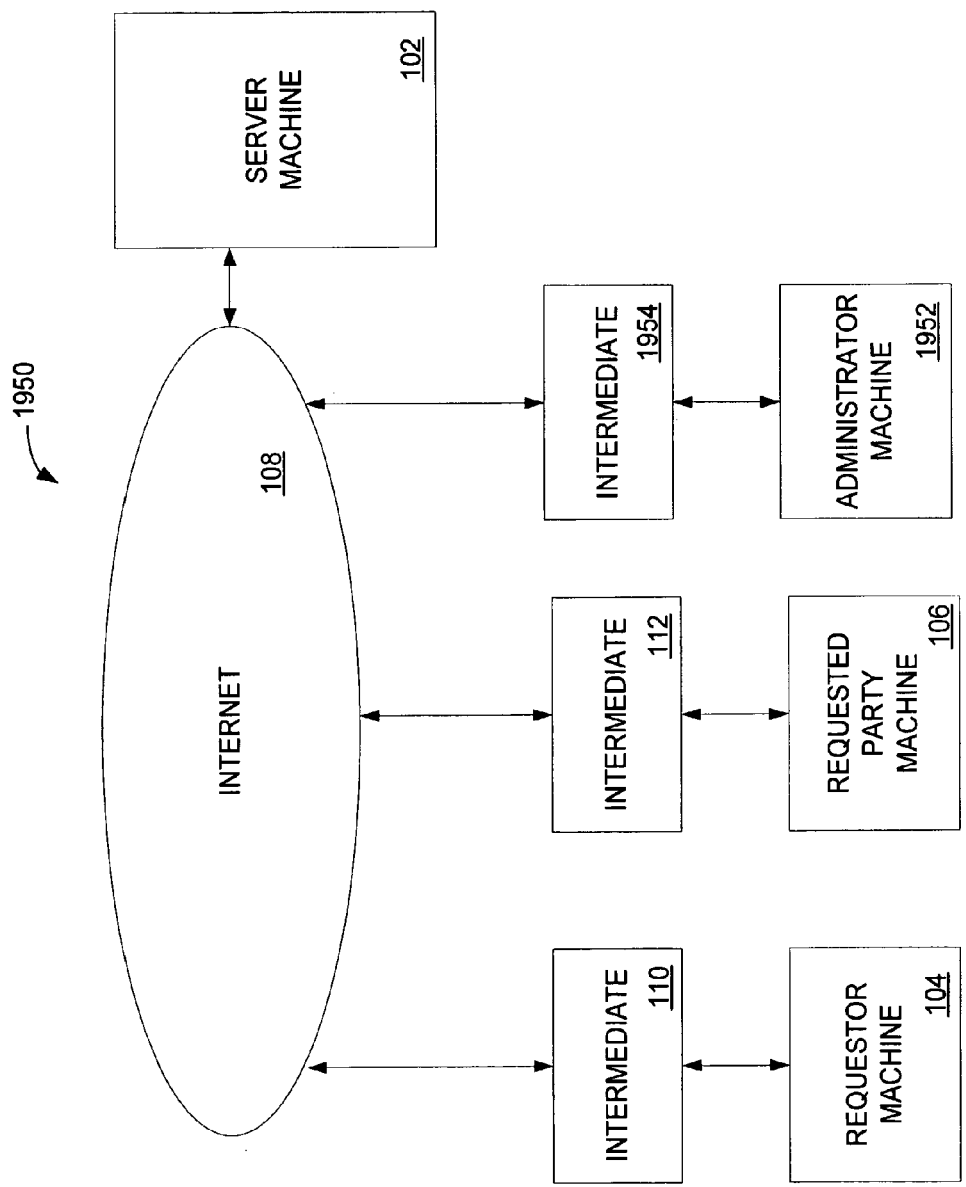
FIG. 19B is a block diagram of a network information management and distribution system according to another embodiment of the invention.

FIG. 19B is a block diagram of a network information management and distribution system 1950 according to another embodiment of the invention. The network information management and distribution system 1950 is generally similar to the network information management and distribution system 100 illustrated in FIG. 1. Additionally, however, the network information management and distribution system 1950 includes an administrator machine 1952 that connects to the Internet 108 through an intermediate 1954. The administrator machine 1952 administers information and management of information pertaining to a business entity.

The intermediate 1954 can refer to any of a number of networks or network devices, including a Local Area Network (LAN), a corporate Intranet, a Wide Area Network (WAN), a wireless data network, and an Internet Service Provider (ISP). It should be noted that other networks besides the Internet can be used to interconnect the server machine 102 with the administrative machine 1952. Here, the server machine 102 provides for storage and management of content information for a plurality of users. The content information can pertain to not only individuals but also corporate users.

The distribution of the content information at the server machine 102 can be operate as described above. Alternatively, the distribution of the corporate contact information can be performed as follows. First, the user of the requestor machine 104 makes a request for corporate contact information to the server machine 102 through the Internet 108. Second, when the server machine 102 receives the request from the requestor machine 104, the server machine 102 determines that the requestor is seeking to receive the corporate contact information for the user of the requested party machine 106. In this example, the user of the requested party machine is also an employee of the business entity associated with the corporate contact information. As noted above, the user may have multiple representations such as personal, business and corporate. Here, the request would be to receive the corporate representation of the user (employee) with respect to their employer. Such a corporate representation would include the corporate contact information. The server machine 102 then proceeds to query the user of the requested party machine 106 whether the distribution of its corporate contact information is permitted. If the user of the requested party machine 106 replies that the distribution is permitted, then the server machine 102 forwards the corporate contact information for the user of the requested party machine 106 from the server machine 102 to the requestor machine 104 through the Internet 108. Upon receiving the corporate contact information for the user of the requested party machine 106, the requestor machine 104 locally stores the corporate contact information in the requestor machine 104. Alternatively, if the user of the requested party machine 106 replies that the distribution is not permitted, then the server machine 102 sends a notification to the requestor machine 104 to inform the user that the request for corporate contact information from the user of the requested party machine 106 is denied. Optionally, instead of the one-way distribution of the contact information, contact information of both users of the requestor machine 104 and the requested party machine 106 can be exchanged (i.e., two-way distribution).

Accordingly, the distribution of corporate contact information is controlled by the "owner" of the information which would normally be an employee. As such, contact information is able to be electronically transmitted to those users that are approved and not to those users that are not approved. However, the administrator of the corporate contact information is responsible for control over at least the basic corporate contact information so that the corporate image (e.g., appearance, logo, etc.) are consistent and centrally controlled. The administrator also is able to limit availability of the contact information to employees.

Additionally, should the contact information need to be changed, the changes can be made and then the server machine can proceed to update the previously transmitted contact information. As an example, the updating of the contact information at the administrator machine 1952 produces altered contact information that is forwarded and stored on the server machine 102. Then, the server machine 102 can distribute the altered content information through the Internet 108 to all of those requestors machines that previously received (and this store) the contact information which is now outdated, thereby updating the content information for the user of the requested party machine 106 on the various requestor machines. As an example, the administrator may update the corporate contract information to change the corporate address. In such case, those registered users having previously received would receive the updated corporate contact information (or at least a notification of its availability). In addition, the administrator can also cause notifications, announcements or advertisements to be distributed to registered users in any of a number of ways. The administrator can also disable contact information for particular employees of the business entity.

Figure 20:
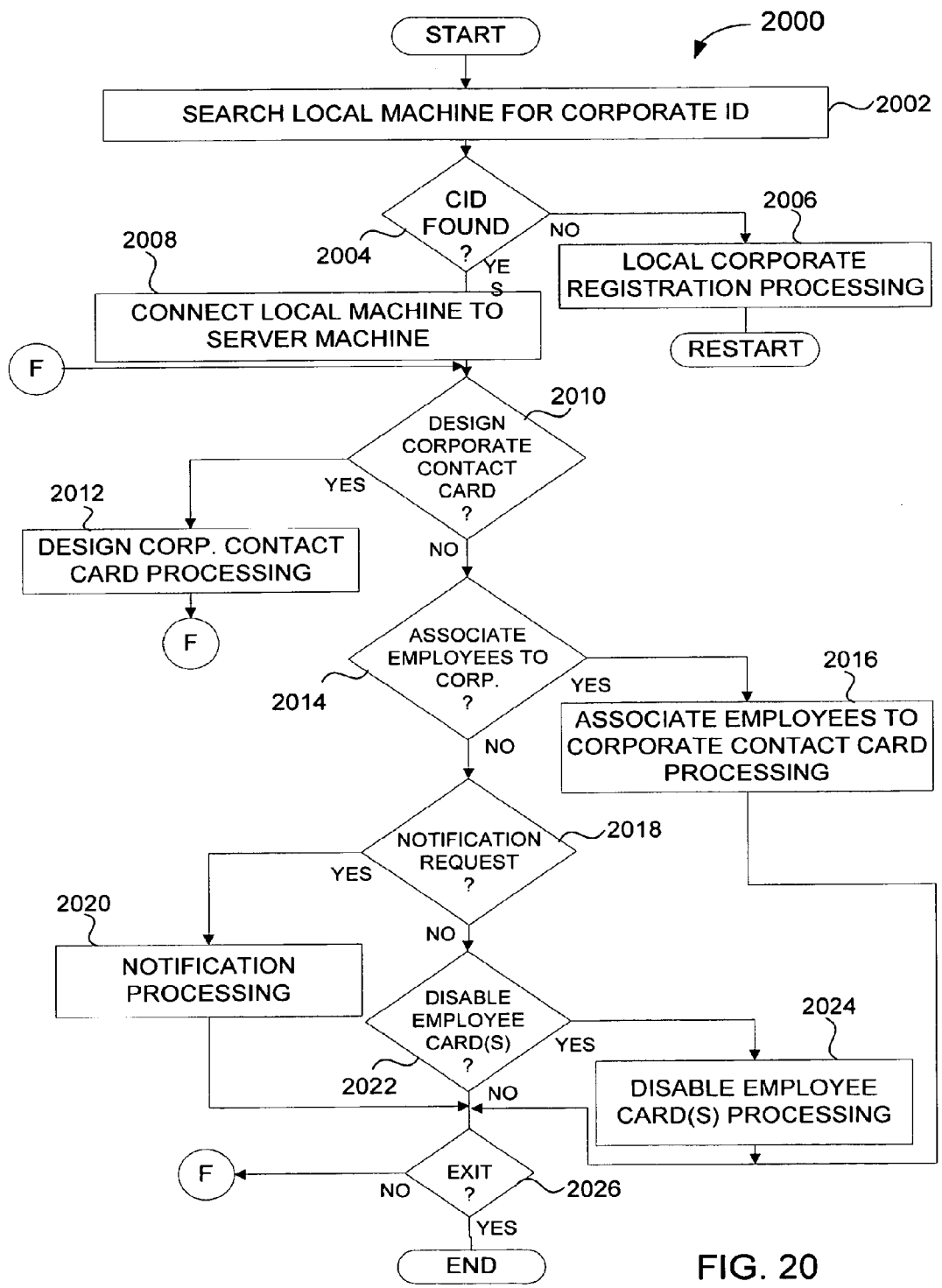
FIG. 20 is a flow diagram of corporate administrator application processing according to an embodiment of the invention.

FIG. 20 is a flow diagram of corporate administrator application processing 2000 according to an embodiment of the invention. The corporate administrator application processing 2000 is, for example, performed by a corporate administrator application. The corporate administrator application executes on an administrator machine (e.g., administrator machine 1952) associated with an administrator. More generally, the administrator machine is a local machine. The administrator is charged with administration of the information management and exchange system for the corporation (or other business entity). Although the administrator application is referred to as a corporate administrator application, it should be noted that the corporate administrator application is not limited to a corporation and thus any suitable business entity can be used.

The corporate administrator application processing 2000 initially searches 2002 a local machine for a corporate identifier (CID). The local machine being searched is the local machine on which the corporate administrator application is installed. A decision block 2004 then determines whether the CID has been found. When the decision block 2004 determines that a CID has not been found, then local corporate registration processing is performed 2006. The local corporate registration processing causes the administrator to perform the corporate registration before the corporate administrator processing 2000 can perform its normal processing. Following block 2006, the corporate administrator application processing 2000 is restarted.

Alternatively, when the decision block 2004 determines that the CID has been found, then the normal processing provided by the corporate administrator application 2000 can be performed. Namely, the local machine is connected 2008 to a server machine (e.g., the server machine 102). This connection is performed over a network. In one embodiment, the network includes the Internet. Often, the network will also include a corporate network, such as a LAN, that connects the local machine to the Internet.

Next, a decision block 2010 determines whether the administrator desires to design a corporate contact card. The corporate contact card contains the contact information for the corporation (or other business entity). The corporate information is presented in a contact card that provides a common format for the information. When the decision block 2010 determines that the administrator desires to design a corporate contact card, then processing to design corporate contact card processing is performed 2012. Following block 2012, the corporate administrator application 2000 processing returns to repeat the decision block 2010 and subsequent blocks.

On the other hand, when the decision block 2010 determines that the administrator does not desire to design a corporate contact card, then a decision block 2014 determines whether the administrator desires to associate employees to the corporation. When the decision block 2014 determines that the administrator desires to associate employees to the corporation, processing to associate employees to the corporate contact card is performed 2016. There are a variety of ways to associate employees to a corporation or the corporate contact card. Such ways include importing employee data into the corporate administrator application, manually entering the employee data by the administrator, or having the employees enter their employee information using their client-side application associated with their local machines.

Alternatively, when the decision block 2014 determines that the administrator does not desire to associate employees to the corporation, a decision block 2018 determines whether a notification request is being made. When the decision block 2018 determines that a notification request has been made, then notification and disable processing is performed 2020.

On the other hand, when the decision block 2018 determines that there has been no notification request, a decision block 2022 determines whether the administrator desires to disable employee cards. When the decision block 2022 determines that the administrator desires to disable employee cards, then disable employee cards processing is performed 2024. Alternatively, when the decision block 2022 determines that the administrator does not desire to disable employee cards, as well as following the block 2016, the block 2022 or the block 2024, a decision block 2026 determines whether an exit has been requested. When the administrator has requested to exit the corporate administrator application, the corporate administrator application processing 2000 is complete and ends. Alternatively, when the decision block 2026 determines that the administrator has not requested to exit the corporate administrator application, the corporate administrator application processing 2000 returns to repeat decision block 2010 and subsequent blocks.

Although not shown in FIG. 20, the corporate administrator application can also perform some or all of the functions or features of the client-side application. For example, the functions or features include creation and design, rolodex, exchange, and update features.

Figure 21:
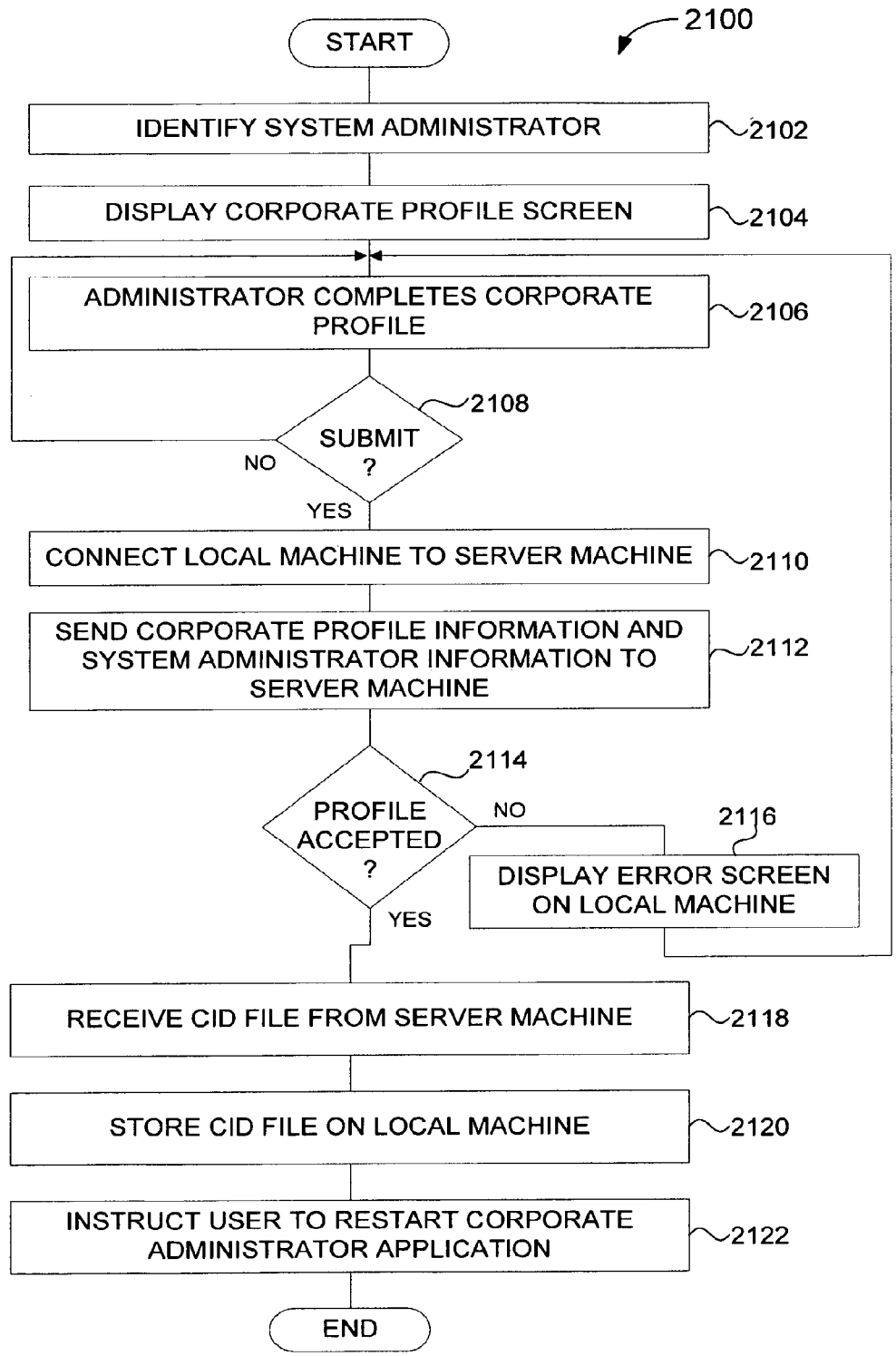
FIG. 21 is a flow diagram of local corporate registration processing according to an embodiment of the invention.

FIG. 21 is a flow diagram of local corporate registration processing according to an embodiment of the invention. The local corporate registration processing 2100 is, for example, the processing associated with the block 2006 illustrated in FIG. 20. The local corporate registration processing 2100 is performed on a local machine that is associated with an administrator of the information management and distribution system (e.g., the administrator machine 1952).

The local corporate registration processing 2100 initially identifies 2102 a system administrator. The system administrator is the individual who will administer the information management and distribution system. In other words, the system administrator will be responsible for maintaining the corporate contact information as well as for supervising and verifying the usage of the corporate contact information by the various employees of the corporation.

Following block 2102, a corporate profile screen is displayed 2104. Then, the administrator completes 2106 the corporate profile by interacting with the corporate profile screen being displayed to enter corporate profile information for a corporate profile. Next, a decision block 2108 determines whether the administrator has requested to submit the corporate profile to the server machine. When the decision block 2108 determines that the administrator has not requested to submit the corporate profile, then the processing returns to repeat the block 2106 and subsequent blocks.

On the other hand, once the decision block 2108 determines that the administrator has requested to submit the corporate profile to the server machine, the local machine that performs the local corporate registration processing 2100 is connected 2110 to the server machine. Then, the corporate profile information along with information pertaining to the system administrator are sent 2112 to the server machine.

Next, a decision block 2114 determines whether the corporate profile has been accepted by the server machine. When the decision block 2114 determines that the server machine has not accepted the corporate profile, then an error screen is displayed 2116 on the local machine. Following block 2116, the local corporate registration processing 2100 returns to repeat the block 2106 and subsequent blocks so that the administrator can retry the creation and submission of the corporate profile.

On the other hand, when the decision block 2114 determines that the corporate profile has been accepted, the CID file is received 2118 from the server machine. Here, upon receiving the corporate profile that has been submitted, the server machine operates to produce a unique corporate identifier (CID). The CID file is then transmitted from the server machine to the local machine that is performing the local corporate registration processing 2100. Hence, in block 2118, the CID file is received 2118 from the server machine. Then, the CID file is stored 2120 on the local machine. The user is next instructed 2122 to restart the corporate administrator application so that the processing performs the corporate administrator application processing 2000 illustrated in FIG. 20. Following block 2122, the local corporate registration processing 2100 is complete and ends.

The corporate profile information is typically presented to registered users in a card format (i.e., corporate contact card). Specifically, a representative card format is a business card format. The designing of a corporate contact card is similar to the designing of a personal contact card and thus the processing described above with respect to FIG. 9 is also suitable for designing the corporate contact card. However, typically, a corporate contact card will include a company logo which is a particular graphic image that may be scanned or imported during the business card creation processing and thus placed on the corporate contact card. Additionally, as also noted above, additional information can be added to the contact cards or contact information associated with the cards. The additional information can take a variety of forms, including web page links, HTML documents, various messages, notifications and advertisements.

Figure 22:
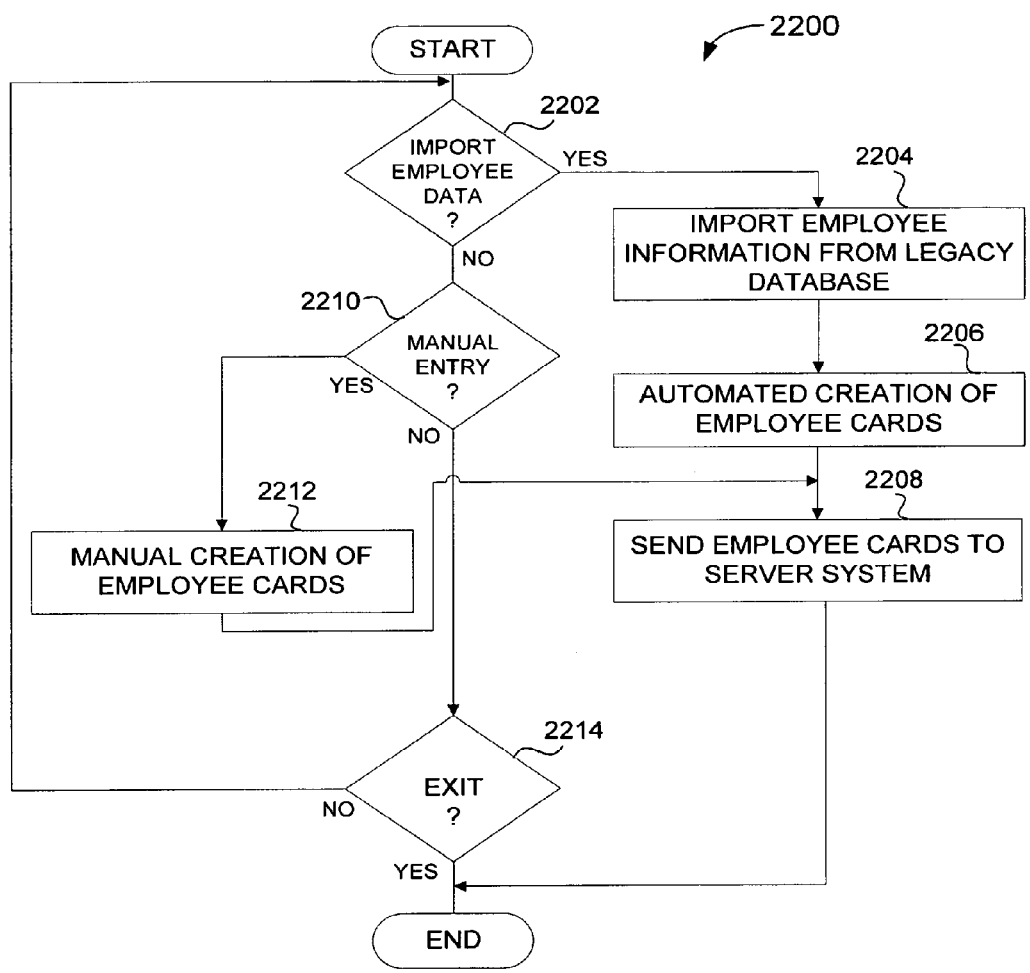
FIG. 22 is a flow diagram of employee association processing according to an embodiment of the invention.

FIG. 22 is a flow diagram of employee association processing 2200 according to an embodiment of the invention. The employee association processing 2200 is, for example, performed by the block 2016 illustrated in FIG. 20. The employee association processing 2200 is also performed by the administrator of the information management and distribution system.

The employee association processing 2200 initially begins with a decision block 2202. The decision block 2202 determines whether the administrator desires to input employee data so as to create employee cards. When the decision block 2202 determines that the administrator does desire to import employee data, then employee information is imported 2204 from a legacy database. Typically, a corporation will have a database that includes information about its employees. Hence, here, the ability to import employee information from such a database results in a substantial time savings in the registration of the employees with the information management and distribution system. Next, the employee association processing 2200 can operate to automatically create 2206 the employee cards (i.e., employee contact cards) using the employee information that has been imported. For example, while the corporate contact card has some common corporate contact information (e.g., corporate name, corporate address, company logo, etc.), the employee cards may need to add information such as employee name, title of job, work telephone number, work facsimile number and work email address. This type of information is often available from a legacy database and thus can be imported then used to automatically create the employee cards. Following block 2206, the employee cards are sent 2208 to the server system. The server system is the central depository for all of the contact information associated with the information management and distribution system. Hence, the employee cards that have been created are sent 2208 to the server system. Following block 2208, the employee association processing 2200 is complete and ends.

On the other hand, when the decision block 2202 determines that the administrator does not desire to import employee data, a decision block 2210 determines whether the administrator desires to manually enter one or more employees into the information management and distribution system. When the decision block 2210 determines that manual entry is desired, then one or more employee cards are manually created 2212. Following block 2212, the employee association processing 2200 performs the block 2208 and subsequent blocks. Alternatively, when the decision block 2210 determines that manual entry is not desired, then a decision block 2214 determines whether an exit is requested. When the administrator requests to exit the employee association processing 2200, the employee association processing 2200 is complete and ends. On the other hand, when the administrator does not desire to exit the employee association processing 2200, the employee association 2200 processing returns to repeat the decision block 2202 and subsequent blocks.

Besides importing data or the administrator manually entering employee data, another approach is to have employees enter their employee information from their local machines. Typically, the employees will also interact with the information management and distribution system using the client-side application executing on their local machine. In FIG. 19A, for example, the corporate representation (employee card) could be selected for display by the client-side application by selection of the selection button 1908. Hence, by providing the employees with the corporate identifier (CID) and perhaps a password, the employees are able to individually create their own employee cards using the corporate profile as a base. Although the employee is able to build off of the corporate profile as a base, the corporate profile or card is not able to be altered by the employees. After the employees have created their employee cards using the corporate profile as a base, the employee cards would be sent to the administrator for approval and then, upon approval, the employee cards would be forwarded to the server system for storage.

Figure 23:
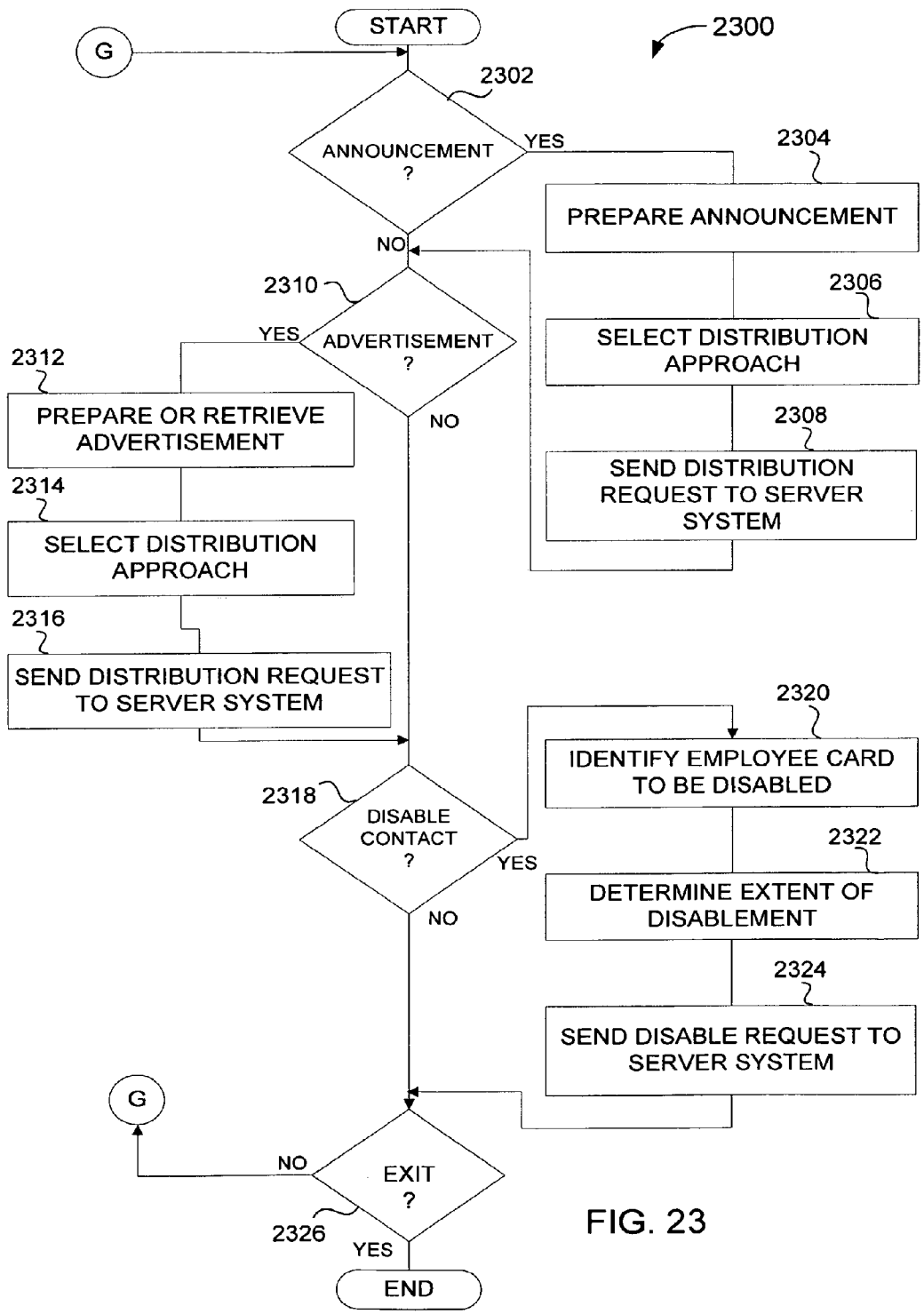
FIG. 23 is flow diagram of notification and disable processing according to an embodiment of the invention.

FIG. 23 is flow diagram of notification and disable processing 2300 according to an embodiment of the invention. The notification and disable processing 2300 is, for example, processing performed by the block 2020 illustrated in FIG. 20.

The notification and disable processing 2300 begins with a decision block 2302. The decision block 2302 determines whether an announcement type notification is requested. When the decision block 2302 determines that an announcement type notification is requested, then an announcement is prepared 2304. After preparing the announcement, a distribution approach is selected 2306. As examples, the distribution approach can be email, facsimile, or as additional information associated with a contact card (e.g., a notification card). Then, a distribution request is sent 2308 to the server system. The distribution request operates to request that the server system distribute the announcement using the distribution approach selected to one or more of the registered users.

On the other hand, when the decision block 2302 determines that an announcement-type notification is not requested, as well as following the block 2308, a decision block 2310 determines whether an advertisement-type notification is requested. When the decision block 2310 determines that an advertisement-type notification is requested, then the notification and disable processing 2300 operates to prepare or retrieve 2312 an advertisement. Then, a distribution approach is selected 2314 for the advertisement. As examples, the distribution approach can be email, facsimile, or as additional information associated with a contact card (e.g., a notification card). Next, a distribution is sent 2316 to the server system, requesting the distribution of the advertisement.

Alternatively, when the decision block 2310 determines that an advertisement-type notification is not requested, as well as following the block 2316, a decision block 2318 determines whether there is a request to disable a contact. When the decision block 2318 determines that there is a request to disable a contact, the employee card to be disabled is identified 2320. Then, the extent of disablement is determined 2322. For example, the disablement could be temporary or permanent. Also, the disablement could render the card inactive but still viewable, or could render the card totally unviewable, or could superimpose graphics or text on the card indicating that the card should no longer be used, etc. Following block 2322, a disable request is sent 2324 to the server system.

On the other hand, when the decision block 2318 determines that a disable request has not been received, as well as following the block 2324, a decision block 2326 determines whether an exit has been requested. When the decision block 2326 determines that an exist has not been requested, then the notification and disable processing 2300 returns to repeat the decision block 2302 and subsequent blocks. On the other hand, when the decision block 2326 determines that an exit has been requested, then the notification and disable processing 2300 is complete and ends.

In general, any of the processing that could be done by the client-side application or administrator application by either the requestor or the requested party could also be done by interacting with the website server using a network browser. The registration, rolodex, exchange (including request, authorization and completion), and update could, for example, all be achieved by either or both of the client-side application or the network browser together with the website server. In the case of a network browser implementation, local storage (e.g., local contact information storage 316) of the contact information (and additional information) is not needed because such information is stored centrally not locally. In one network browser implementation, the client-side application (e.g., client-side application 306) is performed by scripts (e.g., JavaScript or VB script) or plug-ins operating on the network browser or the website server, thus there is no need in such an implementation to download and install a client-side application. The client controller (e.g., client controller 302) can also be performed by scripts or plug-ins with the network browser. For example, in the case of an exchange request as noted above, the exchange of contact information can be initiated (blocks 1104-1106) by a requestor interacting with the client-side application. In such case, the requestor can, for example, enter the first name, last name and email address of the individual with whom an exchange of contact information is desired. However, when the exchange of contact information is initiated through the website server, the requestor would also need to identify him/herself to the website server. As an example, to initiate an exchange by way of the website server, the requestor would additionally need to indicate the first name, last name, the PID, and email address of the requestor himself. However, in all likelihood, the requestor would also be required to enter a password so that unauthorized exchanges do not occur.

Security features can also be optionally provided with the invention. The security features can ensure that the registered users are provided with the opportunity to encode or encrypt information being transferred between the client-side application and the system server. The receiving side would then also be able to decode or decrypt the received information.

Moreover, in some cases, a registered user may desire to interact with the system server using different remote machines. In such case, a password protected log in can be used to permit the user to access the system server. However, to keep the various client-side applications synchronized with the other client-side application or the interactions with the website server, the system server will store and eventually echo back all changes made during the remote log in.

The advantages of the invention are numerous. Several advantages that embodiments of the invention may include are as follows. One advantage of the invention is that the distribution of information takes place in an automated fashion, which is particularly advantageous when large numbers of users are involved. Another advantage of the invention is that the parties involved in the distribution can control the distribution process so that only approved distributions occur. Still another advantage of the invention is that updates to previously distributed information can also be automated. Yet another advantage of the invention is that the information being exchanged is useful for enabling registered persons to efficiently contact the persons associated with the information using a mechanism which they have prescribed. Another advantage of the invention is that contact and additional information can be distributed to users in a common format. Still yet another advantage of the invention is that an administrator can control the distribution and use of corporate (i.e., business entity) information.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system that supports controlled exchange over a network of digital content information pertaining to a plurality of users, the computer system comprising:

a networked server system accessible by remote user devices via the network, the networked server system comprising at least one processor and at least one memory storing executable program instructions; and one or more databases accessible by the networked server system and storing content information and exchange settings of registered users;

the networked server system being programmed, via the executable program instructions, to:

(a) store in the one or more databases the content information received from a first user for association with the first user, the content information comprising profile information about the first user and additional multimedia content of a plurality of data types, the content information comprising multiple data items which each correspond to a different subset of the content information;

(b) store in the one or more databases the exchange settings received from the first user for specifying access to one or more of the multiple data items of the content information to one or more categories of requesting users so as to define one or more user profiles containing those of the one or more of the multiple data items specified as being accessible to a particular category of the requesting users;

(c) receive a request from a second user to permit the exchange of content information with the first user;

(d) send an electronic notification of the requested exchange to the first user;

(e) provide an option for the first user to permit the requested exchange of the content information; and (f) receive permission for the requested exchange from the first user; and (g) establish the second user as a contact of the first user and provide the first user and the second user access to each of their respective user profiles via the network, wherein the second user is provided access to the particular user profile previously specified by the first user's exchange settings for a category of requesting users to which the second user has been associated by the first user.

2. The computer system of claim 1, wherein the networked server system is programmed to provide a user control that enables the first user to select the user profile of a particular contact, in response to which the networked server system provides the selected user profile for display in a profile display area of a user interface.

3. The computer system of claim 1, wherein the networked server system is programmed to allow the contacts of the first user to be organized into at least one category.

4. The computer system of claim 3, wherein the networked server system is programmed to apply profile exchange settings received from the first user for the at least one category.

5. The computer system of claim 3, wherein the at least one category comprises one or more of a friend category, a business associate category and a family member category.

6. The computer system of claim 3, wherein the at least one category includes a user defined custom category, the networked server system being configured to allow the first user to associate at least one contact with the custom category.

7. The computer system of claim 6, wherein the at least one category includes at least one system defined category and a user defined custom category, the networked server system being configured to allow the first user to associate at least one contact with one or more of the at least one system defined category and the user defined custom category.

8. The computer system of claim 1, wherein the networked server system is programmed to allow the first user to pre-authorize one or more categories of users to access one or more of the multiple data items of the first user's content information without separate approval by the first user of individual exchange requests.

9. The computer system of claim 8, wherein the one or more categories of users includes a category comprising all users of the service such that the first user is allowed to specify a particular user profile that is accessible to all users without separate approval by the first user of individual exchange requests.

10. The computer system of claim 1, wherein the networked server system is programmed to provide an option for the first user to provide instructions identifying a category of requesting users with which the second user is to be associated in response to receiving the notification of a requested exchange and to thereby grant the second user access to the particular user profile previously authorized by the first user's exchange settings for the identified category of requesting users.

11. The computer system of claim 1, wherein the additional multimedia content includes a plurality of data objects which provide controls for allowing contacts of the first user to interact with the additional multimedia content.

12. The computer system of claim 11, wherein the plurality of data types includes data types corresponding to one or more of graphics, images, audio, video, HTML code, XML code, applications, frames, Applets or http links.

13. The computer system of claim 12, wherein at least one of the one or more user profiles contains a plurality of embedded applications or Applets having predefined runtime behaviors.

14. The computer system of claim 1, wherein the networked server system provides a portal for a user to initiate an on-line chat with one or more of the user's respective contacts.

15. The computer system of claim 1, wherein the networked server system provides a portal for a user to compose and send an instant message or email message to one or more of the user's respective contacts.

16. The computer system of claim 1, wherein the networked server system provides a portal for a user of the networked server system to conduct a video conference with one or more of the user's respective contacts.

17. The computer system of claim 1, wherein the networked server system is programmed to allow the first user to change the content information received from the first user and changes are reflected automatically in the profile information when the user profile of the first user is subsequently displayed via a user interface to contacts of the first user.

18. The computer system of claim 1, wherein the networked server system is programmed to dynamically provide multimedia content for display along with at least one of the one or more user profiles via a user interface.

19. The computer system of claim 18, wherein the dynamically provided multimedia content comprises one or more advertisements.

20. The computer system of claim 18, wherein the dynamically provided multimedia content is of a data type corresponding to one or more of graphics, images, audio, video, HTML code, XML code, applications, frames, Applets or http links.

21. A computer system that supports controlled exchange over a network of digital content information pertaining to a plurality of users, the computer system comprising:

a networked server system accessible by remote user devices via the network, the networked server system comprising at least one processor and at least one memory storing executable program instructions; and one or more databases accessible by the networked server system and storing content information and exchange settings of registered users;

the networked server system being programmed, via the executable program instructions, to:

(a) store in the at least one database the content information received from a first user for association with the first user, the content information profiling the first user, the content information comprising multiple data items which each correspond to a different subset of the content information;

(b) store in the at least one database the exchange settings received from the first user for specifying access to one or more of the multiple data items of the content information to one or more categories of requesting users so as to define one or more user profiles containing those of the one or more of the multiple data items specified as being accessible to a particular category of the requesting users;

(c) receive a request from a second user to permit the exchange of content information with the first user;

(d) determine whether the first user permits the requested exchange of content information; and (e) establish the second user as a contact of the first user and provide the first user and the second user access to each others respective user profiles via the network, wherein the second user is provided access to the particular user profile of the first user previously specified by the first user's exchange settings for a category of requesting users to which the second user has been associated by the first user.

22. The computer system of claim 6, wherein the networked server system is configured to allow the first user to create a user defined name for the custom category.

23. The computer system of claim 1 wherein the networked server system is further configured to:
allow the first user to create a group, the group including members comprising a plurality of users which have been established as contacts of the first user; and
store in the one or more databases group member information received from the first user, the group member information including data identifying the plurality of users that are to be included as the members of the group.

24. The computer system of claim 23, wherein the networked server system is further configured to provide group content information for display to the members of the group.

25. The computer system of claim 24, wherein the group content information comprises information pertaining to the group, the members or both.

26. The computer system of claim 24, wherein the group content information comprises a message intended for the members of the group.

27. The computer system of claim 24 wherein the group content information is of a data type corresponding to one or more of graphics, images, audio, video, HTML code, XML code, applications, frames, Applets or http links.

28. The computer system of claim 23, wherein the networked server system is configured to allow the first user to create a user defined name for the group.

29. The computer system of claim 23, wherein the networked server system is configured to allow a member of the group to initiate an on-line chat.

30. The computer system of claim 23, wherein the networked server system is configured to allow a group member to initiate an email.

31. The computer system of claim 1, wherein the networked server system is configured to provide access to at least one of the multiple data items of the content information to a third user according to permission controlled by the first user.

32. The computer system of claim 31, wherein the third user is a group, business or organization.

33. The computer system of claim 31, wherein the networked server system is configured to receive the permission controlled by the first user to provide the access to the at least one of the multiple data items of the content information.

34. The computer system of claim 31, wherein the networked server system is configured to store in the one or more databases access settings received from the first user, the access settings specifying the at least one of the multiple data items of the content information that will be permitted for access.

35. The system of claim 21,
wherein the networked server system is programmed to allow the contacts of the first user to be organized into two or more categories,
wherein the networked server system is programmed to maintain profile exchange settings for each of the two or more categories, and
wherein the networked server system is configured to apply the profile exchange settings to control access of the second user to the content information of the first user based on the category of the second user.

36. The system of claim 35, wherein the networked server system is configured to allow the first user to create a user defined name for one or more of the two or more categories.

37. The system of claim 21 wherein the networked server system is further configured to:
allow the first user to create a group, the group including a plurality of users which have been established as contacts of the first user; and
store in the one or more databases group member information received from the first user, the group member information including data identifying the plurality of users that are to be included in the group.

38. The system of claim 37, wherein the networked server system is further configured to provide group content information for display to the plurality of users within the group.

39. The system of claim 38 wherein the group content information is of a data type corresponding to one or more of video, applications, frames, links or Applets.

40. The system of claim 38, wherein the networked server system is configured to allow the first user to create a user defined name for the group.

41. The system of claim 23, wherein the networked server system is configured to allow one user of the group to initiate communication with another user of the group.

42. The system of claim 21, wherein the networked server system is configured to provide access to at least one of the multiple data items of the content information to a third user according to permission controlled by the first user.

* * * * *